(12) United States Patent
Komanduri et al.

(10) Patent No.: US 12,013,537 B2
(45) Date of Patent: Jun. 18, 2024

(54) TIME-MULTIPLEXED DISPLAY OF VIRTUAL CONTENT AT VARIOUS DEPTHS

(71) Applicant: Magic Leap, Inc., Plantation, FL (US)

(72) Inventors: Ravi Kumar Komanduri, Austin, TX (US); Lionel Ernest Edwin, Hollywood, FL (US); Chulwoo Oh, Cedar Park, TX (US)

(73) Assignee: Magic Leap, Inc., Plantation, FL (US)

( * ) Notice: Subject to any disclaimer, the term of this patent is extended or adjusted under 35 U.S.C. 154(b) by 181 days.

(21) Appl. No.: 17/370,882

(22) Filed: Jul. 8, 2021

(65) Prior Publication Data

US 2021/0405374 A1 Dec. 30, 2021

Related U.S. Application Data

(63) Continuation of application No. PCT/US2020/013130, filed on Jan. 10, 2020.
(Continued)

(51) Int. Cl.
*G09G 5/00* (2006.01)
*G02B 5/30* (2006.01)
(Continued)

(52) U.S. Cl.
CPC ....... *G02B 27/0172* (2013.01); *G02B 5/3083* (2013.01); *G02B 27/4261* (2013.01);
(Continued)

(58) Field of Classification Search
CPC .............. G02B 27/0172; G02B 5/3083; G02B 27/4261; G02B 27/4272;
(Continued)

(56) References Cited

U.S. PATENT DOCUMENTS 3,632,865 A 1/1972 Haskell et al.
4,204,742 A 5/1980 Johnson et al.
(Continued)

FOREIGN PATENT DOCUMENTS

CN 103605209 A 2/2014
CN 105974589 A 9/2016
(Continued)

OTHER PUBLICATIONS

U.S. Appl. No. 14/702,707 , Advisory Action, dated Jun. 6, 2018, 4 pages.
(Continued)

*Primary Examiner* — Thuy N Pardo
(74) *Attorney, Agent, or Firm* — KILPATRICK TOWNSEND & STOCKTON LLP

(57) ABSTRACT

Techniques for operating an optical system are disclosed. World light may be linearly polarized along a first axis. When the optical system is operating in accordance with a first state, a polarization of the world light may be rotated by 90 degrees, the world light may be linearly polarized along a second axis perpendicular to the first axis, and zero net optical power may be applied to the world light. When the optical system is operating in accordance with a second state, virtual image light may be projected onto an eyepiece of the optical system, the world light and the virtual image light may be linearly polarized along the second axis, a polarization of the virtual image light may be rotated by 90 degrees, and non-zero net optical power may be applied to the virtual image light.

15 Claims, 30 Drawing Sheets

Related U.S. Application Data

(60) Provisional application No. 62/791,441, filed on Jan. 11, 2019.

(51) Int. Cl.
| | |
|---|---|
| *G02B 27/01* | (2006.01) |
| *G02B 27/42* | (2006.01) |
| *G06T 19/00* | (2011.01) |
| *H04N 13/279* | (2018.01) |
| *H04N 13/344* | (2018.01) |

(52) U.S. Cl.
CPC ........ *G02B 27/4272* (2013.01); *G06T 19/006* (2013.01); *H04N 13/279* (2018.05); *H04N 13/344* (2018.05); *G02B 2027/0118* (2013.01); *G02B 2027/0127* (2013.01); *G02B 2027/0138* (2013.01); *G02B 2027/014* (2013.01)

(58) Field of Classification Search
CPC .... G02B 2027/0118; G02B 2027/0127; G02B 2027/0138; G02B 2027/014; G02B 2027/0178; G02B 27/283; G06T 19/006; H04N 13/279; H04N 13/344
USPC ............................................. 345/8, 156, 7, 9
See application file for complete search history.

(56) References Cited

U.S. PATENT DOCUMENTS

| | | |
|---|---|---|
| 4,984,179 A | 1/1991 | Waldern |
| 5,138,555 A | 8/1992 | Albrecht |
| 5,271,093 A | 12/1993 | Hata et al. |
| 5,311,879 A | 5/1994 | Yamada et al. |
| 5,311,897 A | 5/1994 | Greer |
| 5,422,653 A | 6/1995 | Maguire, Jr. |
| 5,526,042 A | 6/1996 | Ozawa et al. |
| 5,742,264 A | 4/1998 | Inagaki et al. |
| 5,933,125 A | 8/1999 | Fernie et al. |
| 6,011,526 A | 1/2000 | Toyoshima et al. |
| 6,151,179 A | 11/2000 | Poss |
| 6,441,811 B1 | 8/2002 | Sawada et al. |
| 6,882,384 B1 | 4/2005 | Sharp |
| 6,917,370 B2 | 7/2005 | Benton |
| 6,947,219 B1 | 9/2005 | Ou |
| 7,023,536 B2 | 4/2006 | Zhang et al. |
| 7,038,846 B2 | 5/2006 | Mandella |
| 7,088,440 B2 | 8/2006 | Buermann et al. |
| 7,110,100 B2 | 9/2006 | Buermann et al. |
| 7,113,270 B2 | 9/2006 | Buermann et al. |
| 7,161,664 B2 | 1/2007 | Buermann et al. |
| 7,203,384 B2 | 4/2007 | Carl |
| 7,268,956 B2 | 9/2007 | Mandella |
| 7,386,799 B1 | 6/2008 | Clanton et al. |
| 7,474,809 B2 | 1/2009 | Carl et al. |
| 7,729,515 B2 | 6/2010 | Mandella et al. |
| 7,758,185 B2 | 7/2010 | Lewis |
| 7,826,641 B2 | 11/2010 | Mandella et al. |
| 7,961,909 B2 | 6/2011 | Mandella et al. |
| 8,223,024 B1 | 7/2012 | Petrou |
| 8,508,830 B1 | 8/2013 | Wang |
| 8,542,219 B2 | 9/2013 | Carl et al. |
| 8,553,935 B2 | 10/2013 | Mandella et al. |
| 8,696,113 B2 | 4/2014 | Lewis |
| 8,730,129 B2 | 5/2014 | Solomon |
| 8,757,812 B2 | 6/2014 | Melville et al. |
| 8,831,278 B2 | 9/2014 | Fedorovskaya et al. |
| 8,832,233 B1 | 9/2014 | Brin et al. |
| 8,879,155 B1 | 11/2014 | Teller |
| 8,897,494 B2 | 11/2014 | Mandella et al. |
| 8,970,709 B2 | 3/2015 | Gonzalez-Banos et al. |
| 9,189,856 B1 | 11/2015 | Gonzalez-Banos et al. |
| 9,229,540 B2 | 1/2016 | Mandella et al. |
| 9,235,934 B2 | 1/2016 | Mandella et al. |
| 9,239,473 B2 | 1/2016 | Lewis |
| 10,055,887 B1 | 8/2018 | Gil et al. |
| 10,185,147 B2 | 1/2019 | Lewis |
| 10,670,808 B1 | 6/2020 | Trail |
| 11,170,565 B2 | 11/2021 | Mathur et al. |
| 11,461,961 B2 | 10/2022 | Mathur et al. |
| 11,676,333 B2 | 6/2023 | Mathur et al. |
| 2001/0035870 A1 | 11/2001 | Takeuchi et al. |
| 2003/0014212 A1 | 1/2003 | Ralston et al. |
| 2003/0137449 A1 | 7/2003 | Vashisth et al. |
| 2003/0156253 A1 | 8/2003 | Watanabe et al. |
| 2003/0158654 A1 | 8/2003 | Morita |
| 2004/0119715 A1 | 6/2004 | Everett et al. |
| 2004/0130520 A1 | 7/2004 | Maeda et al. |
| 2004/0178894 A1 | 9/2004 | Janssen |
| 2004/0258314 A1 | 12/2004 | Hashimoto |
| 2005/0046953 A1 | 3/2005 | Repetto et al. |
| 2005/0110732 A1 | 5/2005 | Kim |
| 2005/0148388 A1 | 7/2005 | Vayra et al. |
| 2005/0248852 A1 | 11/2005 | Yamasaki |
| 2005/0253055 A1 | 11/2005 | Sprague et al. |
| 2005/0254135 A1 | 11/2005 | Ou |
| 2006/0007056 A1 | 1/2006 | Ou |
| 2006/0077861 A1 | 4/2006 | Katsuma et al. |
| 2006/0105838 A1 | 5/2006 | Mullen |
| 2006/0109280 A1 | 5/2006 | Dawson |
| 2006/0132915 A1 | 6/2006 | Yang et al. |
| 2006/0214911 A1 | 9/2006 | Miller |
| 2006/0226231 A1 | 10/2006 | Johnston et al. |
| 2006/0227151 A1 | 10/2006 | Bannai |
| 2006/0256110 A1 | 11/2006 | Okuno et al. |
| 2006/0267889 A1 | 11/2006 | Kimura |
| 2006/0284791 A1 | 12/2006 | Chen et al. |
| 2007/0086668 A1 | 4/2007 | Ackley et al. |
| 2008/0005702 A1 | 1/2008 | Skourup et al. |
| 2008/0058629 A1 | 3/2008 | Seibel et al. |
| 2008/0059578 A1 | 3/2008 | Albertson et al. |
| 2008/0062131 A1 | 3/2008 | Chan et al. |
| 2008/0071559 A1 | 3/2008 | Arrasvuori |
| 2008/0186255 A1 | 8/2008 | Cohen et al. |
| 2008/0199049 A1 | 8/2008 | Daly |
| 2008/0215974 A1 | 9/2008 | Harrison et al. |
| 2008/0215975 A1 | 9/2008 | Harrison et al. |
| 2008/0215994 A1 | 9/2008 | Harrison et al. |
| 2008/0276178 A1 | 11/2008 | Fadell et al. |
| 2008/0278480 A1 | 11/2008 | Katano |
| 2009/0003662 A1 | 1/2009 | Joseph et al. |
| 2009/0066690 A1 | 3/2009 | Harrison |
| 2009/0089685 A1 | 4/2009 | Mordecai et al. |
| 2009/0147331 A1 | 6/2009 | Ashkenazi |
| 2009/0164916 A1 | 6/2009 | Jeong et al. |
| 2009/0177042 A1 | 7/2009 | Johnston |
| 2009/0187389 A1 | 7/2009 | Dobbins et al. |
| 2009/0213114 A1 | 8/2009 | Dobbins et al. |
| 2009/0222424 A1 | 9/2009 | Van |
| 2009/0225001 A1 | 9/2009 | Biocca et al. |
| 2009/0285484 A1 | 11/2009 | Mallinson et al. |
| 2009/0293012 A1 | 11/2009 | Alter et al. |
| 2009/0316116 A1 | 12/2009 | Melville et al. |
| 2009/0322671 A1 | 12/2009 | Scott et al. |
| 2010/0020216 A1 | 1/2010 | Christian et al. |
| 2010/0060647 A1 | 3/2010 | Brown et al. |
| 2010/0085462 A1 | 4/2010 | Sako et al. |
| 2010/0110368 A1 | 5/2010 | Chaum |
| 2010/0137684 A1 | 6/2010 | Shibasaki et al. |
| 2010/0141555 A1 | 6/2010 | Rorberg et al. |
| 2010/0149073 A1 | 6/2010 | Chaum et al. |
| 2010/0197390 A1 | 8/2010 | Craig et al. |
| 2010/0245954 A1 | 9/2010 | Ahling |
| 2010/0260426 A1 | 10/2010 | Huang et al. |
| 2010/0287500 A1 | 11/2010 | Whitlow et al. |
| 2011/0075902 A1 | 3/2011 | Song et al. |
| 2011/0096337 A1 | 4/2011 | Hirose et al. |
| 2011/0227812 A1 | 9/2011 | Haddick et al. |
| 2011/0234879 A1 | 9/2011 | Kashitani |
| 2011/0246908 A1 | 10/2011 | Akram et al. |
| 2011/0267361 A1 | 11/2011 | Kurozuka |
| 2011/0313653 A1 | 12/2011 | Lindner |
| 2012/0044431 A1 | 2/2012 | Osterman et al. |
| 2012/0050140 A1 | 3/2012 | Border et al. |

(56) References Cited

U.S. PATENT DOCUMENTS

| | | |
|---|---|---|
| 2012/0068913 A1 | 3/2012 | Bar-Zeev et al. |
| 2012/0086728 A1 | 4/2012 | Mcardle et al. |
| 2012/0087580 A1 | 4/2012 | Woo et al. |
| 2012/0089949 A1 | 4/2012 | Chen et al. |
| 2012/0092328 A1 | 4/2012 | Flaks et al. |
| 2012/0113092 A1 | 5/2012 | Bar-Zeev et al. |
| 2012/0120103 A1 | 5/2012 | Border et al. |
| 2012/0127062 A1 | 5/2012 | Bar-Zeev et al. |
| 2012/0127136 A1 | 5/2012 | Schneider et al. |
| 2012/0127284 A1 | 5/2012 | Bar-Zeev et al. |
| 2012/0147038 A1 | 6/2012 | Perez et al. |
| 2012/0154277 A1 | 6/2012 | Bar-Zeev et al. |
| 2012/0154557 A1 | 6/2012 | Perez et al. |
| 2012/0169752 A1 | 7/2012 | Kurozuka |
| 2012/0182313 A1 | 7/2012 | Ahn et al. |
| 2012/0183137 A1 | 7/2012 | Laughlin |
| 2012/0188148 A1 | 7/2012 | DeJong |
| 2012/0194554 A1 | 8/2012 | Kaino et al. |
| 2012/0200600 A1 | 8/2012 | Demaine |
| 2012/0206452 A1 | 8/2012 | Geisner et al. |
| 2012/0212399 A1 | 8/2012 | Border et al. |
| 2012/0218301 A1 | 8/2012 | Miller |
| 2012/0236262 A1 | 9/2012 | Johansson |
| 2012/0242560 A1 | 9/2012 | Nakada et al. |
| 2012/0244939 A1 | 9/2012 | Braun |
| 2012/0249586 A1 | 10/2012 | Wither et al. |
| 2012/0249797 A1 | 10/2012 | Haddick et al. |
| 2012/0327116 A1 | 12/2012 | Liu et al. |
| 2013/0021226 A1 | 1/2013 | Bell |
| 2013/0021373 A1 | 1/2013 | Vaught et al. |
| 2013/0042296 A1 | 2/2013 | Hastings et al. |
| 2013/0044128 A1 | 2/2013 | Liu et al. |
| 2013/0050186 A1 | 2/2013 | Large et al. |
| 2013/0050258 A1 | 2/2013 | Liu et al. |
| 2013/0050260 A1 | 2/2013 | Reitan |
| 2013/0050432 A1 | 2/2013 | Perez et al. |
| 2013/0050642 A1 | 2/2013 | Lewis et al. |
| 2013/0083011 A1 | 4/2013 | Geisner et al. |
| 2013/0083173 A1 | 4/2013 | Geisner et al. |
| 2013/0093788 A1 | 4/2013 | Liu et al. |
| 2013/0114043 A1 | 5/2013 | Balan et al. |
| 2013/0117377 A1 | 5/2013 | Miller |
| 2013/0120224 A1 | 5/2013 | Cajigas et al. |
| 2013/0120706 A1 | 5/2013 | Kakinuma et al. |
| 2013/0141419 A1 | 6/2013 | Mount et al. |
| 2013/0141434 A1 | 6/2013 | Sugden et al. |
| 2013/0156266 A1 | 6/2013 | Horii |
| 2013/0194164 A1 | 8/2013 | Sugden et al. |
| 2013/0208014 A1 | 8/2013 | Fleck et al. |
| 2013/0215230 A1 | 8/2013 | Miesnieks et al. |
| 2013/0249946 A1 | 9/2013 | Kimura |
| 2013/0257748 A1 | 10/2013 | Ambrus et al. |
| 2013/0286004 A1 | 10/2013 | McCulloch et al. |
| 2013/0293468 A1 | 11/2013 | Perez et al. |
| 2013/0307875 A1 | 11/2013 | Anderson |
| 2013/0335683 A1 | 12/2013 | Escuti et al. |
| 2013/0342564 A1 | 12/2013 | Kinnebrew et al. |
| 2013/0342569 A1 | 12/2013 | Karkkainen et al. |
| 2013/0342571 A1 | 12/2013 | Kinnebrew et al. |
| 2014/0002496 A1 | 1/2014 | Lamb et al. |
| 2014/0064557 A1 | 3/2014 | Hara et al. |
| 2014/0071163 A1 | 3/2014 | Kinnebrew et al. |
| 2014/0098137 A1 | 4/2014 | Fein et al. |
| 2014/0098425 A1 | 4/2014 | Schon et al. |
| 2014/0118829 A1 | 5/2014 | Ma et al. |
| 2014/0132484 A1 | 5/2014 | Pandey et al. |
| 2014/0139551 A1 | 5/2014 | McCulloch et al. |
| 2014/0145997 A1 | 5/2014 | Tiruvuru |
| 2014/0168035 A1 | 6/2014 | Luebke et al. |
| 2014/0168783 A1 | 6/2014 | Luebke et al. |
| 2014/0178029 A1 | 6/2014 | Raheman et al. |
| 2014/0192085 A1 | 7/2014 | Kim |
| 2014/0204077 A1 | 7/2014 | Kamuda et al. |
| 2014/0218361 A1 | 8/2014 | Abe et al. |
| 2014/0222432 A1 | 8/2014 | Ahn et al. |
| 2014/0267402 A1 | 9/2014 | Hing et al. |
| 2014/0354685 A1 | 12/2014 | Lazarow et al. |
| 2014/0368532 A1 | 12/2014 | Keane et al. |
| 2015/0097865 A1 | 4/2015 | Subramanian et al. |
| 2015/0177516 A1 | 6/2015 | Blonde et al. |
| 2015/0205126 A1 | 7/2015 | Schowengerdt |
| 2015/0206321 A1 | 7/2015 | Scavezze et al. |
| 2015/0248046 A1 | 9/2015 | Schowengerdt |
| 2015/0254793 A1 | 9/2015 | Hastings et al. |
| 2015/0301356 A1 | 10/2015 | Tabirian et al. |
| 2015/0309175 A1* | 10/2015 | Hinderling ............ G01S 7/4868 |
| | | 356/4.01 |
| 2016/0047956 A1 | 2/2016 | Tabirian et al. |
| 2016/0055822 A1 | 2/2016 | Bell |
| 2016/0063706 A1 | 3/2016 | Gonzalez-Banos et al. |
| 2016/0093106 A1 | 3/2016 | Black |
| 2016/0179336 A1 | 6/2016 | Ambrus et al. |
| 2016/0278695 A1* | 9/2016 | Wang ................... A61B 5/7445 |
| 2016/0314624 A1 | 10/2016 | Li et al. |
| 2016/0327798 A1 | 11/2016 | Xiao |
| 2017/0010469 A1 | 1/2017 | Samec et al. |
| 2017/0115491 A1 | 4/2017 | Shi et al. |
| 2017/0118829 A1 | 4/2017 | Hartman et al. |
| 2017/0168307 A1 | 6/2017 | Itani |
| 2017/0184848 A1 | 6/2017 | Vallius |
| 2017/0223344 A1 | 8/2017 | Kaehler |
| 2017/0323615 A1 | 11/2017 | Hazra et al. |
| 2018/0053284 A1 | 2/2018 | Rodriguez et al. |
| 2018/0129048 A1 | 5/2018 | Robbins et al. |
| 2018/0180890 A1 | 6/2018 | Baerenrodt et al. |
| 2018/0188528 A1 | 7/2018 | Browy et al. |
| 2018/0188536 A1 | 7/2018 | Bell et al. |
| 2018/0267222 A1* | 9/2018 | Ambur ................. G02B 27/145 |
| 2018/0314066 A1 | 11/2018 | Bell et al. |
| 2018/0356639 A1 | 12/2018 | Schaefer et al. |
| 2019/0088021 A1 | 3/2019 | Tanaka et al. |
| 2019/0265465 A1* | 8/2019 | Wong ................. B29D 11/0073 |
| 2020/0058256 A1 | 2/2020 | Seibert et al. |
| 2020/0074724 A1 | 3/2020 | Mathur et al. |
| 2020/0379334 A1* | 12/2020 | McDowall ........... H04N 13/218 |
| 2021/0286183 A1* | 9/2021 | Ouderkirk .......... G02B 27/0068 |
| 2021/0297560 A1* | 9/2021 | Luna ..................... A61B 34/77 |
| 2022/0011578 A1* | 1/2022 | Sinay ................. G02B 27/4205 |
| 2022/0128352 A1* | 4/2022 | Binder ................. G01B 11/026 |
| 2022/0146888 A1 | 5/2022 | Oh et al. |
| 2023/0079929 A1* | 3/2023 | Bradski ................ H04N 13/204 |
| | | 385/37 |

FOREIGN PATENT DOCUMENTS

| | | |
|---|---|---|
| CN | 106662747 A | 5/2017 |
| CN | 107376349 A | 11/2017 |
| CN | 112639579 | 4/2021 |
| EP | 2649485 | 10/2013 |
| EP | 3844559 | 7/2021 |
| EP | 3914959 A1 | 12/2021 |
| JP | 6010224 A | 1/1985 |
| JP | 08160340 A | 6/1996 |
| JP | 2002110511 A | 4/2002 |
| JP | 2006293604 | 10/2006 |
| JP | 2007240709 A | 9/2007 |
| JP | 2008242134 A | 10/2008 |
| JP | 2011175439 | 9/2011 |
| JP | 2012505430 A | 3/2012 |
| JP | 2013513818 A | 4/2013 |
| JP | 2013538368 A | 10/2013 |
| JP | 2014505899 A | 3/2014 |
| JP | 2016519327 A | 6/2016 |
| KR | 20110084212 A | 7/2011 |
| WO | 2005124431 A1 | 12/2005 |
| WO | 2010042089 A1 | 4/2010 |
| WO | 2011070139 A1 | 6/2011 |
| WO | 2012020527 | 2/2012 |
| WO | 2012078410 | 6/2012 |
| WO | 2014159045 A1 | 10/2014 |
| WO | 2016181108 A1 | 11/2016 |
| WO | 2017176898 A1 | 10/2017 |

(56) References Cited

FOREIGN PATENT DOCUMENTS

| | | |
|---|---|---|
| WO | 2018119276 A1 | 6/2018 |
| WO | 2020047486 | 3/2020 |
| WO | 2020146760 | 7/2020 |

OTHER PUBLICATIONS

U.S. Appl. No. 14/702,707, Final Office Action, dated Mar. 1, 2018, 25 pages.
U.S. Appl. No. 14/702,707, Notice of Allowance, dated Oct. 12, 2018, 8 pages.
U.S. Appl. No. 14/702,709, Non-Final Office Action, dated Aug. 24, 2017, 20 pages.
U.S. Appl. No. 14/702,709, Notice of Allowance, dated Oct. 3, 2018, 2 pages.
U.S. Appl. No. 14/702,710, Final Office Action, dated May 2, 2018, 14 pages.
U.S. Appl. No. 14/702,710, Non-Final Office Action, dated Nov. 2, 2017, 15 pages.
U.S. Appl. No. 14/702,736, Final Office Action, dated May 18, 2018, 50 pages.
U.S. Appl. No. 14/702,736, Non-Final Office Action, dated Nov. 3, 2016, 31 pages.
U.S. Appl. No. 14/702,736, Non-Final Office Action, dated Oct. 1, 2018, 45 pages.
U.S. Appl. No. 14/702,736, Non-Final Office Action, dated Dec. 28, 2017, 58 pages.
U.S. Appl. No. 14/702,739, Final Office Action, dated Nov. 28, 2016, 25 pages.
U.S. Appl. No. 14/702,739, Final Office Action, dated Oct. 25, 2017, 29 pages.
U.S. Appl. No. 14/702,739, Non-Final Office Action, dated Mar. 15, 2018, 26 pages.
U.S. Appl. No. 14/703,854, Final Office Action, dated Jan. 13, 2017, 18 pages.
U.S. Appl. No. 14/703,854, Final Office Action, dated Nov. 30, 2017, 19 pages.
U.S. Appl. No. 14/703,854, Non-Final Office Action, dated Aug. 10, 2018, 14 pages.
U.S. Appl. No. 14/703,854, "Notice of Appeal", dated Feb. 28, 2018, 3 pages.
U.S. Appl. No. 14/703,863, Non-Final Office Action, dated Nov. 21, 2016, 14 pages.
U.S. Appl. No. 14/703,867, Advisory Action, dated Sep. 22, 2017, 4 pages.
U.S. Appl. No. 14/703,867, Non-Final Office Action, dated Nov. 16, 2017, 28 pages.
U.S. Appl. No. 14/703,871, Final Office Action, dated Nov. 30, 2017, 18 pages.
U.S. Appl. No. 14/704,971, Final Office Action, dated Mar. 14, 2018, 50 pages.
U.S. Appl. No. 14/704,971, Non-Final Office Action, dated Aug. 28, 2018, 40 pages.
U.S. Appl. No. 14/704,971, Non-Final Office Action, dated Oct. 26, 2017, 44 pages.
U.S. Appl. No. 14/704,974, Advisory Action, dated Jun. 6, 2018, 23 pages.
U.S. Appl. No. 14/704,974, Final Office Action, dated Mar. 20, 2017, 13 pages.
U.S. Appl. No. 14/704,974, "Notice of Appeal", dated Jun. 6, 2018, 2 pages.
U.S. Appl. No. 14/704,975, Final Office Action, dated Apr. 24, 2018, 18 pages.
U.S. Appl. No. 14/704,975, Non-Final Office Action, dated Feb. 8, 2017, 15 pages.
U.S. Appl. No. 14/704,975, Non-Final Office Action, dated Dec. 21, 2017, 16 pages.
U.S. Appl. No. 14/704,975, Non-Final Office Action, dated Sep. 27, 2018, 23 pages.
U.S. Appl. No. 14/704,976, Final Office Action, dated Dec. 27, 2016, 24 pages.
U.S. Appl. No. 14/704,976, Final Office Action, dated Dec. 1, 2017, 48 pages.
U.S. Appl. No. 14/704,976, Final Office Action, dated Sep. 27, 2018, 53 pages.
U.S. Appl. No. 14/704,976, Non-Final Office Action, dated Jun. 7, 2018, 57 pages.
U.S. Appl. No. 14/704,979, Final Office Action, dated Sep. 27, 2017, 26 pages.
U.S. Appl. No. 14/704,979, Non-Final Office Action, dated Mar. 14, 2018, 23 pages.
U.S. Appl. No. 14/704,981, Non-Final Office Action, dated Oct. 12, 2017, 47 pages.
U.S. Appl. No. 17/330,146, Non-Final Office Action, dated Feb. 16, 2022, 38 pages.
Application No. AU2014248874, Office Action, dated Jul. 25, 2018, 3 pages.
Application No. AU2018284089, "First Examination Report", dated Apr. 21, 2022, 3 pages.
Application No. EP14778352.6, Extended European Search Report, dated Jan. 11, 2017, 13 pages.
Application No. EP20738194.8, Extended European Search Report, dated Feb. 7, 2022, 10 pages.
Application No. IN201947053419, "Examination Report", dated Feb. 25, 2022, 6 pages.
Application No. IN202047018987, "Examination Report", dated Mar. 29, 2022, 5 pages.
Application No. JP2019-568041, Office Action, dated Apr. 27, 2022, 6 pages [no translation avaible].
Roscher et al., "Low-Cost Projection Device with A 2D Resonant Microscanning Mirror", MOEMS Display and Imaging Systems II, vol. 5348, Jan. 24, 2004, pp. 22-31.
U.S. Appl. No. 17/330,146, "Notice of Allowance", dated May 27, 2022, 5 pages.
CN201980056636.9, "Office Action" and English translation, dated Sep. 2, 2022, 11 pages.
Lee et al., "Recent Progress in Pancharatnam-berry Phase Optical Elements and the Applications for Virtual/augmented Realities", Optical Data Processing and Storage, vol. 3, No. 1, 2017, pp. 79-88.
Aronoff et al., "Collaborative Augmented Reality for Better Standards", Complex Systems Concurrent Engineering, 2007, 8 pages.
Azuma, "A Survey of Augmented Reality", in Presence: Teleoperators and Virtual Environment, vol. 6, Aug. 1997, pp. 355-385.
Bimber et al., "Spatial Augmented Reality", Merging Real and Virtual Worlds, 2005, 393 pages.
Chen et al., "Electrically Adjustable Location of a Projected Image in Augmented Reality Via a Liquid-Crystal Lens", Optics Express, vol. 23, No. 22, Nov. 2015, 9 pages.
Application No. EP19854491.8, Extended European Search Report, dated Sep. 24, 2021, 8 pages.
Freeman et al., "Scanned Laser Pico-Projectors: Seeing the Big Picture with a Small Device", Optics and Photonics News, vol. 20, Issue 5, May 2009, pp. 28-34.
Application No. PCT/US2014/023739, International Search Report and Written Opinion, dated Sep. 9, 2014, 13 pages.
Application No. PCT/US2020/013130, International Preliminary Report on Patentability, dated Jul. 22, 2021, 12 pages.
Application No. PCT/US2020/013130, International Search Report and Written Opinion, dated May 22, 2020, 15 pages.
PCT/US2020/013130, "Invitation to Pay Additional Fees and, Where Applicable, Protest Fee", dated Mar. 10, 2020, 2 pages.
Application No. CN201980056636.9, "Office Action", dated Apr. 22, 2023, 4 pages. [no translation available].
Application No. EP19854491.8, "Intention to Grant", dated Apr. 11, 2023, 8 pages.
U.S. Appl. No. 18/140,783, "Non-Final Office Action", dated Nov. 8, 2023, 33 pages.
Japanese Patent Application No. 2021-510460, "Office Action" and English translation, dated Sep. 13, 2023, 8 pages.
EP23199283.5, "Extended European Search Report", dated Dec. 20, 2023, 9 pages.

(56) References Cited

OTHER PUBLICATIONS

U.S. Appl. No. 18/140,783, "Final Office Action", Feb. 7, 2024, 38 pages.
EP20738194.8, "Office Action", Feb. 5, 2024, 6 pages.
JP2021-510460, "Office Action", and English translation, Feb. 9, 2024, 5 pages.
JP2021-539627, "Office Action" and English translation, Jan. 4, 2024, 5 pages.

* cited by examiner

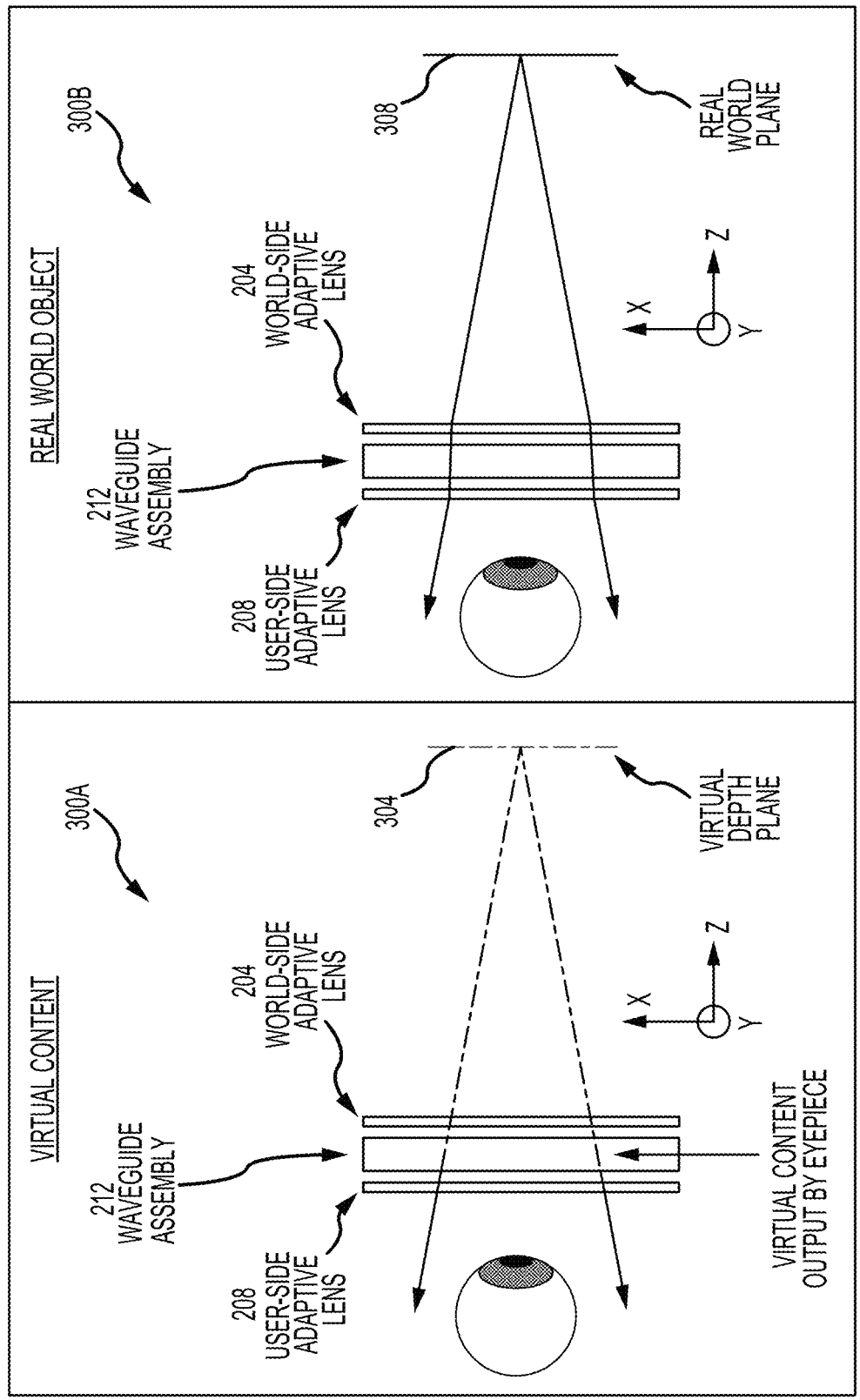

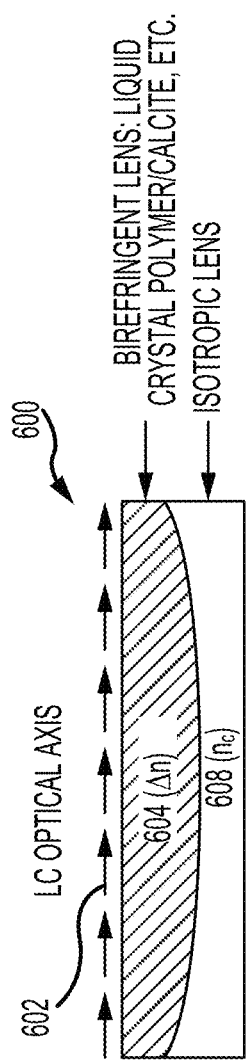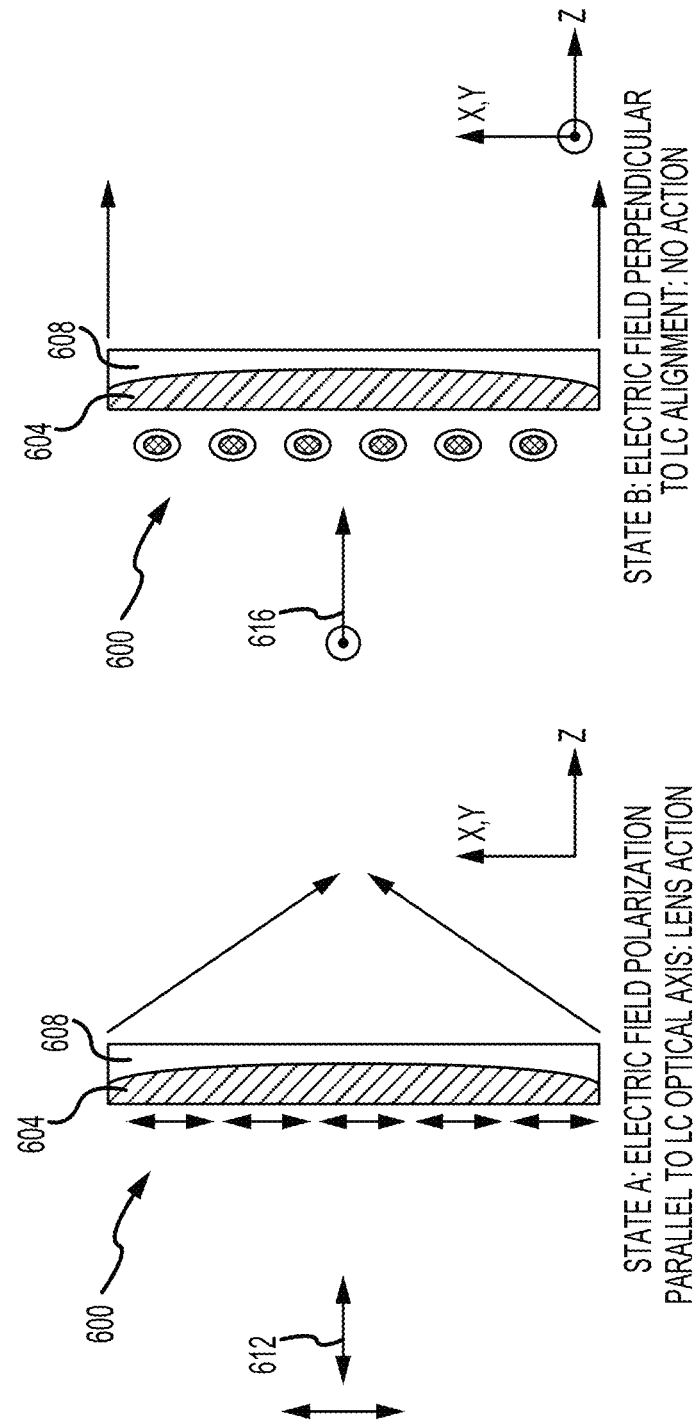

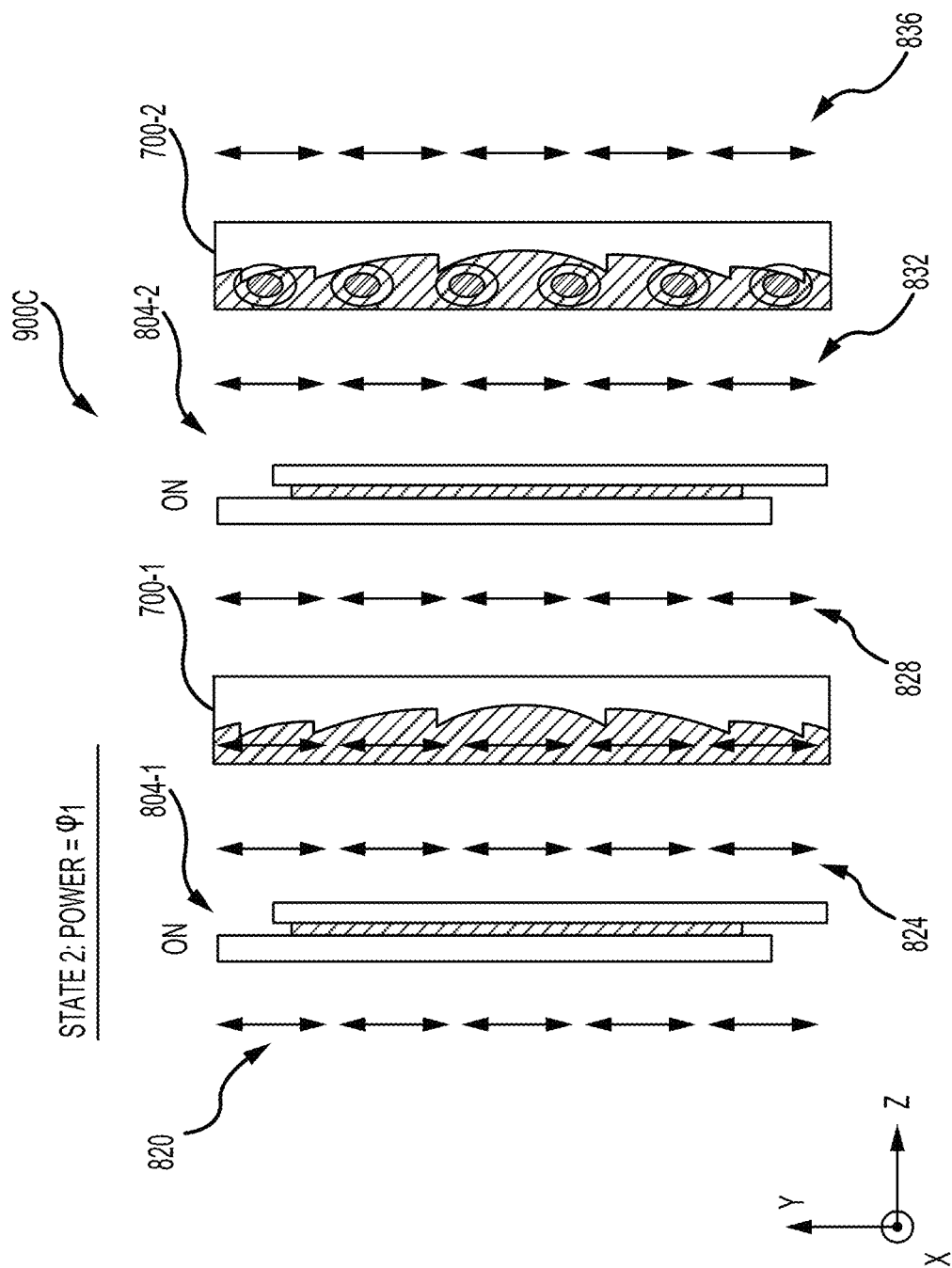

TIME-MULTIPLEXED DISPLAY OF VIRTUAL CONTENT AT VARIOUS DEPTHS

CROSS-REFERENCES TO RELATED APPLICATIONS

This application is a continuation of International Patent Application No. PCT/US2020/013130 filed Jan. 10, 2020, entitled "TIME-MULTIPLEXED DISPLAY OF VIRTUAL CONTENT AT VARIOUS DEPTHS," which claims the benefit of and priority to U.S. Provisional Patent Application No. 62/791,441, filed Jan. 11, 2019, entitled "TIME-MULTIPLEXED DISPLAY OF VIRTUAL CONTENT AT VARIOUS DEPTHS," the entire disclosures of which are hereby incorporated by reference, for all purposes, as if fully set forth herein.

BACKGROUND OF THE INVENTION

Modern computing and display technologies have facilitated the development of systems for so called "virtual reality" or "augmented reality" experiences, wherein digitally reproduced images or portions thereof are presented to a user in a manner wherein they seem to be, or may be perceived as, real. A virtual reality, or "VR," scenario typically involves presentation of digital or virtual image information without transparency to other actual real-world visual input; an augmented reality, or "AR," scenario typically involves presentation of digital or virtual image information as an augmentation to visualization of the actual world around the user.

Despite the progress made in these display technologies, there is a need in the art for improved methods, systems, and devices related to augmented reality systems, particularly, display systems.

SUMMARY OF THE INVENTION

The present disclosure relates generally to techniques for improving the performance and user experience of optical systems. More particularly, embodiments of the present disclosure provide systems and methods for operating an augmented reality (AR) device comprising adaptive lens assemblies and/or shutter elements for displaying virtual content at various depths. Although the present disclosure is described in reference to an AR device, the disclosure is applicable to a variety of applications in computer vision and image display systems. A summary of the present disclosure is provided below in reference to a series of examples.

Example 1 is a method of operating an optical system, the method comprising: receiving, at the optical system, light associated with a world object; linearly polarizing, by a world-side polarizer of the optical system, the light associated with the world object along a first axis; when the optical system is operating in accordance with a first state: rotating, by a world-side switchable waveplate of the optical system, a polarization of the light associated with the world object by 90 degrees; linearly polarizing, by a user-side polarizer of the optical system, the light associated with the world object along a second axis perpendicular to the first axis; applying zero net optical power, by a lens assembly of the optical system, to the light associated with the world object; when the optical system is operating in accordance with a second state: projecting, by a projector of the optical system, light associated with a virtual image onto an eyepiece of the optical system; outcoupling, by the eyepiece, the light associated with the virtual image toward the user-side polarizer; linearly polarizing, by the user-side polarizer, the light associated with the world object and the light associated with the virtual image along the second axis; rotating, by a user-side switchable waveplate, a polarization of the light associated with the virtual image by 90 degrees; and applying non-zero net optical power, by the lens assembly, to the light associated with the virtual image; wherein the optical system is operating in accordance with the first state when the world-side switchable waveplate is electrically activated and the user-side switchable waveplate is not electrically activated; wherein the optical system is operating in accordance with the second state when the user-side switchable waveplate is electrically activated and the world-side switchable waveplate is not electrically activated; wherein the world-side polarizer is coupled to the world-side switchable waveplate; wherein the world-side switchable waveplate is coupled to the eyepiece at a world side of the eyepiece; wherein the user-side polarizer is coupled to the eyepiece at a user side of the eyepiece; wherein the lens assembly is coupled to the user-side polarizer; wherein the user-side switchable waveplate is positioned between two layers of the lens assembly.

Example 2 is an optical system comprising: a world-side polarizer configured to linearly polarize light associated with a world object along a first axis; a world-side switchable waveplate coupled to the world-side polarizer and configured to rotate a polarization of the light associated with the world object by 90 degrees when the optical system is operating in accordance with a first state; an eyepiece coupled to the world-side switchable waveplate; a projector configured to project light associated with a virtual image onto an eyepiece when the optical system is operating in accordance with a second state; a user-side polarizer coupled to the eyepiece and configured to: linearly polarize the light associated with the world object along a second axis perpendicular to the first axis when the optical system is operating in accordance with the first state; and linearly polarize the light associated with the world object and the light associated with the virtual image along the second axis when the optical system is operating in accordance with the second state; a lens assembly coupled to the user-side polarizer and configured to: apply zero net optical power to the light associated with the world object when the optical system is operating in accordance with the first state; and apply non-zero net optical power to the light associated with the virtual image when the optical system is operating in accordance with the second state; and a user-side switchable waveplate positioned between two layers of the lens assembly and configured to rotate a polarization of the light associated with the virtual image by 90 degrees when the optical system is operating in accordance with the second state.

Example 3 is a method of operating an optical system, the method comprising: receiving, at the optical system, light associated with a world object; linearly polarizing, by one or more world-side shutter elements of the optical system, the light associated with the world object along a first axis; when the optical system is operating in accordance with a first state: rotating, by the one or more world-side shutter elements, a polarization of the light associated with the world object by 90 degrees; linearly polarizing, by one or more user-side shutter elements of the optical system, the light associated with the world object along a second axis perpendicular to the first axis; when the optical system is operating in accordance with a second state: projecting, by a projector of the optical system, light associated with a virtual image onto an eyepiece of the optical system; linearly polarizing, by the one or more user-side shutter elements, the light associated with the world object and the light associated with the virtual image along the second axis; and rotating, by the one or more user-side shutter elements, a polarization of the light associated with the virtual image by 90 degrees.

Example 4 is the method of example(s) 3, further comprising: applying zero net optical power, by a lens assembly of the optical system, to the light associated with the world object when the optical system is operating in accordance with the first state.

Example 5 is the method of example(s) 3, further comprising: applying non-zero net optical power, by a lens assembly of the optical system, to the light associated with the virtual image when the optical system is operating in accordance with the second state.

Example 6 is the method of example(s) 3, further comprising: outcoupling, by the eyepiece, the light associated with the virtual image toward the one or more user-side shutter elements when the optical system is operating in accordance with the second state.

Example 7 is the method of example(s) 3, wherein the one or more world-side shutter elements includes: a world-side polarizer; and a world-side switchable waveplate.

Example 8 is the method of example(s) 7, wherein the one or more user-side shutter elements includes: a user-side polarizer; and a user-side switchable waveplate.

Example 9 is the method of example(s) 8, wherein the optical system includes a lens assembly.

Example 10 is the method of example(s) 9, wherein the optical system is operating in accordance with the first state when the world-side switchable waveplate is electrically activated and the user-side switchable waveplate is not electrically activated.

Example 11 is the method of example(s) 9, wherein the optical system is operating in accordance with the second state when the user-side switchable waveplate is electrically activated and the world-side switchable waveplate is not electrically activated.

Example 12 is the method of example(s) 9, wherein the world-side polarizer is coupled to the world-side switchable waveplate.

Example 13 is the method of example(s) 9, wherein the world-side switchable waveplate is coupled to the eyepiece at a world side of the eyepiece.

Example 14 is the method of example(s) 9, wherein the user-side polarizer is coupled to the eyepiece at a user side of the eyepiece.

Example 15 is the method of example(s) 9, wherein the lens assembly is coupled to the user-side polarizer.

Example 16 is the method of example(s) 9, wherein the user-side switchable waveplate is positioned between two layers of the lens assembly.

Example 17 is an optical system comprising: one or more world-side shutter elements configured to: linearly polarize light associated with a world object along a first axis; and rotate a polarization of the light associated with the world object by 90 degrees when the optical system is operating in accordance with a first state; an eyepiece coupled to the one or more world-side shutter elements; a projector configured to project light associated with a virtual image onto the eyepiece when the optical system is operating in accordance with a second state; and one or more user-side shutter elements coupled to the eyepiece and configured to: linearly polarize the light associated with the world object along a second axis perpendicular to the first axis when the optical system is operating in accordance with the first state; linearly polarize the light associated with the world object and the light associated with the virtual image along the second axis when the optical system is operating in accordance with the second state; and rotate a polarization of the light associated with the virtual image by 90 degrees when the optical system is operating in accordance with the second state.

Example 18 is the optical system of example(s) 17, further comprising: a lens assembly coupled to the one or more user-side shutter elements.

Example 19 is the optical system of example(s) 18, wherein the lens assembly is configured to apply zero net optical power to the light associated with the world object when the optical system is operating in accordance with the first state.

Example 20 is the optical system of example(s) 18, wherein the lens assembly is configured to apply non-zero net optical power to the light associated with the virtual image when the optical system is operating in accordance with the second state.

Example 21 is the optical system of example(s) 17, wherein the eyepiece is configured to outcouple the light associated with the virtual image toward the one or more user-side shutter elements when the optical system is operating in accordance with the second state.

Example 22 is the optical system of example(s) 17, wherein the one or more world-side shutter elements includes: a world-side polarizer; and a world-side switchable waveplate.

Example 23 is the optical system of example(s) 22, wherein the one or more user-side shutter elements includes: a user-side polarizer; and a user-side switchable waveplate.

Example 24 is the optical system of example(s) 23, wherein the optical system is operating in accordance with the first state when the world-side switchable waveplate is electrically activated and the user-side switchable waveplate is not electrically activated.

Example 25 is the optical system of example(s) 23, wherein the optical system is operating in accordance with the second state when the user-side switchable waveplate is electrically activated and the world-side switchable waveplate is not electrically activated.

Example 26 is the optical system of example(s) 23, wherein the world-side polarizer is coupled to the world-side switchable waveplate.

Example 27 is the optical system of example(s) 23, wherein the world-side switchable waveplate is coupled to the eyepiece at a world side of the eyepiece.

Example 28 is the optical system of example(s) 23, wherein the user-side polarizer is coupled to the eyepiece at a user side of the eyepiece.

Example 29 is the optical system of example(s) 23, wherein the lens assembly is coupled to the user-side polarizer.

Example 30 is the optical system of example(s) 23, wherein the user-side switchable waveplate is positioned between two layers of the lens assembly.

Example 31 is a display device comprising: a waveguide assembly configured to guide light in a lateral direction parallel to an output surface of the waveguide assembly, the waveguide assembly further configured to outcouple the guided light through the output surface; and an adaptive lens assembly disposed on a first side of the waveguide assembly, the adaptive lens assembly disposed to receive outcoupled light from the waveguide assembly and to be selectively switched between a plurality of states having different optical powers, wherein the adaptive lens assembly comprises a lens stack configured to exert polarization-dependent optical power to linearly polarized light, the lens stack comprising a birefringent lens and an isotropic lens contacting each other, wherein contacting surfaces of the birefringent lens and the isotropic lens form a conformal interface.

Example 32 is the display device of example(s) 31, further comprising: a second adaptive lens assembly disposed on a second side of the waveguide assembly opposite the first side, the second adaptive lens assembly configured to be selectively switched between a plurality of states having different optical powers and comprising: a second lens stack configured to exert polarization-dependent optical power to linearly polarized light, wherein the second lens stack comprises a second birefringent lens and a second isotropic lens contacting each other to form a conformal interface therebetween.

Example 33 is the display device of example(s) 32, wherein each of the first and second adaptive lens assemblies further comprises a switchable half waveplate comprising twisted nematic (TN) liquid crystals (LCs) optically coupled to a respective one of the lens stack or the second lens stack, wherein the switchable half waveplate is configured to preserve a polarization of linear polarized light passing therethrough when deactivated and to alter the polarization of linear polarized light passing therethrough when activated.

Example 34 is the display device of example(s) 33, further comprising on a second side opposite the first side of the waveguide assembly: a shutter configured to temporally alternatingly block and pass light indent thereon; and a linear polarizer.

Example 35 is the display device of example(s) 34, wherein the waveguide assembly comprises cholesteric liquid crystals and configured to outcouple circularly polarized light.

Example 36 is the display device of example(s) 35, wherein the waveguide assembly is interposed by a pair of quarter waveplates.

Example 37 is an optical system comprising: a projector configured to emit light; at least one waveguide optically coupled to the projector and configured to receive and redirect light therefrom toward a user; a shutter assembly comprising at least one component positioned adjacent to the at least one waveguide, wherein the shutter assembly is controllable to allow a variable amount of ambient light from an environment of the user to pass therethrough toward the user; an adaptive lens assembly positioned between the at least one waveguide and the user, wherein the adaptive lens assembly is controllable to impart a variable amount of optical power to light passing therethrough toward the user; and control circuitry communicatively coupled to the projector, the shutter assembly, and the adaptive lens assembly, wherein the control circuitry is configured to cause the shutter assembly and the adaptive lens assembly to synchronously switch between two or more states comprising: a first state in which the shutter assembly is configured to allow a first amount of ambient light from the environment of the user to pass therethrough toward the user and the adaptive lens assembly is configured to impart a first amount of optical power to light passing therethrough; and a second state in which the shutter assembly is configured to allow a second amount of ambient light from the environment of the user to pass therethrough toward the user and the adaptive lens assembly is configured to impart a second amount of optical power to light passing therethrough, wherein the second amount of ambient light is less than the first amount of ambient light and the second amount of optical power is greater than the first amount of optical power.

Example 38 is the optical system of example(s) 37, wherein the first amount of ambient light comprises a maximum amount of ambient light from the environment of the user to which the shutter assembly is configured to allow to pass therethrough toward the user and the first amount of optical power comprises a minimum amount of optical power to which the adaptive lens assembly is configured to impart to light passing therethrough.

Example 39 is the optical system of any of example(s)s 37 or 38, wherein, in the second state, the control circuitry is configured to cause the projector to emit light representing virtual content that is to be perceived by the user as being positioned at a first depth in front of the user.

Example 40 is the optical system of example(s) 39, wherein the control circuitry is configured to determine the second amount of ambient light and the second amount of optical power based on the first depth in front of the user at which virtual content is to be perceived by the user.

Example 41 is the optical system of example(s) 39, wherein, in the first state, the control circuitry is configured to cause the projector to emit light representing virtual content that is to be perceived by the user as being positioned at a second depth in front of the user, the second depth being greater than the first depth.

Example 42 is the optical system of example(s) 41, wherein the second depth is substantially equivalent to optical infinity.

Example 43 is the optical system of example(s) 39, wherein, in the first state, the control circuitry is configured to cause the projector to not emit light.

Example 44 is the optical system of any of example(s)s 37 or 38, wherein the control circuitry is configured to cause the shutter assembly and the adaptive lens assembly to synchronously switch between the two or more states at a rate greater than or equal to a minimum switching frequency.

Example 45 is the optical system of example(s) 44, wherein the minimum switching frequency is 120 Hz.

Example 46 is the optical system of example(s) 44, further comprising: an ambient light sensor configured to measure an intensity of ambient light from the environment of the user; wherein the control circuitry is communicatively coupled to the ambient light sensor and further configured to determine the rate at which to cause the shutter assembly and the adaptive lens assembly to synchronously switch between the two or more states based on data received from the ambient light sensor.

Example 47 is the optical system of example(s) 38, wherein the minimum amount of optical power to which the adaptive lens assembly is configured to impart to light passing therethrough is about zero.

Example 48 is the optical system of any of the above examples, wherein the second amount of ambient light comprises a minimum amount of ambient light from the environment of the user to which the shutter assembly is configured to allow to pass therethrough toward the user and the second amount of optical power comprises a maximum amount of optical power to which the adaptive lens assembly is configured to impart to light passing therethrough.

Example 49 is an optical system comprising: a projector configured to emit light; at least one waveguide optically coupled to the projector and configured to receive and redirect light therefrom toward a user; a shutter assembly comprising at least one component positioned adjacent to the at least one waveguide, wherein the shutter assembly is controllable to allow a variable amount of ambient light from an environment of the user to pass therethrough toward the user; an adaptive lens assembly positioned between the at least one waveguide and the user, wherein the adaptive lens assembly is controllable to impart a variable amount of optical power to light passing therethrough toward the user; and control circuitry communicatively coupled to the projector, the shutter assembly, and the adaptive lens assembly, wherein the control circuitry is configured to synchronously: cause the adaptive lens assembly to vary the amount of optical power imparted to light passing therethrough toward the user; and cause the shutter assembly to vary the amount of ambient light from the environment of the user allowed to pass therethrough toward the user inversely with the amount of optical power imparted by the adaptive lens assembly to light passing therethrough.

Example 50 is the optical system of any of the above examples, wherein the at least one waveguide is further configured to allow ambient light from the environment of the user to pass therethrough toward the user.

Example 51 is the optical system of any of the examples above, wherein the at least one component of the shutter assembly comprises at least one component positioned between the at least one waveguide and the environment of the user.

Example 52 is the optical system of any of the examples above, wherein the at least one component of the shutter assembly comprises at least one component positioned between the at least one waveguide and the user.

Example 53 is the optical system of any of the examples above, wherein the at least one component of the shutter assembly comprises at least one component positioned between the at least one waveguide and the adaptive lens assembly.

Example 54 is the optical system of any of the above examples, wherein the at least one waveguide comprises a plurality of waveguides.

Example 55 is a non-transitory computer-readable medium storing instructions that, when executed by one or more processors, cause the one or more processors to at least in part perform the methods of any of the above examples.

Example 56 is an optical system comprising: a projector configured to emit light; at least one waveguide optically coupled to the projector and configured to receive and redirect light therefrom toward a user; a shutter assembly comprising at least one component positioned adjacent to the at least one waveguide, wherein the shutter assembly is selectively switchable between different states in which the shutter assembly is configured to allow different amounts of ambient light from an environment of the user to pass therethrough toward the user, respectively; an adaptive lens assembly positioned between the at least one waveguide and the user, wherein the adaptive lens assembly is selectively switchable between different states in which the adaptive lens is configured to impart different amounts of wavefront divergence to light passing therethrough toward the user, respectively; and control circuitry communicatively coupled to the projector, the shutter assembly, and the adaptive lens assembly.

Example 57 is the optical system of example 56, wherein the control circuitry is configured to cause the shutter assembly and the adaptive lens assembly to synchronously switch between two or more states at a particular rate, the two or more states comprising: a first state in which the shutter assembly is configured to allow a first amount of ambient light from the environment of the user to pass therethrough toward the user and the adaptive lens assembly is configured to impart a first amount of wavefront divergence to light passing therethrough; and a second state in which the shutter assembly is configured to allow a second amount of ambient light from the environment of the user to pass therethrough toward the user and the adaptive lens assembly is configured to impart a second amount of wavefront divergence to light passing therethrough, wherein the second amount of ambient light is different from the first amount of ambient light and the second amount of wavefront divergence is different from the first amount of wavefront divergence.

Example 58 is the optical system of example 57, wherein the particular rate at which to cause the shutter assembly and the adaptive lens assembly to synchronously switch between the two or more states comprises a rate greater than or equal to a minimum switching frequency.

Example 59 is the optical system of examples 57 or 58 further comprising an ambient light sensor configured to measure an intensity of ambient light from the environment of the user, wherein the control circuitry is communicatively coupled to the ambient light sensor and further configured to determine the particular rate at which to cause the shutter assembly and the adaptive lens assembly to synchronously switch between the two or more states based on data received from the ambient light sensor.

Example 60 is the optical system of examples 58 or 59, wherein the minimum switching frequency is 120 Hz.

Example 61 is the optical system of example 57, wherein the first amount of ambient light comprises a maximum amount of ambient light from the environment of the user to which the shutter assembly is configured to allow to pass therethrough toward the user and the first amount of wavefront divergence comprises a minimum amount of wavefront divergence to which the adaptive lens assembly is configured to impart to light passing therethrough.

Example 62 is the optical system of any of examples 57 or 61, wherein, in the second state, the control circuitry is configured to cause the projector to emit light representing virtual content that is to be perceived by the user as being positioned at a first depth in front of the user.

Example 63 is the optical system of example 62, wherein the control circuitry is configured to determine at least one of the second amount of ambient light and the second amount of wavefront divergence based on the first depth in front of the user at which virtual content is to be perceived by the user.

Example 64 is the optical system of example 62, wherein, in the first state, the control circuitry is configured to cause the projector to emit light representing virtual content that is to be perceived by the user as being positioned at a second depth in front of the user, the second depth being greater than the first depth.

Example 65 is the optical system of example 64, wherein the second depth is substantially equivalent to optical infinity.

Example 66 is the optical system of example 62, wherein, in the first state, the control circuitry is configured to cause the projector to not emit light.

Example 67 is the optical system of example 61, wherein the minimum amount of wavefront divergence to which the adaptive lens assembly is configured to impart to light passing therethrough is about zero.

Example 68 is the optical system of claim 57, wherein the second amount of ambient light is less than the first amount of ambient light and the second amount of wavefront divergence is greater than the first amount of wavefront divergence.

Example 69 is the optical system of any of the above examples, wherein the second amount of ambient light comprises a minimum amount of ambient light from the environment of the user to which the shutter assembly is configured to allow to pass therethrough toward the user and the second amount of wavefront divergence comprises a maximum amount of wavefront divergence to which the adaptive lens assembly is configured to impart to light passing therethrough.

Example 70 is the optical system of example 56, wherein the control circuitry is configured to cause the shutter assembly and the adaptive lens assembly to synchronously switch between different states in a manner yielding an inverse relationship between the amount of ambient light from the environment of the user allowed by the shutter assembly to pass therethrough toward the user and the amount of wavefront divergence imparted by the adaptive lens assembly to light passing therethrough toward the user.

Example 71 is the optical system of example 56, wherein the control circuitry is configured to alternate between at least two different modes of operation comprising: a first mode of operation in which the control circuitry is configured to control a state of the shutter assembly and a state of the adaptive lens assembly in an asynchronous manner; and a second mode of operation in which the control circuitry is configured to control the state of the shutter assembly and the state of the adaptive lens assembly in a synchronous manner.

Example 72 is the optical system of example 71, wherein, in the second mode of operation, the control circuitry is configured to cause the shutter assembly and the adaptive lens assembly to synchronously switch between two or more states comprising: a first state in which the shutter assembly is configured to allow a first amount of ambient light from the environment of the user to pass therethrough toward the user and the adaptive lens assembly is configured to impart a first amount of wavefront divergence to light passing therethrough; and a second state in which the shutter assembly is configured to allow a second amount of ambient light from the environment of the user to pass therethrough toward the user and the adaptive lens assembly is configured to impart a second amount of wavefront divergence to light passing therethrough, wherein the second amount of ambient light is different from the first amount of ambient light and the second amount of wavefront divergence is different from the first amount of wavefront divergence.

Example 73 is the optical system of example 71 further comprising one or more cameras configured to capture images of one or both of the user's eyes, wherein the control circuitry is communicatively coupled to the one or more cameras and further configured to alternate between the at least two different modes of operation based at least in part on data received from the one or more cameras.

Example 74 is the optical system of example 73, wherein the control circuitry is further configured to: determine a depth at which the user's eyes are fixated based on data received from the one or more cameras; and alternate between the at least two different modes of operation based at least in part on the depth at which the user's eyes are determined to be fixated.

Example 75 is the optical system of example 71, wherein the control circuitry is further configured to cause the projector to emit light representing virtual content.

Example 76 is the optical system of example 75, wherein the control circuitry is further configured to: determine whether an accommodation-vergence mismatch for the virtual content exceeds a threshold; and alternate between the at least two different modes of operation in response to a determination that the accommodation-vergence mismatch for the virtual content exceeds the threshold.

Example 77 is the optical system of example 75, wherein the control circuitry is further configured to alternate between the at least two different modes of operation based at least in part on a depth in front of the user at which the virtual content is to be perceived by the user.

Example 78 is the optical system of example 71, wherein, in the first mode of operation, the control circuitry is configured to cause the state of at least one of the shutter assembly and the adaptive lens assembly to remain substantially fixed.

Example 79 is the optical system of any of the above examples, wherein the at least one waveguide is further configured to allow ambient light from the environment of the user to pass therethrough toward the user.

Example 80 is the optical system of any of the above examples, wherein the at least one component of the shutter assembly comprises at least one component positioned between the at least one waveguide and the environment of the user.

Example 81 is the optical system of any of the above examples, wherein the at least one component of the shutter assembly comprises at least one component positioned between the at least one waveguide and the user.

Example 82 is the optical system of any of the above examples, wherein the at least one component of the shutter assembly comprises at least one component positioned between the at least one waveguide and the adaptive lens assembly.

Example 83 is the optical system of any of the above examples, wherein the at least one waveguide comprises a plurality of waveguides.

Example 84 is an optical system comprising: a projector configured to emit light; at least one waveguide optically coupled to the projector and configured to receive and redirect light therefrom toward a user; a shutter assembly comprising at least one component positioned adjacent to the at least one waveguide, wherein the shutter assembly is selectively switchable between different states in which the shutter assembly is configured to allow different amounts of ambient light from an environment of the user to pass therethrough toward the user, respectively; an adaptive lens assembly positioned between the at least one waveguide and the user, wherein the adaptive lens assembly is selectively switchable between different states in which the adaptive lens is configured to impart different amounts of wavefront divergence to light passing therethrough toward the user, respectively; and control circuitry communicatively coupled to the projector, the shutter assembly, and the adaptive lens assembly, wherein the control circuitry is configured to cause the shutter assembly and the adaptive lens assembly to synchronously switch between two or more states at a particular rate, the two or more states comprising: a first state in which the shutter assembly is configured to allow a first amount of ambient light from the environment of the user to pass therethrough toward the user and the adaptive lens assembly is configured to impart a first amount of wavefront divergence to light passing therethrough; and a second state in which the shutter assembly is configured to allow a second amount of ambient light from the environment of the user to pass therethrough toward the user and the adaptive lens assembly is configured to impart a second amount of wavefront divergence to light passing therethrough, wherein the second amount of ambient light is different from the first amount of ambient light and the second amount of wavefront divergence is different from the first amount of wavefront divergence.

Example 85 is the optical system of example 84, wherein the second amount of ambient light is less than the first amount of ambient light and the second amount of wavefront divergence is greater than the first amount of wavefront divergence.

Example 86 is the optical system of example 84, wherein the particular rate at which to cause the shutter assembly and the adaptive lens assembly to synchronously switch between the two or more states comprises a rate greater than or equal to a minimum switching frequency.

Example 87 is the optical system of example 84, wherein in the second state, the control circuitry is configured to cause the projector to emit light representing virtual content that is to be perceived by the user as being positioned at a first depth in front of the user; and wherein the control circuitry is configured to determine at least one of the second amount of ambient light and the second amount of wavefront divergence based on the first depth in front of the user at which virtual content is to be perceived by the user.

Example 88 is the optical system of example 84, wherein the at least one component of the shutter assembly comprises at least one component positioned between the at least one waveguide and the user.

Example 89 is an optical system comprising: a projector configured to emit light; at least one waveguide optically coupled to the projector and configured to receive and redirect light therefrom toward a user; a shutter assembly comprising at least one component positioned adjacent to the at least one waveguide, wherein the shutter assembly is controllable to allow a variable amount of ambient light from an environment of the user to pass therethrough toward the user; an adaptive lens assembly positioned between the at least one waveguide and the user, wherein the adaptive lens assembly is controllable to impart a variable amount of wavefront divergence to light passing therethrough toward the user; and control circuitry communicatively coupled to the projector, the shutter assembly, and the adaptive lens assembly, wherein the control circuitry is configured to synchronously: cause the adaptive lens assembly to vary the amount of wavefront divergence imparted to light passing therethrough toward the user; and cause the shutter assembly to vary the amount of ambient light from the environment of the user allowed to pass therethrough toward the user inversely with the amount of wavefront divergence imparted by the adaptive lens assembly to light passing therethrough.

Example 90 is an optical system comprising: a projector configured to emit light; at least one waveguide optically coupled to the projector and configured to receive and redirect light therefrom toward a user; a shutter assembly comprising at least one component positioned adjacent to the at least one waveguide, wherein the shutter assembly is selectively switchable between different states in which the shutter assembly is configured to allow different amounts of ambient light from an environment of the user to pass therethrough toward the user, respectively; an adaptive lens assembly positioned between the at least one waveguide and the user, wherein the adaptive lens assembly is selectively switchable between different states in which the adaptive lens is configured to impart different amounts of wavefront divergence to light passing therethrough toward the user, respectively; and control circuitry communicatively coupled to the projector, the shutter assembly, and the adaptive lens assembly, wherein the control circuitry is configured to cause the shutter assembly and the adaptive lens assembly to synchronously switch between different states in a manner yielding an inverse relationship between the amount of ambient light from the environment of the user allowed by the shutter assembly to pass therethrough toward the user and the amount of wavefront divergence imparted by the adaptive lens assembly to light passing therethrough toward the user.

Example 91 is an optical system comprising: a projector configured to emit light; at least one waveguide optically coupled to the projector and configured to receive and redirect light therefrom toward a user; a shutter assembly comprising at least one component positioned adjacent to the at least one waveguide, wherein the shutter assembly is selectively switchable between different states in which the shutter assembly is configured to allow different amounts of ambient light from an environment of the user to pass therethrough toward the user, respectively; an adaptive lens assembly positioned between the at least one waveguide and the user, wherein the adaptive lens assembly is selectively switchable between different states in which the adaptive lens is configured to impart different amounts of wavefront divergence to light passing therethrough toward the user, respectively; and control circuitry communicatively coupled to the projector, the shutter assembly, and the adaptive lens assembly, wherein the control circuitry is configured to alternate between at least two different modes of operation comprising: a first mode of operation in which the control circuitry is configured to control a state of the shutter assembly and a state of the adaptive lens assembly in an asynchronous manner; and a second mode of operation in which the control circuitry is configured to control the state of the shutter assembly and the state of the adaptive lens assembly in a synchronous manner.

Example 92 is a non-transitory computer-readable medium storing instructions that, when executed by one or more processors, cause the one or more processors to perform one or more of the operations performed by the control circuitry of any of the above examples.

Numerous benefits are achieved by way of the present disclosure over conventional techniques. Various embodiments described herein provide a compact, time-multiplexed display that can apply optical power to virtual image light so as to provide virtual content at various depths while at the same time leaving world light undistorted. Various embodiments described herein also provide adaptive lens assemblies that include a polarization-selective lens stack. In certain implementations, the polarization-selective lens stack comprises a birefringent lens, e.g., a Fresnel birefringent lens, and an isotropic lens contacting each other. Such assemblies can be compact (e.g., can have reduced thickness) and/or lightweight. These assemblies may potentially also provide various advantageous optical functionalities such as high bandwidth, increased switching speeds, reduced chromatic aberrations, increased ease of alignment, and/or variable optical power. Some embodiments of the disclosure provide for replacing the conventional front adaptive lens assembly with a shutter assembly, yielding smaller/lighter form factors and increased power savings. In addition, various embodiments described herein can provide adaptive lens assemblies with relatively low amount of leakage light that can otherwise lead to "ghost" images. Other benefits of the present disclosure will be readily apparent to those skilled in the art.

BRIEF DESCRIPTION OF THE DRAWINGS

FIG. 3A illustrates an example of the display system of FIG. 2 displaying virtual content to a user at a virtual depth plane using an adaptive lens.

FIG. 3B illustrates an example of the display system of FIG. 2 providing a view of real world content to a user through adaptive lenses.

FIG. 6A illustrates a cross-sectional view of an example polarization-selective lens stack comprising a birefringent lens and an isotropic lens.

FIG. 6B illustrates the polarization-selective lens stack of FIG. 6A in operation, passing therethrough linearly polarized light having a first polarization.

FIG. 6C illustrates the polarization-selective lens stack of FIG. 6A in operation, passing therethrough linearly polarized light having a second polarization.

FIGS. 9B-9E illustrate the example adaptive lens assembly of FIG. 9A in operation under different configurations configured to exert different optical powers.

DETAILED DESCRIPTION OF SPECIFIC EMBODIMENTS

Optical see through (OST) augmented reality (AR) devices can improve the virtual content being presented to a user by applying optical power to the virtual image light (i.e., light associated with a virtual image) using one or more adaptive lens assemblies arranged within the optical stack. One issue with such configurations is that optical power is necessarily also applied to the world light (i.e., light associated with a world object) passing therein, causing distortion of the perceived world object and thereby diminishing the user experience. Some embodiments described herein overcome these and other issues by providing various shutter elements arranged within the optical stack that may be sequentially activated to produce the result of world light being passed through the AR device without distortion and virtual image light being imparted optical power from the adaptive lens assembly as needed.

Figure 1:
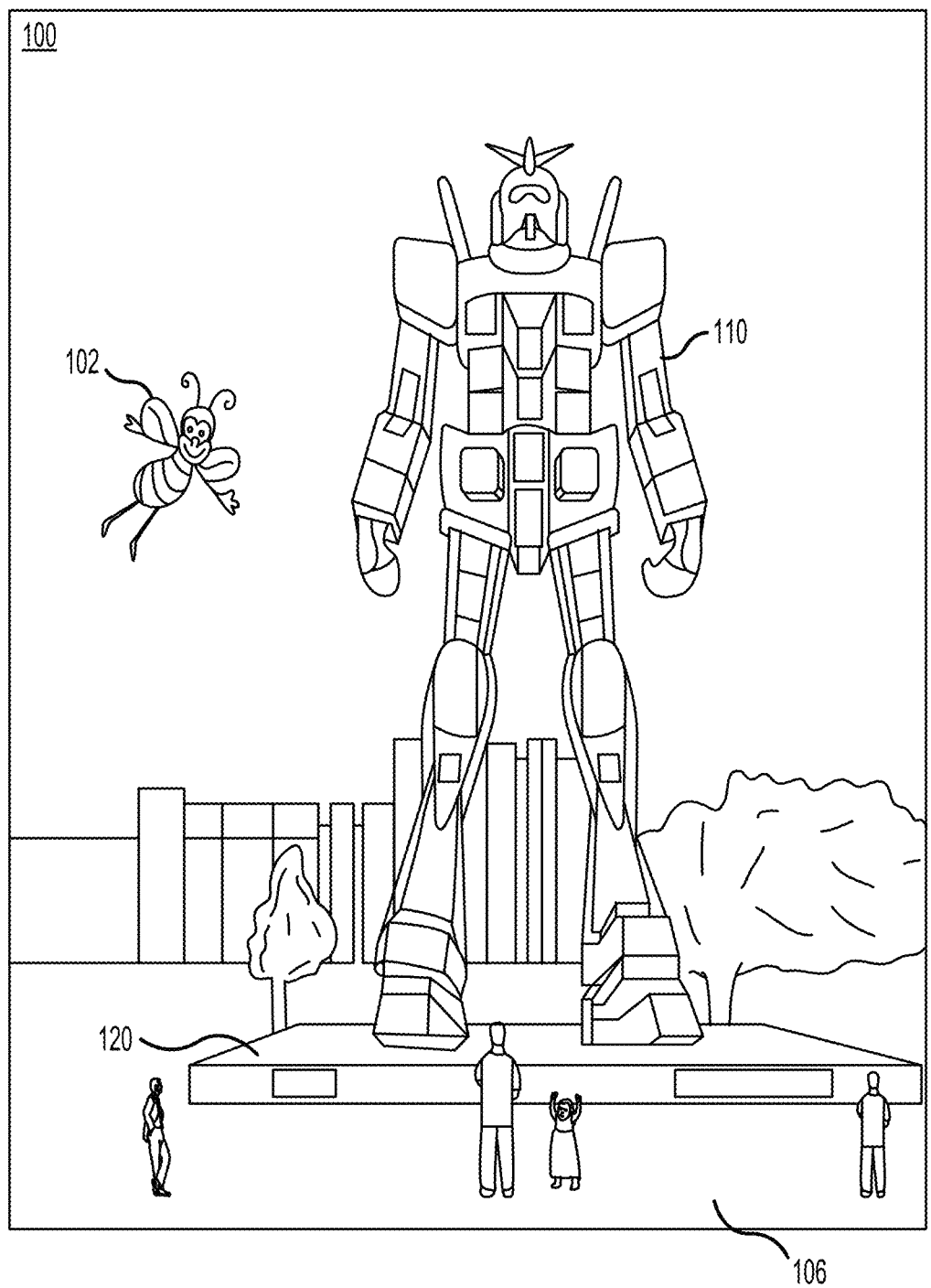
FIG. 1 illustrates an augmented reality (AR) scene as viewed through a wearable AR device according to an embodiment described herein.

FIG. 1 illustrates an AR scene as viewed through a wearable AR device according to an embodiment described herein. An AR scene 100 is depicted wherein a user of an AR technology sees a real-world park-like setting 106 featuring people, trees, buildings in the background, and a concrete platform 120. In addition to these items, the user of the AR technology also perceives that he "sees" a robot statue 110 standing upon the real-world platform 120, and a cartoon-like avatar character 102 flying by, which seems to be a personification of a bumble bee, even though these elements (character 102 and statue 110) do not exist in the real world. Due to the extreme complexity of the human visual perception and nervous system, it is challenging to produce a virtual reality (VR) or AR technology that facilitates a comfortable, natural-feeling, rich presentation of virtual image elements amongst other virtual or real-world imagery elements.

Figure 2:
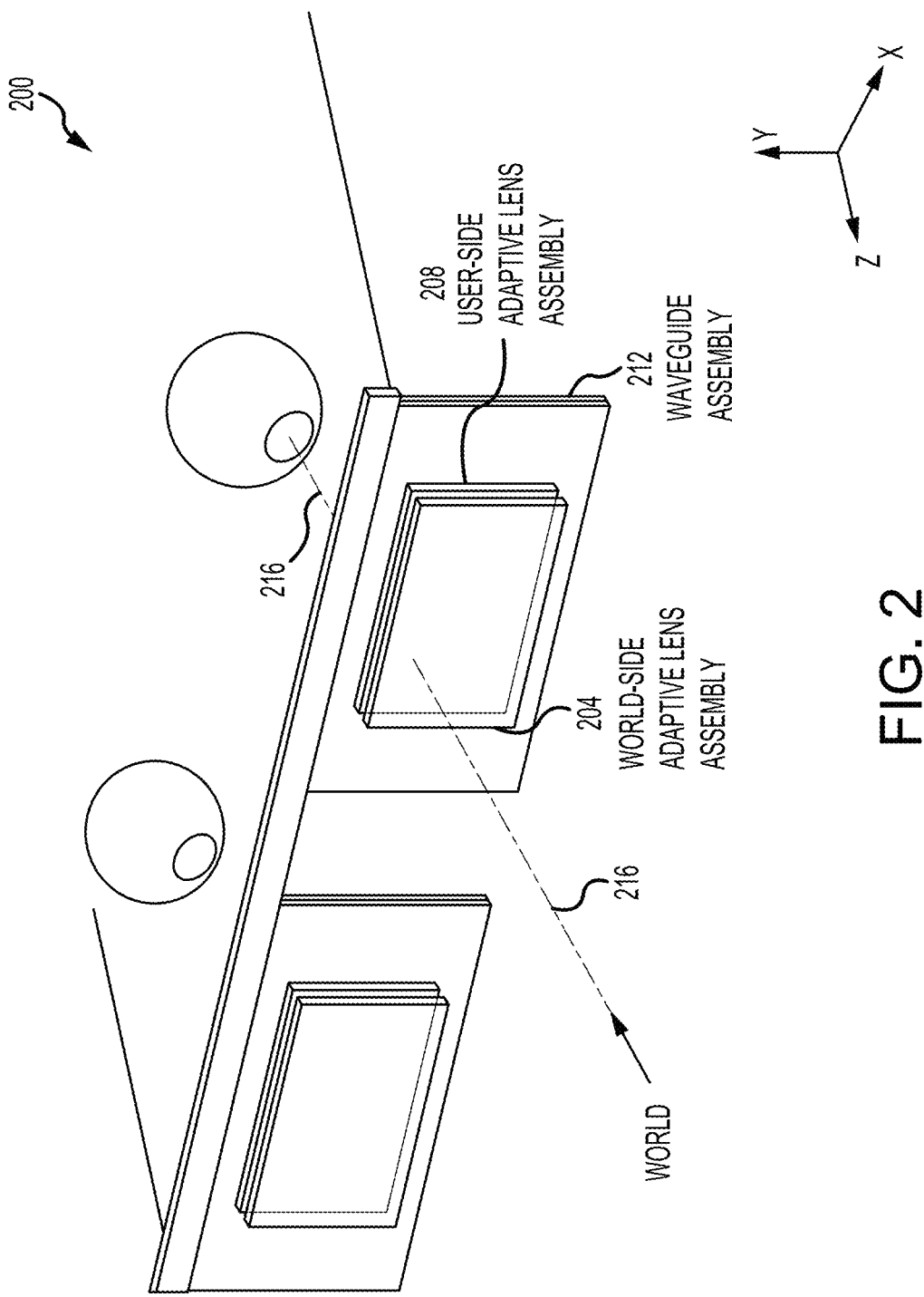
FIG. 2 illustrates an example of a display system comprising a pair of adaptive lens assemblies.

FIG. 2 illustrates an example of a display device 200, e.g., a wearable display device, comprising one or more adaptive lens assemblies including a polarization-selective lens stack, e.g., a pair of adaptive lens assemblies 204, 208 in an optical path 216 that are interposed by a waveguide assembly 212. As described herein, waveguide assembly 212 may include a waveguide configured to propagate light (e.g., visible light) under total internal reflection and to outcouple the light in an optical axis extending from (e.g., in a direction normal to) a light output surface of the waveguide (e.g., a major surface of the waveguide). The light may be outcoupled by a diffraction grating in some embodiments. Each of adaptive lens assemblies 204, 208 may be configured to at least partially transmit outcoupled light therethrough. In the illustrated embodiments, each of adaptive lens assemblies 204, 208 may be configured to receive outcoupled light from waveguide assembly 212 and to converge or diverge the outcoupled light in the optical axis direction. Each of adaptive lens assemblies 204, 208 comprises a polarization-selective lens stack comprising a birefringent lens and an isotropic lens contacting each other, wherein contacting surfaces of the birefringent lens and the isotropic lens form a conformal interface therebetween. Each of adaptive lens assemblies 204, 208 is configured to be selectively switched between a plurality of states having different optical powers. That is, each of adaptive lens assemblies 204, 208 is configured to be selectively switched between a plurality of states in which the respective adaptive lens assembly is configured to impart different amounts of wavefront divergence or convergence to light passing therethrough. Each of adaptive lens assemblies 204, 208 can further be configured to alter a polarization state of the outcoupled light passing therethrough when activated (e.g., electrically activated).

As used herein, an adaptive lens assembly refers to a lens assembly having at least one optical property that may be adjusted, e.g., reversibly activated and deactivated, using an external stimulus. Example optical properties that may be reversibly activated and deactivated include, among other properties, optical power (focal length), phase, polarization, polarization-selectivity, transmissivity, reflectivity, birefringence and diffraction properties, among other properties. In various embodiments, adaptive lens assemblies are capable of electrically varying the optical power and the polarization state of light passing therethrough.

In the illustrated embodiment, each of the pair of adaptive lens assemblies 204, 208 is configured to be selectively switched between at least two states, where, in a first state each is configured to pass the outcoupled light therethrough without altering a polarization state thereof, while in a second state each is configured to alter the polarization state of the outcoupled light passing therethrough. For example, in the second state, each of adaptive lens assemblies 204, 208 reverses the handedness of circularly polarized light, while in the first state, each of adaptive lens assemblies 204, 208 preserves the handedness of circularly polarized light.

Still referring to FIG. 2, display device 200 may further comprise waveguide assembly 212 interposed between the pair of adaptive lens assemblies 204, 208. Each of waveguide assemblies 204, 208 may be configured to propagate light under total internal reflection in a lateral direction parallel to a major surface of the waveguide. Each of waveguide assemblies 204, 208 may further be configured to outcouple the light, e.g., in a direction normal to the major surface of the waveguide.

Still referring to FIG. 2, a first adaptive lens assembly 204 of the pair of adaptive lens assemblies is disposed on a first side of waveguide assembly 212, e.g., the side of the world observed by a user, and a second adaptive lens assembly 208 of the pair of lens assemblies is disposed on a second side of the waveguide assembly 212, e.g., the side of the eye of the user. As described infra, the pair of adaptive lens assemblies 204, 208 as configured provides to a user virtual content from waveguide assembly 212 at a plurality of virtual depth planes, as well the view of the real world. In some embodiments, there is little or no distortion due to the presence of the pair of adaptive lens assemblies 204, 208. The virtual content and the view of the real world are provided to the user upon activation of the first and second adaptive lens assemblies 204, 208, as described infra with respect to FIGS. 3A and 3B.

FIGS. 3A and 3B illustrate examples of display devices 300A, 300B, each comprising adaptive lens assemblies in operation to output image information to a user. Display devices 300A, 300B may correspond to the same display device at different times and/or in different states. In some embodiments, display devices 300A, 300B in unpowered states are structurally identical. Display device 300A is used herein to describe outputting virtual image to the user, while display device 300B is used herein to describe transmitting a real world image through the display device 300B to the user. Display devices 300A, 300B include a pair of adaptive lens assemblies 204, 208 that are configured to be electrically activated by, e.g., application of a voltage or a current. In some embodiments, in a deactivated state, e.g., when no voltage or current is applied, each of first and second adaptive lens assemblies 204, 208 has a low, e.g., about zero, optical power. In some embodiments, in an activated state, e.g., when a voltage or a current is applied, first adaptive lens assembly 204 on the side of the world may provide a first net optical power ($P_{net1}$) having a first sign, e.g., a positive optical power. When in an activated state, second adaptive lens assembly 208 on the side of the user may provide a second net optical power ($P_{net2}$) having a second sign, e.g., a negative optical power. However, embodiments are not so limited, and in other embodiments, first and second adaptive lens assemblies 200A, 200B may provide the optical powers in the deactivated state while providing substantially zero power when activated.

FIG. 3A illustrates an example of the display system of FIG. 2 displaying virtual content to a user at a virtual depth plane 304, according to some embodiments. As described supra, waveguide assembly 212 interposed between the pair of adaptive lens assemblies 204, 208 comprises a waveguide configured to receive light containing virtual image information and propagate the light under total internal reflection. Waveguide assembly 212 is further configured to outcouple the light through, e.g., a diffraction grating, towards the eye of the user. The outcoupled light passes through user-side adaptive lens assembly 208 prior to entering the eye of the user. When activated, user-side adaptive lens assembly 208 has a second net optical power, $P_{net2}$, which may have a negative value, such that the user sees the virtual image at a virtual depth plane 304.

In some embodiments, the second net optical power $P_{net2}$ may be adjusted electrically to adjust the second net optical power ($P_{net2}$) of user-side adaptive lens assembly 208, thereby adjusting the distance to virtual depth plane 304. For example, as a virtual object "moves" closer and further relative to the eye of the user within a virtual three dimensional space, the second net optical power $P_{net2}$ of user-side adaptive lens assembly 208 may be correspondingly adjusted, such that virtual depth plane 304 adjusts to track the virtual object. Thus, the user may experience relatively little or no accommodation/vergence mismatch beyond an acceptable threshold. In some embodiments, the magnitude of the distance to virtual depth plane 304 may be adjusted in discrete steps, while in some other embodiments, the magnitude of the distance to virtual depth plane 304 may be adjusted continuously.

FIG. 3B illustrates an example of the display system of FIG. 2 providing a view of real world content to a user, according to some embodiments. When user-side adaptive lens assembly 208 is activated to have the second net optical power ($P_{net2}$) to display the virtual content at virtual depth plane 304, light from the real world passing through user-side adaptive lens assembly 208 may also be converged or diverged according to $P_{net2}$ of the activated user-side adaptive lens assembly 208. Thus, objects in the real world may appear out of focus or distorted. To mitigate such distortion, according to embodiments, when activated, adaptive lens assemblies 204, 208 may be configured to have optical powers having opposite signs. In some embodiments, light passing through adaptive lens assemblies 204, 208 converges or diverges according to a combined optical power having a magnitude that is about a difference between magnitudes of first and second net optical powers $P_{net1}$, $P_{net2}$, of world-side and user-side adaptive lens assemblies 204, 208, respectively. In some embodiments, waveguide assembly 212 may also have optical power and adaptive lens assembly 208 may be configured to account for the distortions caused by both lens assembly 204 and waveguide assembly 212. For example, the optical power of adaptive lens assembly 208 may be opposite in sign to the sum of the optical powers of adaptive lens assembly 204 and waveguide assembly 212.

In some embodiments, world-side adaptive lens assembly 204 is configured to have the first net optical power $P_{net1}$ that has a magnitude that is close to or the same as the magnitude of the second net optical power $P_{net2}$ of user-side adaptive lens assembly 208 while having an opposite sign. As a result, when both of adaptive lens assemblies 204, 208 are activated simultaneously, objects in the real world appear relatively unaffected by the optical power of user-side adaptive lens assembly 208 provided for displaying the virtual content.

In some embodiments, first adaptive lens assembly 204 may be configured such that when activated, the first net optical power $P_{net1}$ dynamically matches the second net optical power $P_{net2}$ of user-side adaptive lens assembly 208. For example, as the second net optical power $P_{net2}$ of user-side adaptive lens assembly 208 is adjusted to track moving virtual objects within the virtual three dimensional space, the first net optical power $P_{net1}$ of world-side adaptive lens assembly 204 may be dynamically adjusted, such that the magnitude of the combined optical power $P=P_{net1}+P_{net2}$ may be kept less than a predetermined value. Thus, according to embodiments, the objects in the real world may be prevented from being unacceptably out of focus by compensating the second net optical power ($P_{net2}$) of user-side adaptive lens assembly 208, which may have a negative value, with the first net optical power ($P_{net1}$) of world-side adaptive lens assembly 204, such that the combined optical power $P=P_{net1}+P_{net2}$ remains small. As described in further detail below, in some implementations, a wearable display device may include a waveguide assembly and a user-side adaptive lens assembly that are functionally equivalent or similar to waveguide assembly 212 and user-side adaptive lens assembly 208, respectively, but may not include a world-side adaptive lens assembly similar to that of world-side adaptive lens assembly 204. Instead, as described in further detail below, in these implementations, the display device may include one or more shutter elements, and may be configured to control such one or more shutter elements in synchronization with the user-side adaptive lens in a manner such that objects in the real world are not rendered unacceptably out of focus by the optical power imparted by the user-side adaptive lens.

Figure 4A:
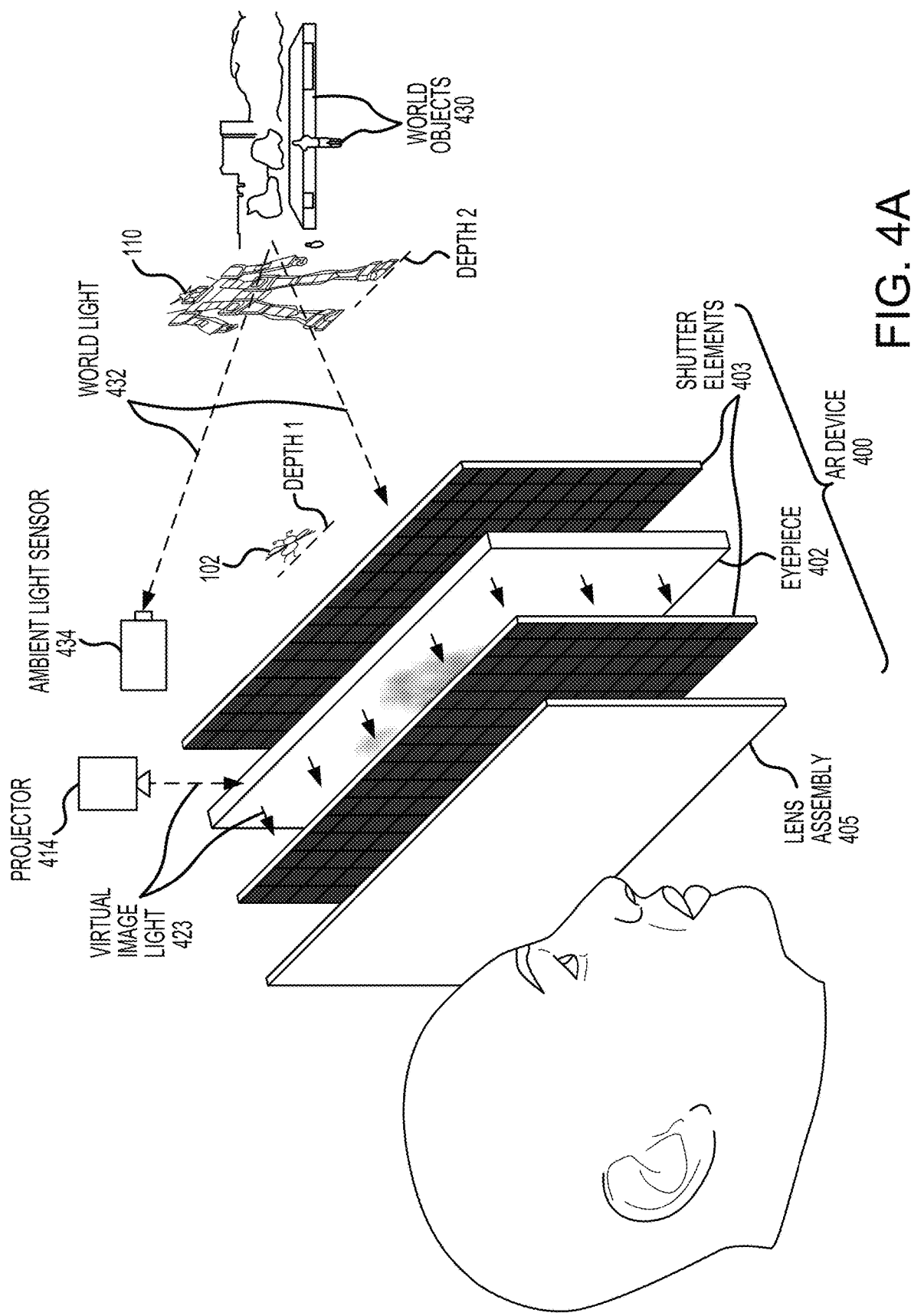
FIGS. 4A-4C illustrate one or more general features of an AR device according to the present disclosure.

FIG. 4A illustrates one or more general features of an AR device 400 according to the present disclosure. As shown in FIG. 4A, AR device 400 includes an eyepiece 402 and an adaptive lens assembly 405, which may be functionally equivalent or similar to waveguide assembly 212 and user-side adaptive lens assembly 208, respectively, as described above. During operation, a projector 414 of AR device 400 may project virtual image light 423 (i.e., light associated with a virtual image) onto eyepiece 402, which may cause a light field (i.e., an angular representation of virtual content) to be projected onto the user's retina in a manner such that the user perceives the corresponding virtual content as being positioned at some location within the user's environment. For example, the user may perceive character 102 as being positioned at or near a first virtual depth and statue 110 as being positioned at or near a second virtual depth. While AR device 400 may include only one adaptive lens assembly 405 (e.g., positioned on the user side of eyepiece 402 i.e., the side of eyepiece 402 closest to the eye of the user), such an adaptive lens assembly may be capable of imparting a plurality of different non-zero optical powers to light passing therethrough. That is, adaptive lens assembly 405 may be capable of imparting a plurality of different amounts of at least one of wavefront divergence and collimation to light passing therethrough.

AR device 400 may also include one or more shutter elements 403 coupled to the world side of eyepiece 402 (the side of eyepiece 402 furthest from the eye of the user and closest to world objects 430) and/or to the user side of eyepiece 402. By sequentially electrically activating different elements/layers of shutter elements 403 as described herein, world light 432 associated with world objects 430 may pass through AR device 400 with zero net optical power being applied by lens assembly 405 and virtual image light 423 may pass through with non-zero (e.g., negative) net optical power being applied by lens assembly 405. Example dimming components, which may represent or be included in shutter elements 403 and other shutter assemblies described herein, are described in U.S. Patent Application Publication No. 2020/0074724, filed Aug. 30, 2019, and International Patent Application No. PCT/US2019/051188, filed on Sep. 13, 2019, all of which are incorporated by reference herein in their entirety.

In some embodiments, AR device 400 may include an ambient light sensor 434 configured to detect world light 432. Ambient light sensor 434 may be positioned such that world light 432 detected by ambient light sensor 434 is similar to and/or representative of world light 432 that impinges on AR device 400 (e.g., shutter elements 403, eyepiece 402 and/or lens assembly 405). In some embodiments, ambient light sensor 434 may be configured to detect a plurality of spatially-resolved light values corresponding to different pixels of the field of view of AR device 400. In some embodiments, or in the same embodiments, ambient light sensor 434 may be configured to detect a global light value corresponding to an average light intensity or a single light intensity of world light 432. Detected ambient light may be used by AR device 400 to determine a shuttering frequency at which AR device 400 alternates between operating in accordance with a first state or a second state. In some instances, the shuttering frequency may exceed the flicker fusion threshold, such that the shuttering may not be readily perceivable to the user. For example, the shuttering frequency may be at least 120 Hz (e.g., 160 Hz or 200 Hz).

Figure 4B:
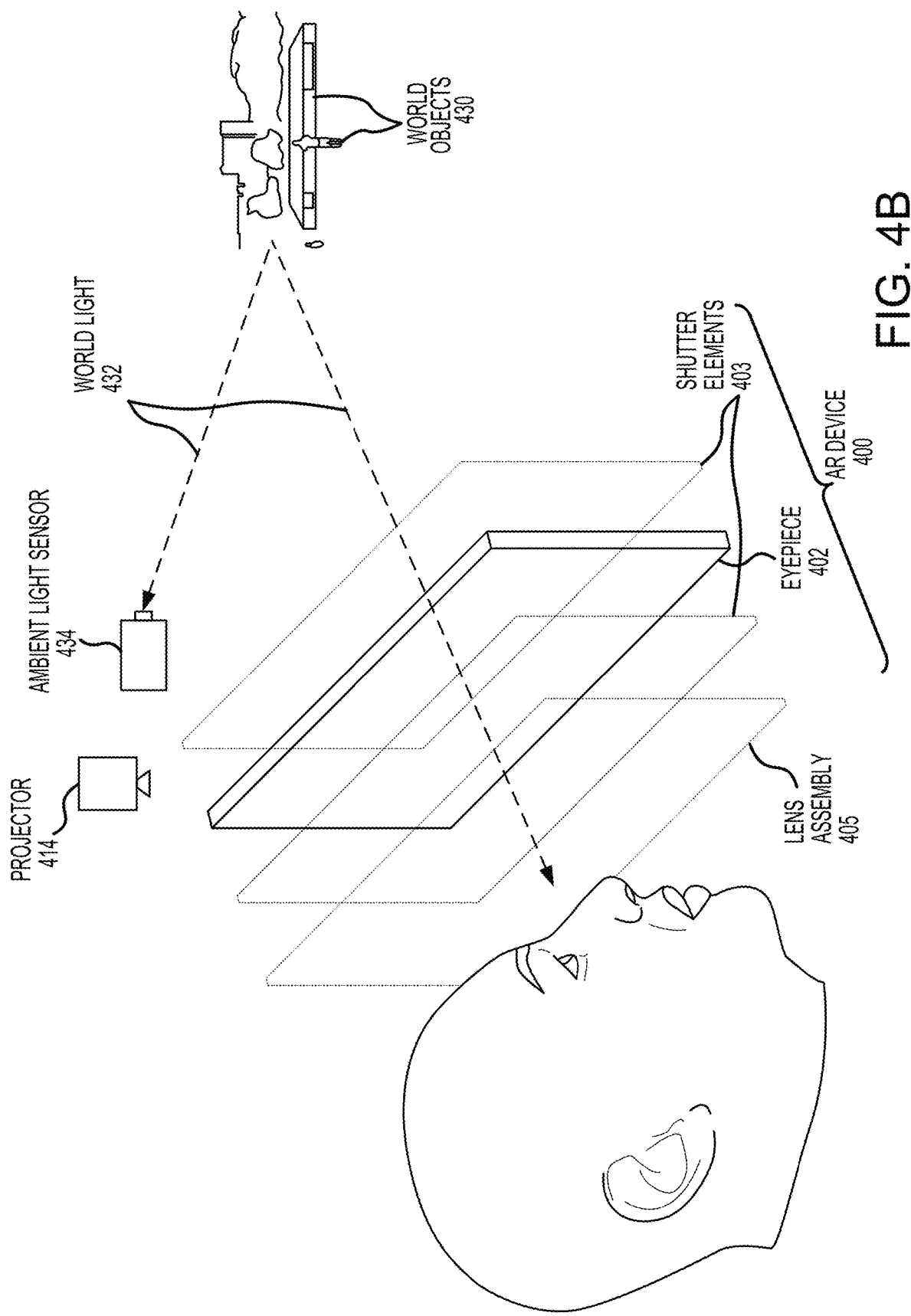

FIG. 4B illustrates AR device 400 operating in accordance with a first state, according to some embodiments of the present disclosure. While operating in accordance with the first state, projector 414 is turned off and one or more of shutter elements 403 are electrically activated such that world light 432 passes through AR device 400 with zero net optical power being applied by lens assembly 405. As will be shown below, this is accomplished using a world-side polarizer of shutter elements 403 to linearly polarize world light 432 along a first axis, a world-side switchable waveplate of shutter elements 403 to rotate a polarization of world light 432 by 90 degrees, and a user-side polarizer of shutter elements 403 to linearly polarize world light 432 along a second axis perpendicular to the first axis.

In some embodiments, one or more components of shutter elements 403 are considered to be subcomponents of lens assembly 405 (i.e., are considered to be included in lens assembly 405). For example, the user-side polarizer of shutter elements 403 may be considered to be a subcomponent of lens assembly 405. In such embodiments, when AR device 400 is operating in accordance with the first state, lens assembly 405 is considered to be switched, activated, and/or controlled into a state in which it applies zero optical power to light passing therethrough.

Figure 4C:
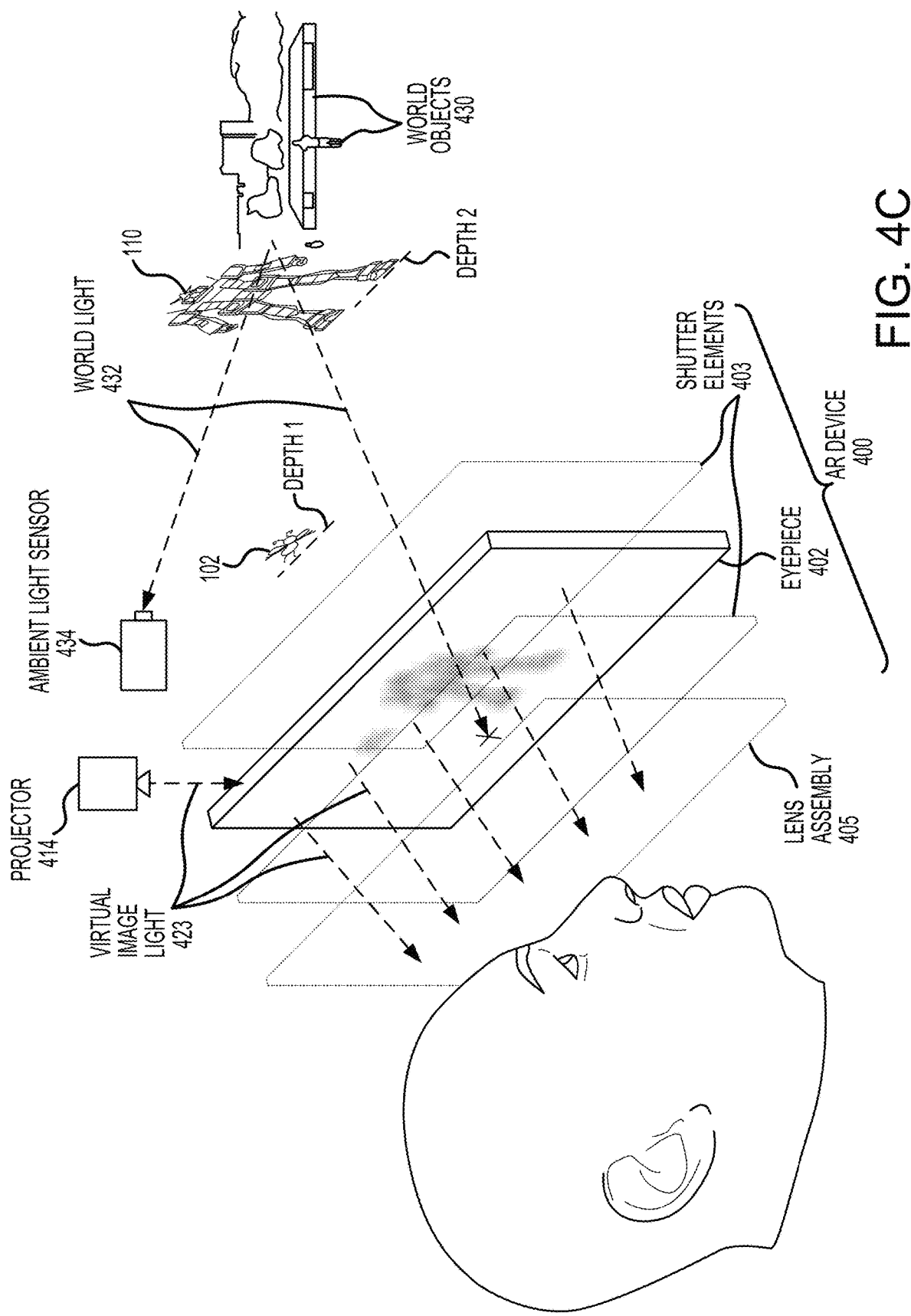

FIG. 4C illustrates AR device 400 operating in accordance with a second state, according to some embodiments of the present disclosure. While operating in accordance with the second state, projector 414 is turned on and one or more of shutter elements 403 are electrically activated such that world light 432 is completely or at least partially reduced, blocked, or dimmed, and virtual image light 423 passes through AR device 400 with non-zero net optical power being applied by lens assembly 405. As will be shown below, this is accomplished using a world-side polarizer of shutter elements 403 to linearly polarize world light 432 along a first axis, a user-side polarizer of shutter elements 403 to linearly polarize world light 432 and virtual image light 423 along a second axis perpendicular to the first axis, and a user-side switchable waveplate of shutter elements 403 to rotate a polarization of virtual image light 423 by 90 degrees.

Similar to that described in reference to FIG. 4B, in some embodiments, one or more components of shutter elements 403 are considered to be subcomponents of lens assembly 405 (i.e., are considered to be included in lens assembly 405). For example, the user-side polarizer of shutter elements 403 may be considered to be a subcomponent of lens assembly 405. In such embodiments, when AR device 400 is operating in accordance with the second state, lens assembly 405 is considered to be switched, activated, and/or controlled into a state in which it applies non-zero optical power to light passing therethrough. In some examples, (e.g., those described in reference to FIGS. 11C and 11D), a polarizing eyepiece may also be switched, activated, and/or controlled with each state such that the optical power applied to the light it outcouples may vary.

Figure 5:
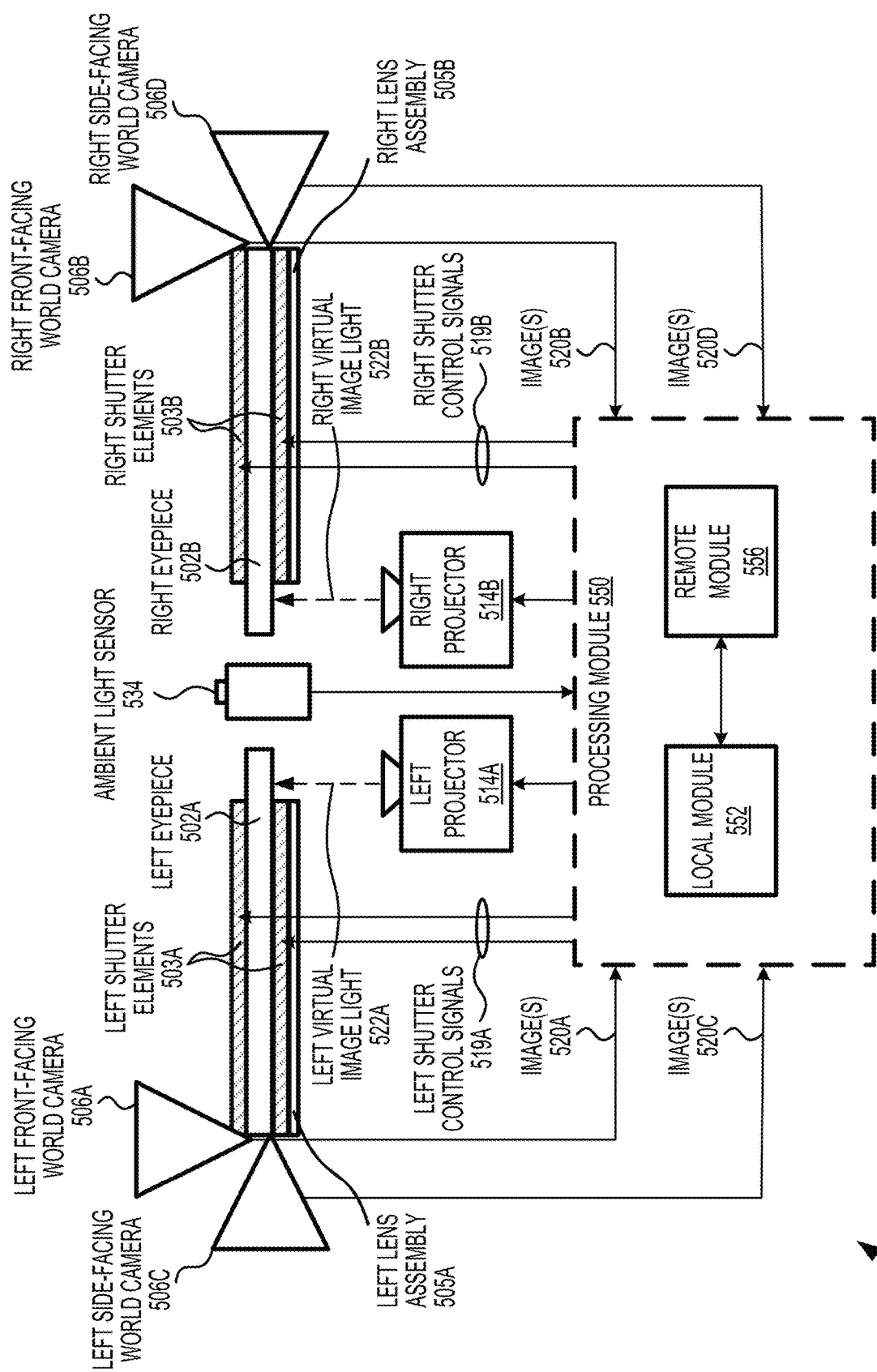
FIG. 5 illustrates a schematic view of a wearable AR device according to the present disclosure.

FIG. 5 illustrates a schematic view of a wearable AR device 500 according to the present disclosure. AR device 500 may include a left eyepiece 502A, left shutter elements 503A, and a left lens assembly 505A arranged in a side-by-side configuration and a right eyepiece 502B, right shutter elements 503B, and a right lens assembly 505B also arranged in a side-by-side configuration. In some embodiments, AR device 500 includes one or more sensors including, but not limited to: a left front-facing world camera 506A attached directly to or near left eyepiece 502A, a right front-facing world camera 506B attached directly to or near right eyepiece 502B, a left side-facing world camera 506C attached directly to or near left eyepiece 502A, a right side-facing world camera 506D attached directly to or near right eyepiece 502B, a left eye tracker positioned so as to observe a left eye of a user, a right eye tracker positioned so as to observe a right eye of a user, and an ambient light sensor 534. In some embodiments, AR device 500 includes one or more image projection devices such as a left projector 514A optically linked to left eyepiece 502A and a right projector 514B optically linked to right eyepiece 502B.

Some or all of the components of AR device 500 may be head mounted such that projected images may be viewed by a user. In one particular implementation, all of the components of AR device 500 shown in FIG. 5 are mounted onto a single device (e.g., a single headset) wearable by a user. In another implementation, one or more components of a processing module 550 are physically separate from and communicatively coupled to the other components of AR device 500 by one or more wired and/or wireless connections. For example, processing module 550 may include a local module 552 on the head mounted portion of AR device 500 and a remote module 556 physically separate from and communicatively linked to local module 552. Remote module 556 may be mounted in a variety of configurations, such as fixedly attached to a frame, fixedly attached to a helmet or hat worn by a user, embedded in headphones, or otherwise removably attached to a user (e.g., in a backpack-style configuration, in a belt-coupling style configuration, etc.).

Processing module 550 may include a processor and an associated digital memory, such as non-volatile memory (e.g., flash memory), both of which may be utilized to assist in the processing, caching, and storage of data. The data may include data captured from sensors (which may be, e.g., operatively coupled to AR device 500) or otherwise attached to a user, such as cameras 506, ambient light sensor 534, eye trackers, microphones, inertial measurement units, accelerometers, compasses, GPS units, radio devices, and/or gyros. For example, processing module 550 may receive image(s) 520 from cameras 506. Specifically, processing module 550 may receive left front image(s) 520A from left front-facing world camera 506A, right front image(s) 520B from right front-facing world camera 506B, left side image(s) 520C from left side-facing world camera 506C, and right side image(s) 520D from right side-facing world camera 506D. In some embodiments, image(s) 520 may include a single image, a pair of images, a video comprising a stream of images, a video comprising a stream of paired images, and the like. Image(s) 520 may be periodically generated and sent to processing module 550 while AR device 500 is powered on, or may be generated in response to an instruction sent by processing module 550 to one or more of the cameras. As another example, processing module 550 may receive ambient light information from ambient light sensor 534. As another example, processing module 550 may receive gaze information from the eye trackers. As another example, processing module 550 may receive image information (e.g., image brightness values) from one or both of projectors 514.

Eyepieces 502A, 502B may comprise transparent or semi-transparent waveguides configured to direct and outcouple light from projectors 514A, 514B, respectively. Specifically, processing module 550 may cause left projector 514A to output left virtual image light 522A onto left eyepiece 502A, and may cause right projector 514B to output right virtual image light 522B onto right eyepiece 502B. In some embodiments, each of eyepieces 502 may comprise a plurality of waveguides corresponding to different colors and/or different depth planes. In some embodiments, shutter elements 503 may be coupled to and/or integrated with eyepieces 502. For example, shutter elements 503 may be incorporated into a multi-layer eyepiece and may form one or more layers that make up one of eyepieces 502. In some embodiments, processing module may electrically activate shutter elements 503A, 503B using left shutter control signals 519A and right shutter control signals 519B, respectively. For example, processing module 550 may apply different voltages to shutter control signals 519 to cause AR device 500 to alternate between presenting world light and virtual image light to a user.

Cameras 506A, 506B may be positioned to capture images that substantially overlap with the field of view of a user's left and right eyes, respectively. Accordingly, placement of cameras 506 may be near a user's eyes but not so near as to obscure the user's field of view. Alternatively or additionally, cameras 506A, 506B may be positioned so as to align with the incoupling locations of virtual image light 522A, 522B, respectively. Cameras 506C, 506D may be positioned to capture images to the side of a user, e.g., in a user's peripheral vision or outside the user's peripheral vision. Image(s) 520C, 520D captured using cameras 506C, 506D need not necessarily overlap with image(s) 520A, 520B captured using cameras 506A, 506B.

Polarization-Selective Lens Stack Comprising Birefringent Lens and Isotropic Lens for Adaptive Lens Assemblies Various embodiments described herein provide adaptive lens assemblies that include a polarization-selective lens stack. In certain implementations, the polarization-selective lens stack comprises a birefringent lens, e.g., a Fresnel birefringent lens, and an isotropic lens contacting each other. Such assemblies can be compact (e.g., can have reduced thickness) and/or lightweight. These assemblies may potentially also provide various advantageous optical functionalities such as high bandwidth, increased switching speeds, reduced chromatic aberrations, increased ease of alignment, and/or variable optical power. In addition, various embodiments described herein can provide adaptive lens assemblies with relatively low amount of leakage light that can otherwise lead to "ghost" images. According to various embodiments, adaptive assemblies comprise a polarization-selective lens stack comprising a birefringent lens and an isotropic lens, as described herein.

Referring to FIG. 6A, to provide images at a plurality of depth planes with high efficiency over a wide range of the visible spectrum, adaptive lens assemblies according to various embodiments include a polarization-selective lens stack 600 configured to exert polarization-dependent optical power to linearly polarized light. Polarization-selective lens stack 600 may comprise a birefringent lens 604 having an optic axis 602 extending in a lateral direction, e.g., x-direction or y-direction direction, perpendicular to the direction of light propagation, e.g., the z-direction. Birefringent lens 604 has a birefringence Δn. Birefringence Δn corresponds to a difference between an extraordinary refractive index $n_e$ and an ordinary refractive index $n_o$ of birefringent lens 604. Birefringent lens 604 can have a radius of curvature $R_1$ such that it is configured to exert a first optical power $p_1$ to light passing therethrough and having a polarization direction parallel to the optic axis, and to exert a second optical power $p_2$ to light passing therethrough and having a polarization direction perpendicular to the optic axis.

Polarization-selective lens stack 600 may additionally include an isotropic lens 608 having a refractive index $n_c$, which has a second radius of curvature $R_2$ such that it is configured to exert to light passing therethrough a third optical power $p_3$ opposite in sign as the first optical power $p_1$ and the second optical power $p_2$.

In the illustrated embodiment, without limitation, the extraordinary refractive index $n_e$ of isotropic lens 608 has substantially the same value as the ordinary refractive index $n_o$ of birefringent lens 604. However, it will be appreciated that the extraordinary refractive index $n_e$ can be different from the ordinary refractive index $n_o$ in some other embodiments.

In the illustrated embodiment, without limitation, the first radius of curvature $R_1$ and the second radius of curvature $R_2$ are substantially the same in magnitude R while having opposite signs. Furthermore, because $R_1$ and $R_2$ are substantially the same in magnitude, birefringent lens 604 and isotropic lens 608 make continuous contact along the interface having the radius of curvature R. That is, the contacting surfaces of birefringent lens 604 and isotropic lens 608 form a conformal interface therebetween.

With reference to FIG. 6B, polarization-selective lens stack 600 is illustrated in operation when an incident light 612, e.g., linearly polarized light, has a direction of polarization that is parallel to the direction of optic axis 602. Under this condition, because light passing through birefringent lens 604 experiences a refractive index corresponding to extraordinary refractive index $n_e$ and light passing through isotropic lens 608 experiences a refractive index corresponding to ordinary refractive index $n_o$, lens stack 600 exerts an optical power to the light that can be expressed as:

$$\varphi_1 = \frac{n_e - n_0}{R} = \frac{\Delta n}{R}$$

where R represents the magnitude of radii of birefringent lens 604 and isotropic lens 608.

With reference to FIG. 6C, polarization-selective lens stack 600 is illustrated in operation when an incident light 616, e.g., linearly polarized light, has a direction of polarization that is perpendicular to the direction of optical axis 602. Under this condition, because light passing through birefringent lens 604 experiences a refractive index corresponding to ordinary refractive index $n_o$, which is the same as the refractive index experienced by light passing through isotropic lens 608, lens stack 600 exerts an optical power to the light that can be expressed as:

$$\varphi_1 = \frac{n_e - n_0}{R} \cong \frac{\Delta n}{R}$$

where R represents the magnitude radii of birefringent lens 604 and isotropic lens 608.

Still referring to FIGS. 6A-6C, in some embodiments, isotropic lens 608 may be formed of an isotropic material, e.g., glass, acrylic, etc. On the other hand, birefringent lens 604 may be formed of or comprises a birefringent material, e.g., liquid crystals according to various embodiments. For example, birefringent lens 604 may comprise a transparent substrate e.g., a glass substrate, having formed thereon liquid crystal (LC) molecules that are elongated along a lateral direction (e.g., x-direction or y-direction) perpendicular to the light propagation direction (e.g., z-direction).

However, embodiments are not so limited and in other embodiments, birefringent lens 604 may be formed of or comprises a suitable birefringent material other than LCs. For example, birefringent lens 604 may comprise, e.g., $BaB_2O_4$, $Be_3Al_2(SiO_3)_6$, $CaCO_3LiNbO_3TiO_2SiC$, tourmaline and $ZrSiO_4$ to name a few.

Polarization-Selective Lens Stack Comprising a Birefringent Fresnel Lens and Isotropic Lens for Adaptive Lens Assemblies As described above with respect to FIGS. 6A-6C, a lens stack comprising a birefringent lens, e.g., LC-based birefringent lens, and an isotropic lens can provide polarization-selective lensing effect. In the following, a polarization-selective lens stack comprising a liquid crystal-based birefringent lens configured as a Fresnel lens is described.

A Fresnel lens can for example comprise a thin-plate type of lens, which comprises fractional prismatic structures formed by breaking a conventional curved (e.g., spherical) lens into a set of sections, e.g., concentric annular sections, known as Fresnel zones. The Fresnel zones replace the continuous curvature of a continuous refractive lens with a set of surfaces of the same shape having discontinuities between them. A substantial reduction in thickness can be achieved by employing such fractional sections and lenses with a relatively large aperture can be manufactured using a smaller volume of material.

Figure 7B:
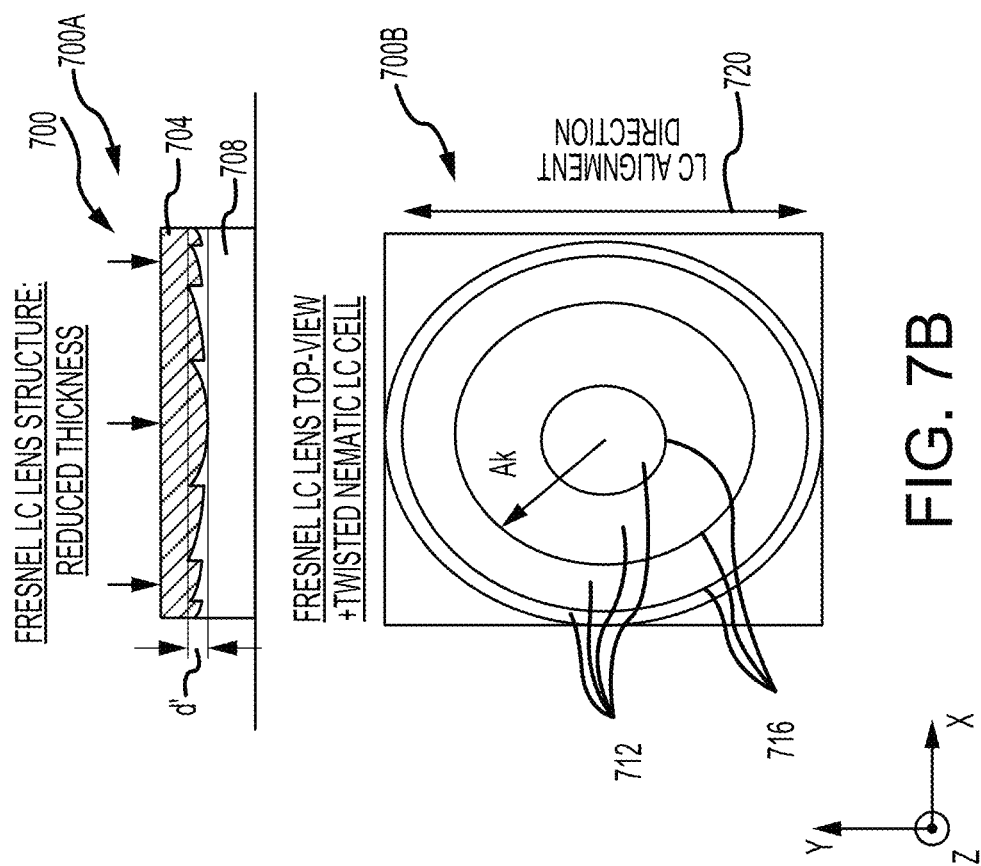
FIG. 7B illustrates cross-sectional and top down views of an example of a polarization-selective lens stack comprising a birefringent Fresnel lens and an isotropic lens.
Figure 7A:
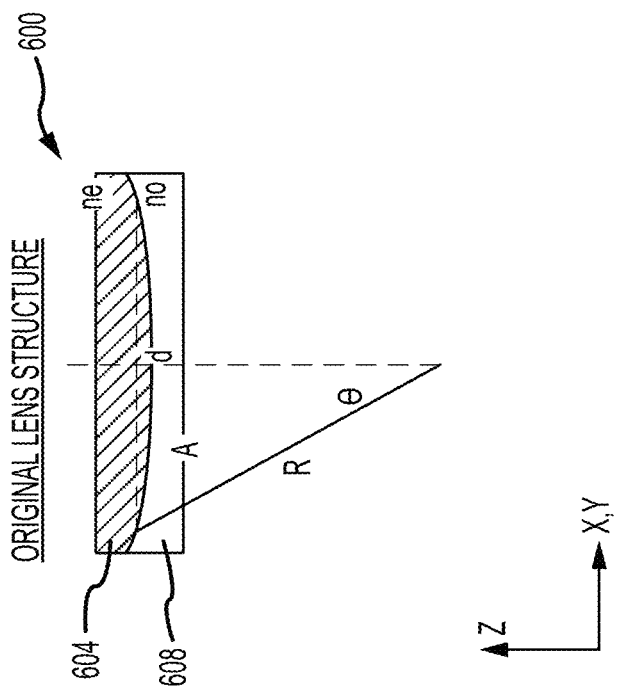
FIG. 7A illustrates the polarization-selective lens stack of FIG. 6A with annotated parameters.

FIG. 7A illustrates a cross-sectional side view of lens stack 600 described above with respect to FIGS. 6A-6C, annotated with relevant optical dimensions including the distance R to a given location on birefringent lens 604 from the focal point, the radial distance A to the given location from a central axis (e.g., optical axis) of lens stack 600, the angle θ defined by the distances R and A, and the thickness d of the curved portion of birefringent lens 604. As described above, in various implementations, because birefringent lens 604 and isotropic lens 608 have substantially the same radius of curvature, birefringent lens 604 and isotropic lens 608 make continuous contact along the interface formed therebetween having the radius of curvature R.

FIG. 7B illustrates a cross-sectional side view 700A (top) and a top down view 700B (bottom) of a lens stack 700 comprising a birefringent Fresnel lens 704 and a counterpart lens, e.g., an isotropic Fresnel lens 708. By employing the Fresnel lens 704, the groove thickness d' of the curved portion of birefringent lens 704 can be substantially reduced. Despite the substantially reduced thickness d', lens stack 700 has a corresponding curvature such as effective radius of curvature R corresponding to the actual radius of curvature R of the conventional lens illustrated with respect to FIG. 7A. Accordingly, while not illustrated, lens stack 700A additionally has a radial distance $A_k$ of a given Fresnel zone or a groove 706 from a central axis of lens stack 700 and the angle θ defined by the distances R and $A_k$. In some implementations such as shown in FIG. 7B, despite the grooves separating the Fresnel zones, birefringent Fresnel lens 704 and isotropic lens 708 make continuous contact throughout the interface formed therebetween having the effective radius of curvature R. In some embodiments, successive Fresnel zones in the radially outward direction can have different radial distances $A_k$ and different distances between adjacent grooves 706. For example, in the illustrated embodiment, the distances between adjacent Fresnel zones become smaller in the radially outward direction of birefringent Fresnel lens 704. However, embodiments are not so limited and in other embodiments, the radial distances $A_k$ of successive Fresnel zones can increase linearly with constant distances between adjacent Fresnel zones while having different groove thicknesses within each zone to provide similar or same optical effects as the illustrated embodiment.

Referring to FIG. 7B (bottom), the illustrated birefringent Fresnel lens 704 comprises a plurality of concentric Fresnel zones according to some embodiments. The birefringent Fresnel lens 704 has a plurality of grooves 716 forming boundaries of Fresnel zones 712 at distances from the central axis represented by radii $A_k$. According to various embodiments, the groove thickness d' of the birefringent lens 704 is designed such that the path length is a multiple of the design wavelength λ. This arrangement can create a 2 nm phase jump between the zones that leads to the same wavefront. The value of d' can be chosen (e.g., optimized) to balance fabrication tolerances and to reduce or minimize aberrations that can arise from sharp edges of grooves 716. In one example, the radius R, of the $k^{th}$ Fresnel zone can be calculated by setting the thickness of the curved region to be kd', by the following equation:

$$A_k = \sqrt{\frac{2\Delta n f k m \lambda}{n_0} - \left(\frac{km\lambda}{n_0}\right)^2}$$

where k represents the number of the Fresnel zone counting from the center of the lens, and where the groove thickness d' is constant across the surface of the illustrated birefringent Fresnel lens 704.

In some embodiments, birefringent Fresnel lens 704 includes LCs. The LC molecules may be laterally aligned, or have elongation directions extending, substantially in a lateral direction 720 indicated by the arrow (e.g., y direction). In addition, the alignment directions of the LC molecules may be substantially homogenous throughout the thickness of birefringent Fresnel lens 704 without undergoing rotation. That is, the local director n of the LC molecules may be substantially constant laterally across the area and vertically across the thickness (e.g., in z direction) of the birefringent Fresnel lens 704. The illustrated alignment may be suitable, e.g., for providing polarization selectivity for linearly polarized light. In these embodiments, linearly polarized light having polarization direction that is parallel to the direction of LC alignment (e.g., y direction) may experience one of $n_e$ or $n_o$, while linearly polarized light having polarization direction that is perpendicular to the direction of LC alignment (e.g., x direction) may experience the other of $n_e$ or $n_o$. As a result, lens stack 700 exerts an optical power of Δn/R for light having one linear polarization while exerting a substantially zero optical power for light having the other linear polarization, as described above.

In various embodiments herein and throughout the specification, the birefringent Fresnel lens 704 can have an average, a local, a mean, a median, a maximum or a minimum birefringence Δn of 0.05-0.10, 0.15-0.20, 0.20-0.25, 0.25-0.30, 0.30-0.35, 0.35-0.40, 0.40-0.45, 0.45-0.50, 0.50-0.55, 0.55-0.60, 0.60-0.65, 0.65-0.70, or any value within any range defined by any of these values, for instance 0.05-0.40. In addition, birefringent Fresnel lens 704 can a have a within-layer birefringence (Δn) range of 0.01-0.05, 0.05-0.10, 0.15-0.20, 0.20-0.25, 0.25-0.30, 0.30-0.35, 0.35-0.40, or any value within any range defined by any of these values.

In various embodiments herein and throughout the specification, birefringent Fresnel lens 704 has a thickness of about 0.1 μm-200 μm, 0.1-5 μm, 5-50 μm, 50-100 μm, 100-150 μm, 150-200 μm, or a value within any range defined by these values, for instance 5-200 μm.

Adaptive Lens Assemblies Comprising Polarization-Selective Lens Stack Coupled with Switchable Waveplate To provide images at a plurality of depth planes with high efficiency over a wide range of the visible spectrum, adaptive lens assemblies according to various embodiments include a polarization-selective lens stack (e.g., 600 in FIGS. 6A-6C, 700 in FIG. 7B) comprising a birefringent lens and an isotropic lens. According to various embodiments, adaptive lens assemblies can be selectively switched between a plurality of states with different optical powers. In the following, adaptive lens assemblies are disclosed, in which the selective switching is performed by activating or deactivating a switchable waveplate coupled to a polarization-selective lens included in the adaptive lens assembly according to embodiments.

Figure 8B:
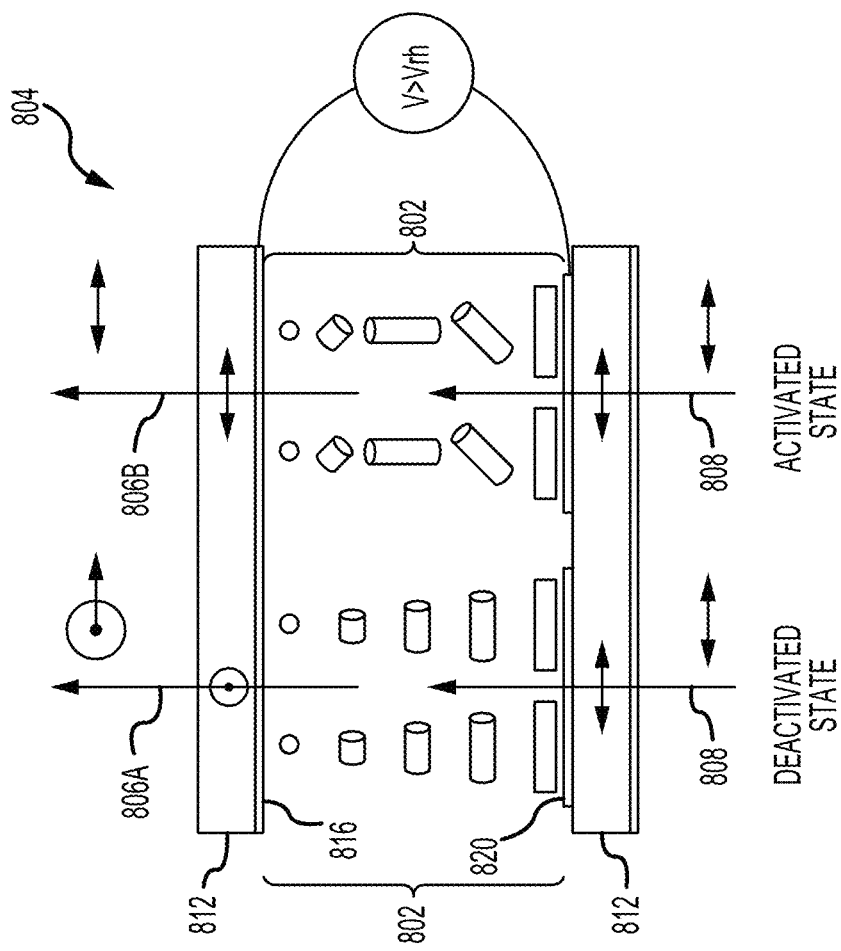
FIG. 8B illustrates the switchable waveplate comprising twisted nematic liquid crystals of adaptive lens assembly illustrated in FIG. 8A.
Figure 8A:
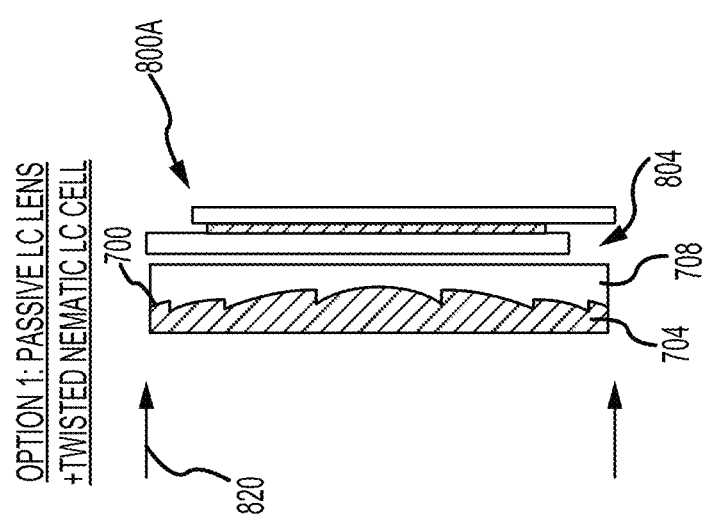
FIG. 8A illustrates a cross-sectional view of an example adaptive lens assembly comprising a polarization-selective lens stack coupled with a switchable waveplate comprising twisted nematic liquid crystals.

Referring to FIG. 8A, in some embodiments, an adaptive lens assembly 800A is configured to be activated or deactivated by employing a switchable waveplate 804 comprising LCs in the same optical path as polarization-selective lens stack 700 described above comprising birefringent Fresnel lens 704 and isotropic lens 708. Fresnel lens 704 may be formed using LCs or other birefringent materials. Adaptive lens assembly 800A may be selectively switched between different states by electrically activating and deactivating switchable waveplate 804 (or otherwise changing the states of the waveplate, e.g., by applying different voltages). One example of the switchable waveplate 804 is illustrated with respect to FIG. 8B.

Referring to FIG. 8B, in some embodiments, switchable waveplate 802 may be a half waveplate or a polarization rotator comprising a layer 802 of unpolymerized twisted nematic (TN) liquid crystals (LCs), or reactive mesogens (RM) comprising TN LC molecules, which is configured to be switched upon application of an electric field across a thickness of layer 802 of TN LCs. Layer 802 of TN LCs is disposed between a pair of transparent substrates 812. Each of transparent substrates 812 has formed on the inner surface a conducting transparent electrode 816, 820. In some embodiments, transparent electrodes 816, 820 may serve as substrates, and one or both of substrates 812 may be omitted.

The surfaces of transparent electrodes 816, 820 and/or substrates 812 may be configured such that the TN LC molecules in contact with or immediately adjacent to upper electrode 816 tend to orient with their long axes extending in a first lateral direction, while the TN LC molecules in contact with or immediately adjacent to lower electrode 820 tend to orient with their long axes extending in a second lateral direction, which may cross, e.g., to form an angle of about 90 degrees relative to, the first lateral direction. Accordingly, the TN LC molecules between electrodes 816, 820 undergo a twist.

Still referring to FIG. 8B (left), in operation, in the absence of an electric field (deactivated state) across TN LC layer 802, the nematic director of the TN LC molecules undergoes a smooth 90 degree twist across the thickness of TN LC layer 802. As illustrated, incident light 808 polarized in a first direction (same direction as the LC molecules closest to lower electrodes 812) is incident on the TN LC layer 802. The twisted arrangement of the TN LC molecules within TN LC layer 802 serves as an optical wave guide and rotates the plane of polarization by a quarter turn (90 degrees) prior to the light reaching upper electrodes 816. In this state, TN LC layer 802 serves to shift the polarization direction of linearly polarized light passing therethrough from one linear polarization direction to another. Thus, transmitted light 806A is polarized in a second direction (same direction as the LC molecules closes to upper electrodes 816) opposite the first direction.

On the other hand, when a voltage exceeding a threshold voltage (V>Vth) of TN LC switchable waveplate 804 is applied to across electrodes 816, 820 (right, activated state), the TN LC molecules within TN LC layer 802 tend to align with the resulting electric field and the optical wave guiding property of TN LC layer 802 described above with respect to the deactivated state is lost. In this state, TN LC layer 802 serves to preserve the polarization direction of light passing therethrough. Thus, incident light 808 and transmitted light 806B are polarized in the same first direction (same direction as the LC molecules closest to lower electrodes 820). When the electric field is turned off, the TN LC molecules relax back to their twisted state and the TN LC molecules of TN LC layer 802 in the activated state returns to the configuration of TN LC molecules of TN LC layer 802 in the deactivated state (left).

Still referring to FIG. 8A, in operation, as described above, polarization-selective lens stack 700 exerts a lens power to incident light 820 passing therethrough depending on the polarization direction of incident light 820. After having or not having exerted optical power thereto, depending on the relative polarization direction of the incident light, the light is incident on switchable waveplate 804. As described above, the LCs of switchable waveplate 804 are configured such that, when activated, e.g., electrically activated, the polarization of a linearly polarized light passing therethrough is preserved, while when deactivated, e.g., electrically deactivated, the polarization of the linearly polarized light passing therethrough is altered, e.g., flipped or rotated. That is, a linearly vertical polarized (LVP) light beam is converted to a linearly horizontal polarized (LHP) light beam and vice versa, or the polarization is preserved, depending on whether switchable waveplate 804 is activated or deactivated.

In operation, the LCs of birefringent Fresnel lens 704 are configured such that, when the polarization direction of linearly polarized incident light 820 is parallel to the optic axis of birefringent Fresnel lens 704, polarization-selective lens stack 700 exerts an optical power thereto, as described above with respect to FIG. 6B, while when the polarization direction of linearly polarized incident light 820 is perpendicular to the optic axis, polarization-selective lens stack 700 exerts substantially zero optical power thereto, as described above with respect to FIG. 6C. After passing through birefringent lens stack 700, when activated, e.g., electrically activated, the polarization of a linearly polarized light passing through the switchable waveplate 804 is preserved, while when deactivated, e.g., electrically deactivated, the polarization of the linearly polarized light passing through switchable waveplate 804 is flipped or rotated, due to rearrangement of liquid crystal molecules.

With respect to FIGS. 8A-8B, adaptive lens assemblies comprising a passive polarization-selective lens stack coupled with a waveplate (FIG. 8A) for switchably exerting lens power have been described. The inventors have recognized that, by arranging a plurality of such elements, adaptive lens assemblies having a plurality of different lens powers can be formed. Thus, in the following, embodiments of adaptive waveplate lens assemblies comprising a plurality of passive polarization-selective lens stacks coupled with waveplates are disclosed. Such adaptive lens assemblies may be integrated with a waveguide either on the user side or the world side, to form display devices described with respect to, e.g., FIGS. 3A and 3B.

Figure 9A:
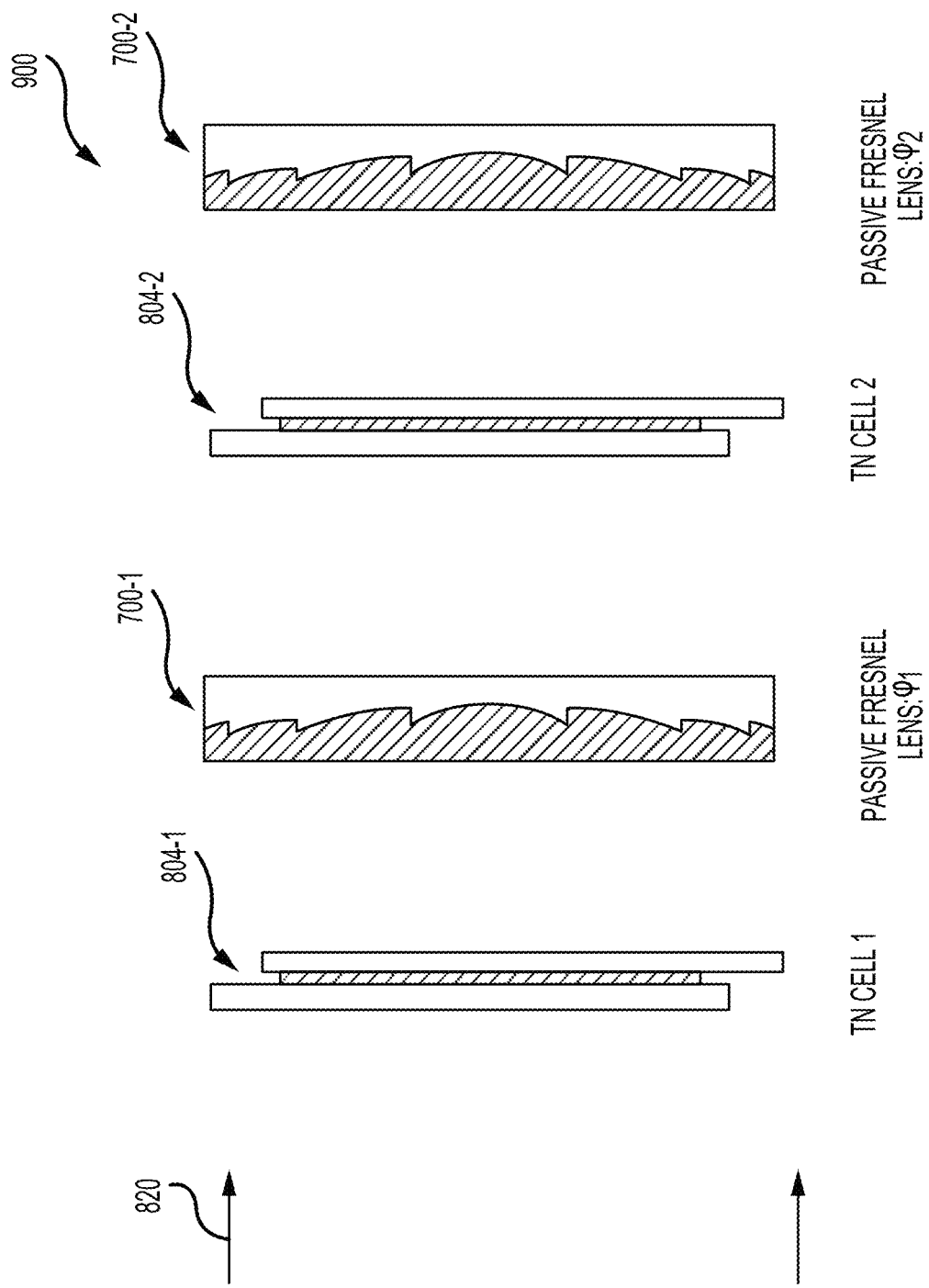
FIG. 9A illustrates a cross-sectional view of an example adaptive lens assembly comprising a first polarization-selective lens stack coupled with a first switchable waveplate comprising twisted nematic liquid crystals and a second polarization-selective lens stack coupled with a second switchable waveplate comprising twisted nematic liquid crystals.

FIG. 9A illustrates an example of an adaptive lens assembly 900 comprising a plurality of passive polarization-selective lens stacks and a plurality of waveplates that are alternatingly arranged to exert a plurality, e.g., at least four, possible optical powers to light passing therethrough. Adaptive lens assembly 900 comprises, in the order of light passing therethrough, a first switchable waveplate (HWP1) 804-1, e.g., a half waveplate, a first polarization-selective lens stack (L1) 700-1, a second switchable waveplate (HWP2) 804-2, e.g., a half waveplate, and a second polarization-selective lens stack (L2) 700-2. Each of HWP1 804-1 and HWP2 804-2 is configured in a manner similar to that described above with respect to FIGS. 8A and 8B. In addition, each of L1 700-1 and L2 700-2 is configured in a similar manner to that described above with respect to FIGS. 6A-6C, 7A-7B and 8A-8B. However, first and second polarization-selective lens stacks 700-1, 700-2 have different optic axes, different curvature (e.g., effective radii of curvature) and/or different birefringence. That is, L1 700-1 has a first optic axis (extending in a vertical or y direction) and is configured to exert a first optical power $\phi_1$ of $\Delta_{n1}/R_1$ or substantially zero to light incident thereon having a polarization direction parallel or perpendicular to the optic axis, respectively, while the 700-2 has a second optic axis (extending in a horizontal or x-axis) and is configured to exert a second optical power $\phi_2$ of $\Delta n_2/R_2$ or substantially zero to light incident thereon having a polarization direction parallel or perpendicular to the optic axis, respectively.

Figure 9B:
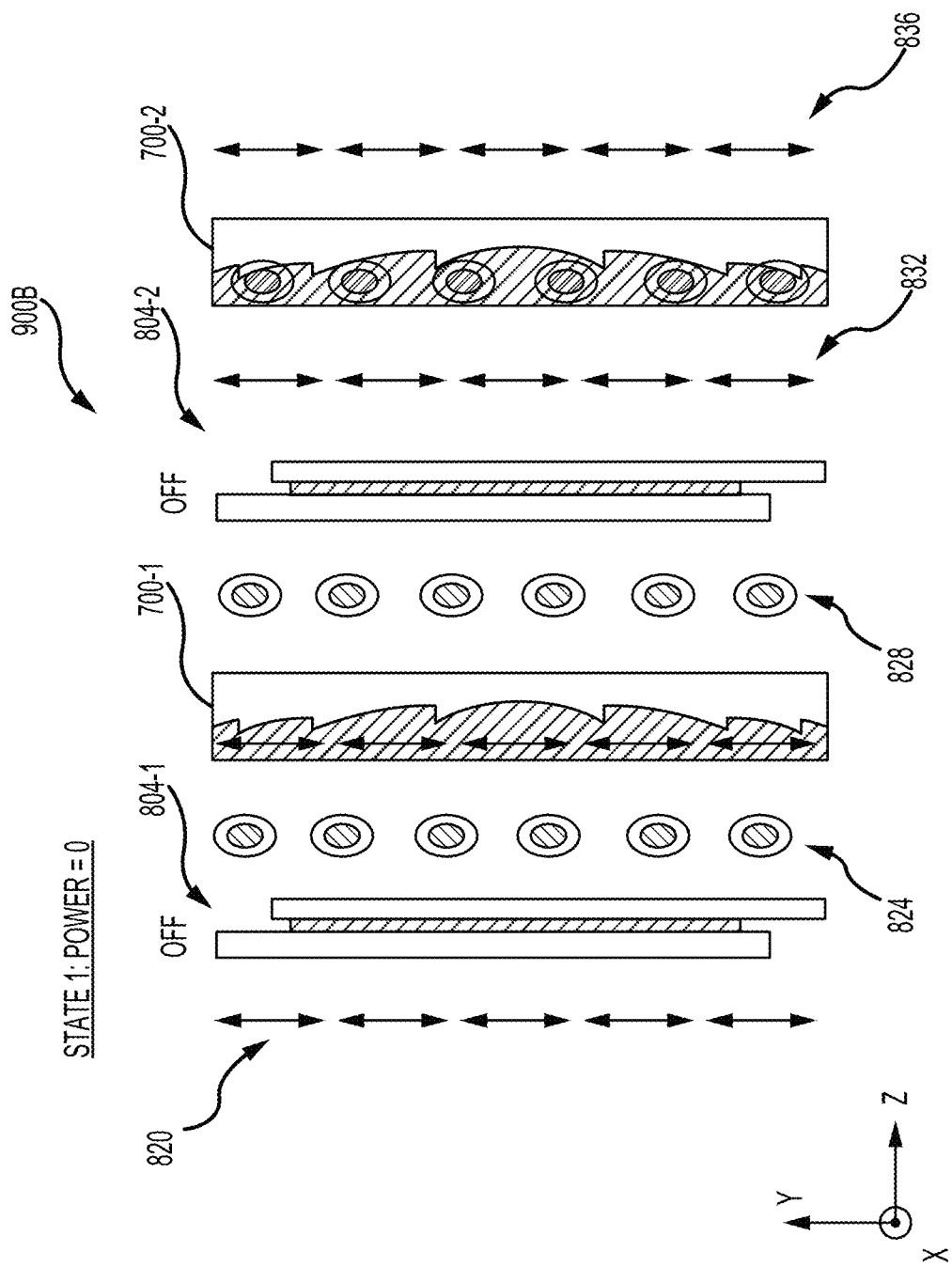
Figure 9D:
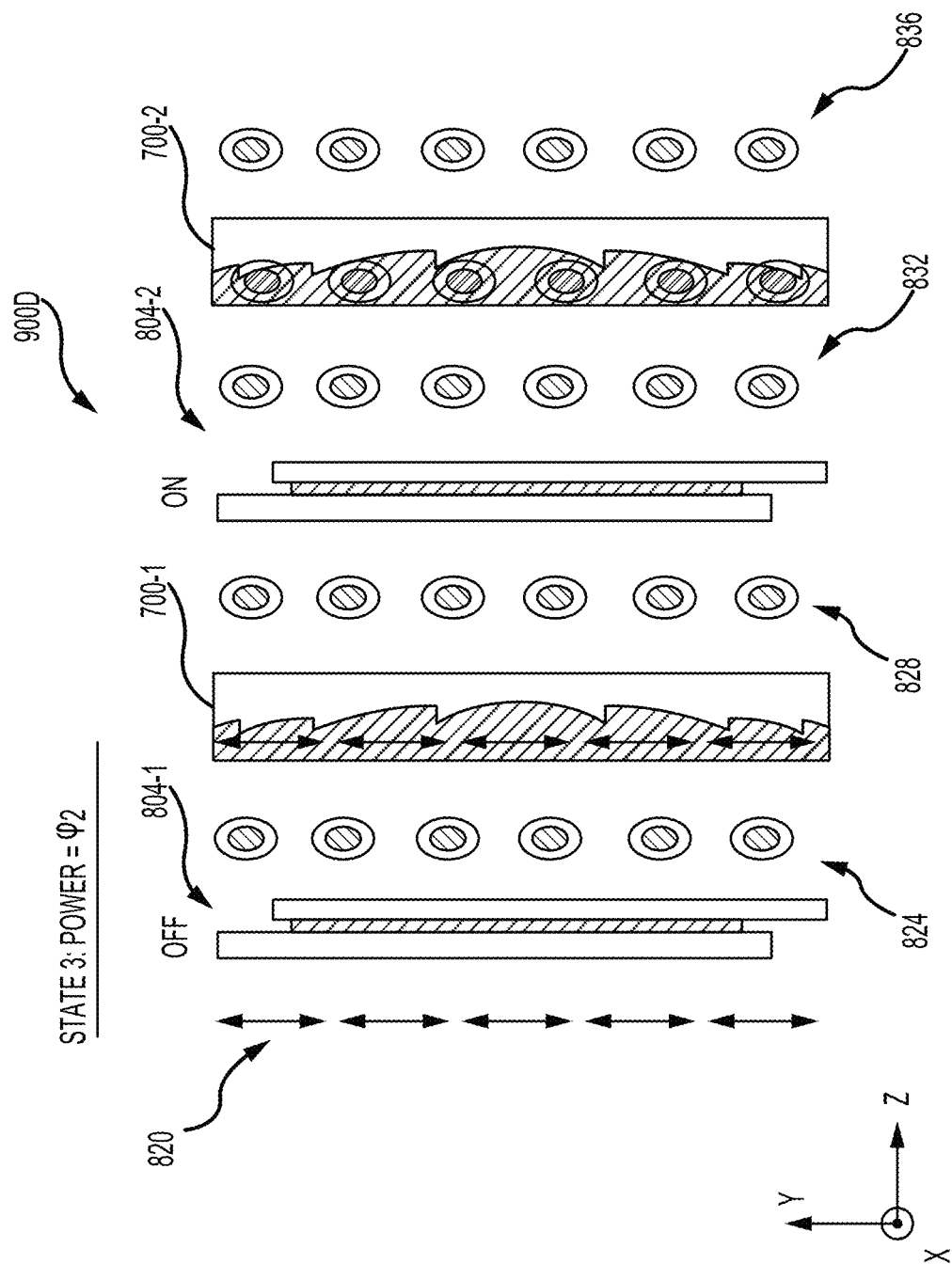
Figure 9E:
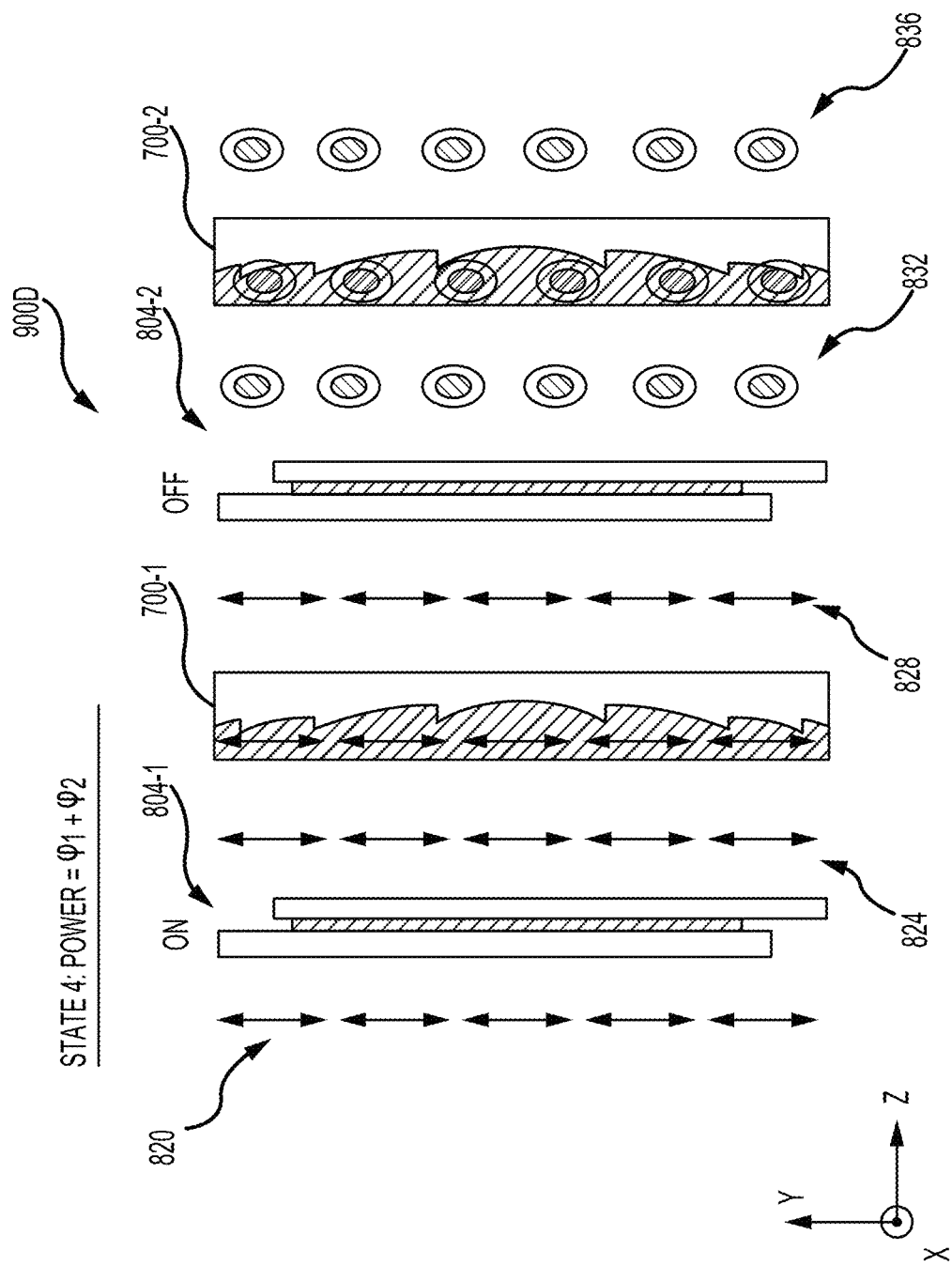

FIGS. 9B-9E illustrate the adaptive lens assembly 900 in operation, for incident light 820 having a polarization parallel to the optic axis of L1 700-1, at four different states corresponding to HWP1 804-1/HWP 804-2 being deactivated (OFF)/deactivated (OFF) (FIG. 9B), activated (ON)/activated (ON) (FIG. 9C), OFF/ON (FIG. 9D), and ON/OFF (FIG. 9E). As described above, each of HWP1 804-1 and HWP2 804-2 can be turned OFF and ON, or deactivated and activated, by removing and applying a voltage across the TN LC layer. Each of HWP1 804-1 and HWP2 804-2 is configured to alter a polarization state, e.g., rotate or invert a polarization state, of light passing therethrough when electrically deactivated (OFF), while being configured to substantially pass light without altering the polarization state of light passing therethrough when activated (ON). The electrical signal, e.g., a current signal or a voltage signal, for switching each of HWP1 804-1 and HWP2 804-2 may be provided by a switching circuit (not shown) electrically connected thereto. For illustrative purposes, in the following, both HWP1 804-1 and HWP2 804-2 are TN LC cells having optic axes along the y and x directions at their two substrates respectively, similar to FIG. 8B. In the illustrated embodiment, the incident light 820 has a polarization parallel to y direction, i.e., a linear vertical polarization (LVP). However, it will be appreciated that the polarization axis of incident light 820 can be polarized in a different direction, a linear horizontal polarization (LHP), to achieve the different optical power states.

Referring to FIG. 9B, each of HWP1 804-1 and HWP2 804-2 are in the OFF state and configured to rotate the polarization of linearly polarized light having one of LVP and LHP into linearly polarized having the other of LVP and LHP. Thus, incident light 820 having LHP, upon passing through HWP1 804-1, is converted to light 824 incident on L1 700-1 having LHP, which exerts substantially zero optical power ($\phi_1$=0) due to the relative orthogonal orientations between the polarization of light 824 and the optic axis of the L1 700-1. Thereafter, light 828 having LHP incident on HWP2 804-2 is converted to light 832 having LVP. L2 700-2 exerts substantially zero optical power ($\phi_2$=0) due to the relative orthogonal orientations between the polarization of L2 700-2 and the optic axis of L2 700-2. In sum, adaptive lens assembly 900 exerts a net power $\phi_1+\phi_2$ equal to about zero to the incident light 820 having LVP and does not alter its polarization, thereby outputting light 836 having LVP.

Referring to FIG. 9C, each of HWP1 804-1 and HWP2 804-2 are in the ON state and configured to preserve the polarization of linearly polarized light passing therethrough. Thus, the polarization of incident light 820 having LVP, upon passing through HWP1 804-1, is preserved into light 824 incident on L1 700-1, which exerts an optical power ($\phi_1$) due to the relative parallel orientations between the polarization of light 824 and the optical axis of L1 700-1. Thereafter, the polarization of light 828 having LVP incident on HWP2 802-2 is preserved into light 832. L2 700-2 exerts substantially zero optical power ($\phi_2$=0) due to the relative orthogonal orientations between the polarization of light 832 and the optic axis of L2 700-2. In sum, adaptive lens assembly 900 exerts a net power $\phi_1+_2$ equal to about $\phi_1$ to incident light 820 having LVP and outputs light 836 having LVP.

Referring to FIG. 9D, HWP1 804-1 is in the OFF state and configured to rotate the polarization of linearly polarized light having one of LVP and LHP into linearly polarized having the other of LVP and LHP, while HWP2 804-2 is in the ON state and configured to preserve the polarization of linearly polarized light. Thus, incident light 820 having LVP, upon passing through HWP1 804-1, is converted to light 824 incident on L1 700-1 having LHP, which exerts substantially zero optical power ($\phi_1$=0) due to the relative orthogonal orientations between the polarization of light 824 and the optic axis of L1 700-1. Thereafter, the polarization of light 828 having LHP passing through HWP2 802-2 is preserved into light 832. The light 832 incident on L2 700-2 has LHP, which exerts an optical power ($\phi_2$) due to the relative parallel orientations between the polarization of light 832 and the optic axis of L2 700-2. In sum, adaptive lens assembly 900 exerts a net power $\phi_1+\phi_2$ equal to about $\phi_2$ to incident light 820 having LVP and outputs light 836 having LHP.

Referring to FIG. 9E, HWP1 804-1 is in the ON state and configured to preserve the polarization of linearly polarized light, while HWP2 804-2 is in the OFF state and is configured to rotate the polarization of linearly polarized light having one of LVP and LHP into linearly polarized having the other of LVP and LHP. Thus, the polarization of incident light 820 having LVP, upon passing through HWP1 804-1, is preserved into light 824 incident on L1 700-1 having LVP, which exerts an optical power ($\phi_1$) due to the relative parallel orientations between the polarization of light 824 and the optic axis of L1 700-1. Thereafter, light 828 having LVP passing through HWP2 804-2 is converted into light 832 having LHP. L2 700-2 exerts an optical power ($\phi_2$) due to the relative parallel orientations between the polarization of light 832 and the optic axis of L2 700-2. In sum, adaptive lens assembly 900 exerts a net power $\phi_1+\phi_2$ to incident light 820 having LVP and outputs light 836 having LHP.

Thus, as illustrated by FIGS. 9A-9E, for light with linear polarization, four possible net powers (0, $\phi_1$, $\phi_2$. and $\phi_1+\phi_2$) can be exerted on the light passing though the adaptive lens assembly 900. By way of a numerical example, for $\phi_1$=0.75 D and $\phi_2$=1.5 D for the design wavelength, net optical powers of 0, 0.75 D, 1.5 D, and 2.25 D can be obtained using adaptive lens assembly 900.

Still referring to FIGS. 9A-9E in conjunction with FIGS. 3A and 3B, in the illustrated embodiment, incident light 820 may represent a light beam incident on either world-side adaptive lens assembly 204 or user-side adaptive lens assembly 208. By placing adaptive lens assembly 900 on either or both sides, display systems described above, e.g., with respect to FIGS. 3A and 3B, can be implemented, according to various embodiments as described herein.

Display Devices Including Adaptive Lens Assemblies Having Polarization-Selective Lens Stack Coupled to Nonpolarizing Waveguide Assembly In the following example implementations, an adaptive lens assembly comprising a plurality of switchable polarization-selective lens stacks (e.g., adaptive lens assembly 900, FIGS. 9A-9E) has been integrated into a display device, such as for example, a display device such as described supra with respect to FIGS. 2, 3A, and 3B.

Figure 10:
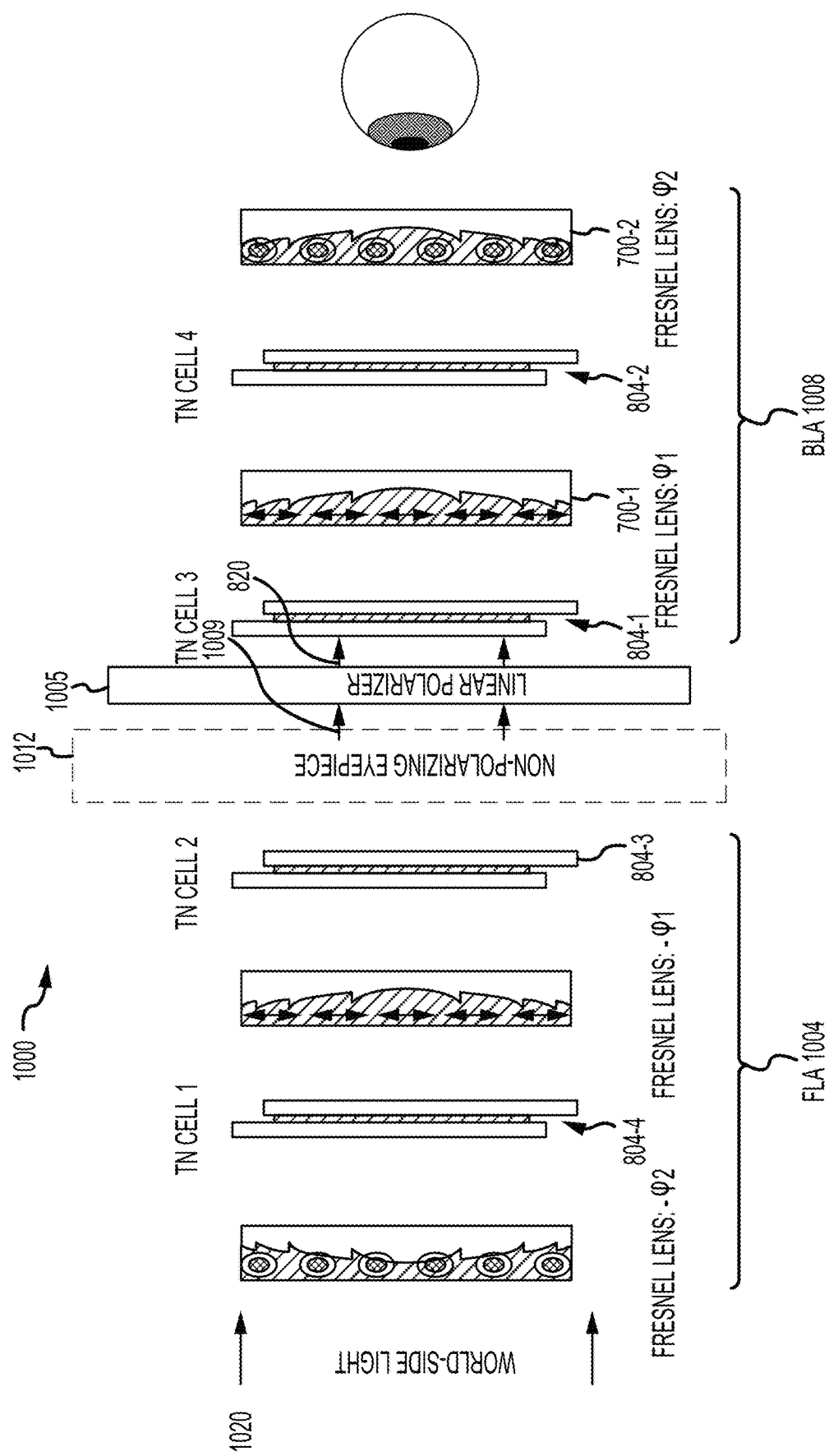
FIG. 10 illustrates a cross-sectional view of an example display device comprising a waveguide assembly interposed between a first adaptive lens assembly and a second adaptive assembly each having a polarization-selective lens stack.

FIG. 10 illustrates an example display device 1000 including a waveguide assembly 1012 interposed between a first or front adaptive lens assembly (FLA) 1004 and a second or back adaptive lens assembly (BLA) 1008. Display device 1000 can be similar to display devices 300A, 300B described above with respect to FIGS. 3A and 3B. In the illustrated embodiment, BLA 1008 is configured similarly to adaptive lens assembly 900 described above with respect to FIGS. 9A-9E, and includes a first switchable waveplate (HWP1) 804-1, a first polarization-selective lens stack (L1) 700-1, a second switchable waveplate (HWP2) 804-2 and a second polarization-selective lens stack (L2) 700-2. First and second polarization-selective lens stacks 700-1, 700-2 have different, e.g., orthogonal optic axes, curvature (e.g., effective radii of curvature) and/or different birefringence, such that L1 700-1 is configured to exert a first optical power $\phi_1$ of $n_1/R_1$ or substantially zero for light incident thereon having a polarization direction parallel or perpendicular to the optic axis, respectively, while L2 700-2 is configured to exert a second optical power $\phi_2$ of $n_2/R_2$ or substantially zero for light incident thereon having a polarization direction parallel or perpendicular to the optic axis, respectively.

FLA 1004 includes a third switchable waveplate (HWP3) 804-3, a third polarization-selective lens stack (L3) 700-3, a fourth switchable waveplate (HWP4) 804-4 and a fourth polarization-selective lens stack (L4) 700-4. Third and fourth polarization-selective lens stacks 700-3, 700-4 have different, e.g., orthogonal optical axes, effective radii of curvature and/or different birefringence, such that L3 700-3 is configured to exert a third optical power $\phi_3$ of $n_3/R_3$ or substantially zero to light incident thereon having a polarization direction parallel or perpendicular to the optic axis, respectively, while the L4 700-4 is configured to exert a fourth optical power $\phi_4$ of $n_4/R_4$ or substantially zero to light incident thereon having a polarization direction parallel or perpendicular to the optic axis, respectively.

In various embodiments, the effective radii of curvature of L1 700-1 and L2 700-2 are such that the $\phi_1$ and $\phi_2$ have a first sign, e.g., positive sign, while the effective radii of curvature of L3 700-3 and L4 700-4 are such that the $\phi_3$ and $\phi_4$ have a second sign opposite the first sign, e.g., negative sign. That is, when the three possible non-zero net powers ($\phi_1$, $\phi_2$, and $\phi_1+\phi_2$) of FLA 1004 may have one of converging or diverging effects (e.g., converging), the three possible non-zero net powers ($\phi_3$, $\phi_4$, and $\phi_3+\phi_4$) of BLA 1008 may have the other of converging or diverging effects (e.g., diverging). In the illustrated embodiment, FLA 1004 and BLA 1008 are configured to be substantially the same, except for the curvatures of the interface between the birefringent and isotropic lenses (e.g., one is concave and other is convex or vice versa, etc.). In particular, FLA 1004 and BLA 1008 form mirror images about waveguide assembly 1012. Thus, as configured, L1 804-1 and L3 804-3 have optical powers $\phi_1$ and $\phi_3$, respectively, that are substantially the same in magnitude but opposite in sign, and L2 804-2 and L4 804-4 have optical powers $\phi_2$ and $\phi_4$, respectively, that are substantially the same in magnitude but opposite in sign. That is, $\phi_1$ is approximately equal to $-\phi_3$, and $\phi_2$ is approximately equal to $-\phi_4$.

Still referring to FIG. 10, in the illustrated embodiment, waveguide assembly 1012 is configured to outcouple unpolarized light that has been totally internally reflected. In this configuration, display device 1000 additionally includes a linear polarizer 1005 between waveguide assembly 1012 and BLA 1008 configured to reduce or eliminate, e.g., reflect or absorb, light having polarization state that does not lead to lens action by BLA 1008. For example, in arrangements where light 1009 outcoupled from waveguide assembly 1012, or light 1020 transmitted through FLA 1004 unaffected is not linearly polarized, e.g., not LVP, linear polarizer 1005 serves to linearly polarize the transmitted light to feed incident light 820 into BLA 1008.

As configured, BLA 1008 serves to provide variable optical powers ($\phi_1$, $\phi_2$, and $\phi_1+\phi_2$) to form images at a plurality of depth planes for the virtual images exiting waveguide assembly 1012 towards the eye of the user. While BLA 1008 provides virtual images by focusing images from waveguide assembly 1012 at a plurality of depth planes, the world image can be distorted by BLA 1008. FLA 1004 serves to compensate the distortion of the world image caused by BLA 1008 by providing variable optical powers ($\phi_3=-\phi_1$, $\phi_4=-\phi_2$, and $\phi_3+\phi_4=-(\phi_1+\phi_2)$), such that the world image is presented to the eye of the user without substantial distortion.

In various embodiments, e.g., when deactivated, each of FLA 1004 and BLA 1008 may provide a net optical power (positive or negative) in the range between about ±5.0 diopters and 0 diopters, ±4.0 diopters and 0 diopters, ±3.0 diopters and 0 diopters, ±2.0 diopters and 0 diopters, ±1.0 diopters and 0 diopters, including any range defined by any of these values, for instance ±1.5 diopters. In some embodiments, FLA 1004 between waveguide assembly 1012 and the world may have a positive optical power, whereas BLA 1008 between waveguide assembly 1012 and the user may have a negative optical power, such that the optical powers of FLA 1004 and BLA 1008 compensate each other in viewing the world.

As described supra, as the images of virtual objects produced by light outcoupled by waveguide assembly 1012 move in 3D, the net optical power of BLA 1008 on the user side is adjusted to adapt to the changing depth of the virtual depth plane. Simultaneously, according to embodiments, the net optical power of FLA 1004 is correspondingly adjusted using a switching circuit, such that the view of the real world does not undesirably become defocused or distorted. To address this and other needs, in some embodiments, display device 1000 comprises a controller (not shown) configured such that, when the net optical power of one of FLA 1004 and BLA 1008 is electrically adjusted, the net optical power of the other of FLA 1004 and BLA 1008 is correspondingly adjusted such that the combined net optical powers remain about constant, e.g., about zero. The controller circuitry and the switchable waveplates are configured such that the time to switch HWP1 804-1, HWP2 804-2, HWP3 804-3 and HWP4 804-4, to adjust the virtual depth planes using user-side adaptive lens assembly 1008 and to compensate the real world view using user-side adaptive lens assembly 1004, is less than about 100 milliseconds, less than about 50 milliseconds, less than about less than about 10 milliseconds, less than about 5 milliseconds, less than about 1 millisecond, or a value within a range defined by any of these values.

Figure 11A:
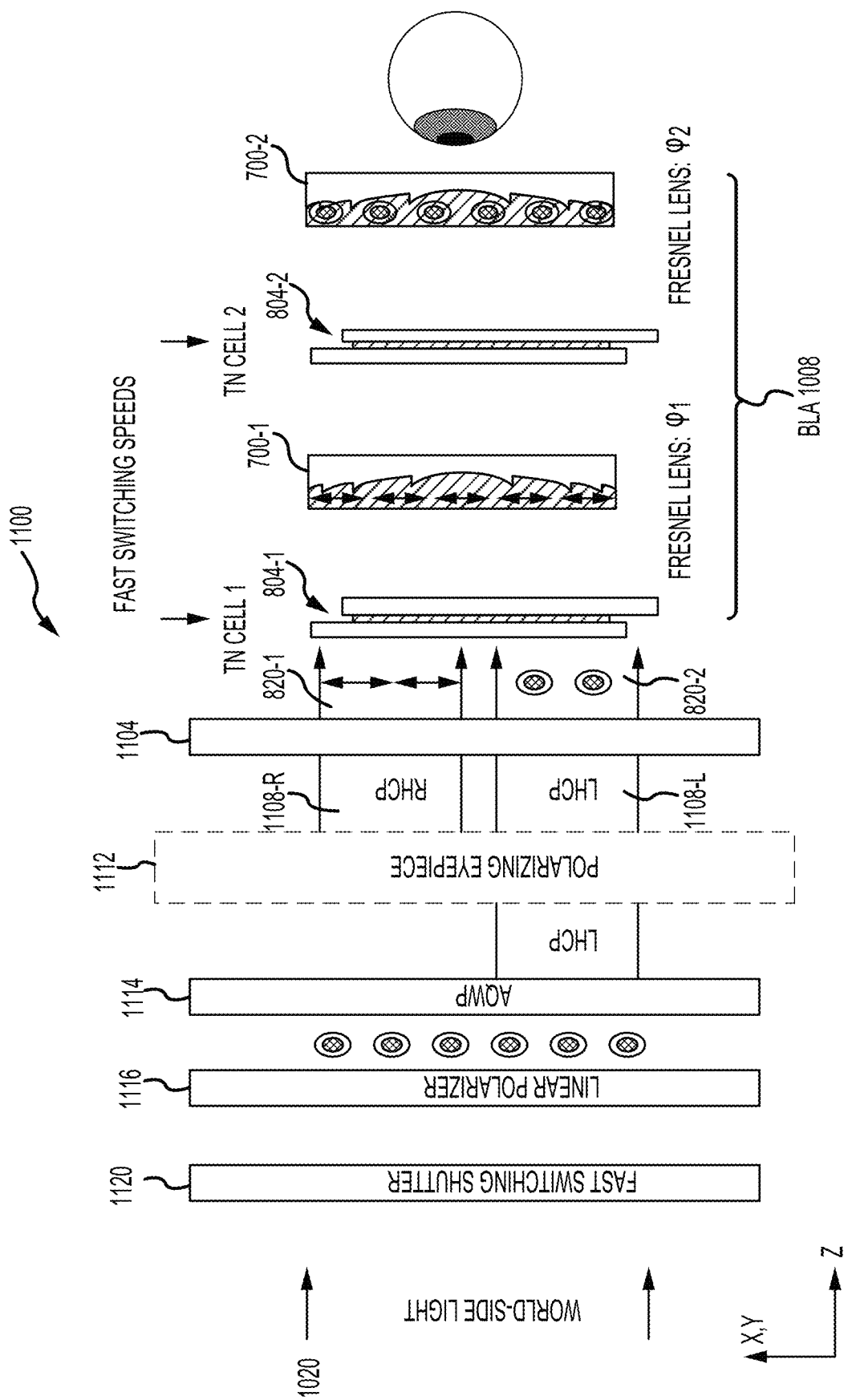
FIG. 11A illustrates a cross-sectional view of an example display device comprising a waveguide assembly interposed between a shutter and a linear polarizer on a first side and an adaptive assembly having a polarization-selective lens stack on a second side.

Display Devices Including Adaptive Lens Assemblies Having Polarization-Selective Lens Stack Coupled to Polarizing Waveguide Assembly FIG. 11A illustrates an example display device 1100 according to some embodiments. Similar to the display device described above with respect to FIG. 10, display device 1100 includes a second adaptive lens assembly (BLA) 1008 that includes a first switchable waveplate (HWP1) 804-1, a first polarization-selective lens stack (L1) 700-1, a second switchable waveplate (HWP2) 804-2 and a second polarization-selective lens stack (L2) 700-2. However, unlike the display device described above with respect to FIG. 10, display device 1100 includes a polarizing waveguide assembly 1112 that outcouples polarized light 1108, e.g., circularly polarized light, into the BLA 1008. Accordingly, BLA 1008 additionally includes a first quarter waveplate (QWP1) 1104, e.g., an achromatic quarter waveplate, configured to convert RHCP light 1108-R and LHCP light 1108-L, outcoupled from the polarizing waveguide assembly 1112 into linear polarized light 820 incident on BLA 1008. Thus, BLA 1008 operates in a similar manner as described above with respect to FIG. 10.

However, unlike display device 1000 of FIG. 10, display device 1100 does not have a FLA 1004 configured to compensate or cancel undesirable optical power exerted by BLA 1008 to world-side light 1020 when BLA 1008 exerts optical power to light from polarizing waveguide assembly 1112 containing virtual image information. Instead, display device 1100 is configured to alternatingly display world image and virtual image. This is achieved by replacing FLA 1004 (FIG. 10) with a combination of a shutter 1120, a linear polarizer 1116 and a second quarter waveplate (QWP2) 1114, e.g., an achromatic quarter waveplate. In the following, polarizing waveguide assembly 1112 is described with respect to FIG. 11B, followed by the operational principles of display device 1100 with respect to FIGS. 11C and 11D.

Figure 11B:
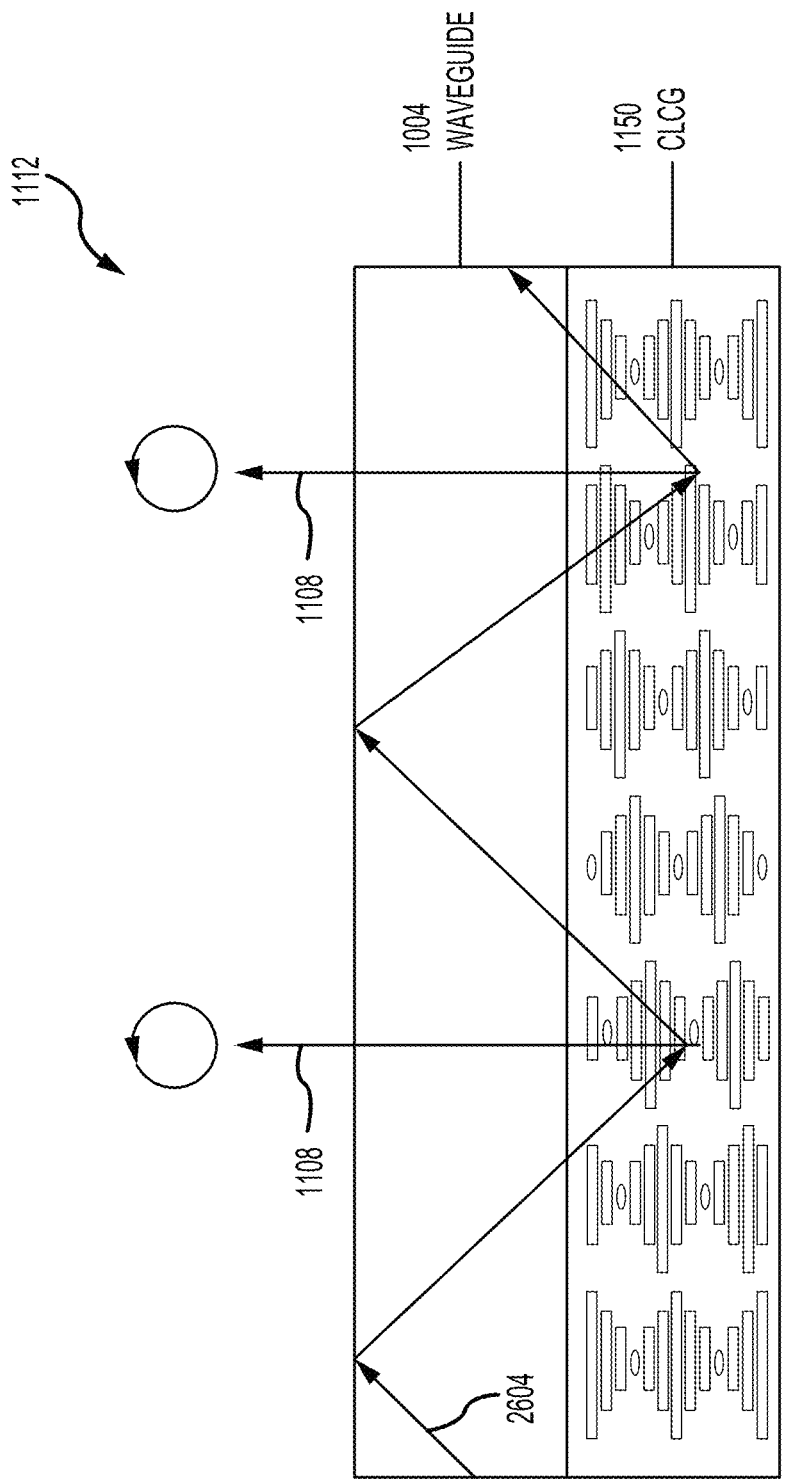
FIG. 11B illustrates the waveguide assembly of the display device of FIG. 11A, comprising cholesteric liquid crystals and configured to outcouple circularly polarized light.

FIG. 11B illustrates an example of polarizing waveguide assembly 1112, according to embodiments. In some embodiments, polarizing waveguide assembly 1112 is configured to output circularly polarized light, e.g., right-handed (RHCP) or left-handed (LHCP) circular polarized light. In various embodiments, polarizing waveguide assembly 1112 may comprise cholesteric liquid crystal (CLC) layers and/or CLC gratings (CLCGs), which in turn comprise liquid crystals arranged to have a plurality of chiral structures. Each of the chiral structures comprises a plurality of liquid crystal molecules that extend in a layer depth direction by at least a helical pitch and are successively rotated in a rotation direction. The CLC layers or CLCGs can advantageously be configured to substantially Bragg-reflect elliptically or circularly polarized light having a handedness of polarization that is matched to the rotation direction of the liquid crystal molecules, while being configured to substantially transmit elliptically or circularly polarized light having a handedness of polarization that is opposite to the rotation direction of the liquid crystal molecules. Based on these properties of the CLC layers and CLCGs, various embodiments of display devices disclosed herein have a polarizing waveguide assembly 1112 comprising one or more CLC layers or CLCGs. Polarizing waveguide assembly 1112 may include a CLCG 1150 configured as an outcoupling optical element, such as an exit pupil expander (EPE), according to embodiments. Polarizing waveguide assembly 1112 comprises a waveguide 1104 coupled to a CLCG 1150 and configured to propagate light by total internal reflection (TIR).

Still referring to FIG. 11B, the liquid crystal molecules of the illustrated CLCG 1150 are successively rotated in a rotation direction, and arrangements of the liquid crystal molecules of the chiral structures vary periodically in a lateral direction (x,y directions) perpendicular to the layer depth direction (z direction). Because of the rotational arrangement of the liquid crystal molecules, when light 2604 is an elliptically/circularly polarized light having a polarization handedness, e.g., one of left-handedness or right-handedness, which matches the direction of rotation of the liquid crystal molecules of the chiral structures, light 2604 is Bragg-reflected by CLCG 1150. That is, the rotational arrangement of the liquid crystal molecules in CLCG 1150 is such that, CLCG 1150 selectively Bragg reflects light having one handedness while non-Bragg reflecting or transmitting light having the opposite handedness. In addition, because Bragg reflection occurs under the diffraction condition, the Bragg reflected light 1108 is unidirectional (e.g., most of the light is directed toward one direction at outcoupling, such as the direction indicated by the arrows 1108 in FIG. 11B). The outcoupled light can preserve a uniform polarization state, which corresponds to the chirality of the CLC material. Thus, when configured as an optical outcoupling element, CLCG 1150 serves as a polarizer and a unidirectional reflector, which allows for efficient integration with other optical components within display device 1100.

Figure 11C:
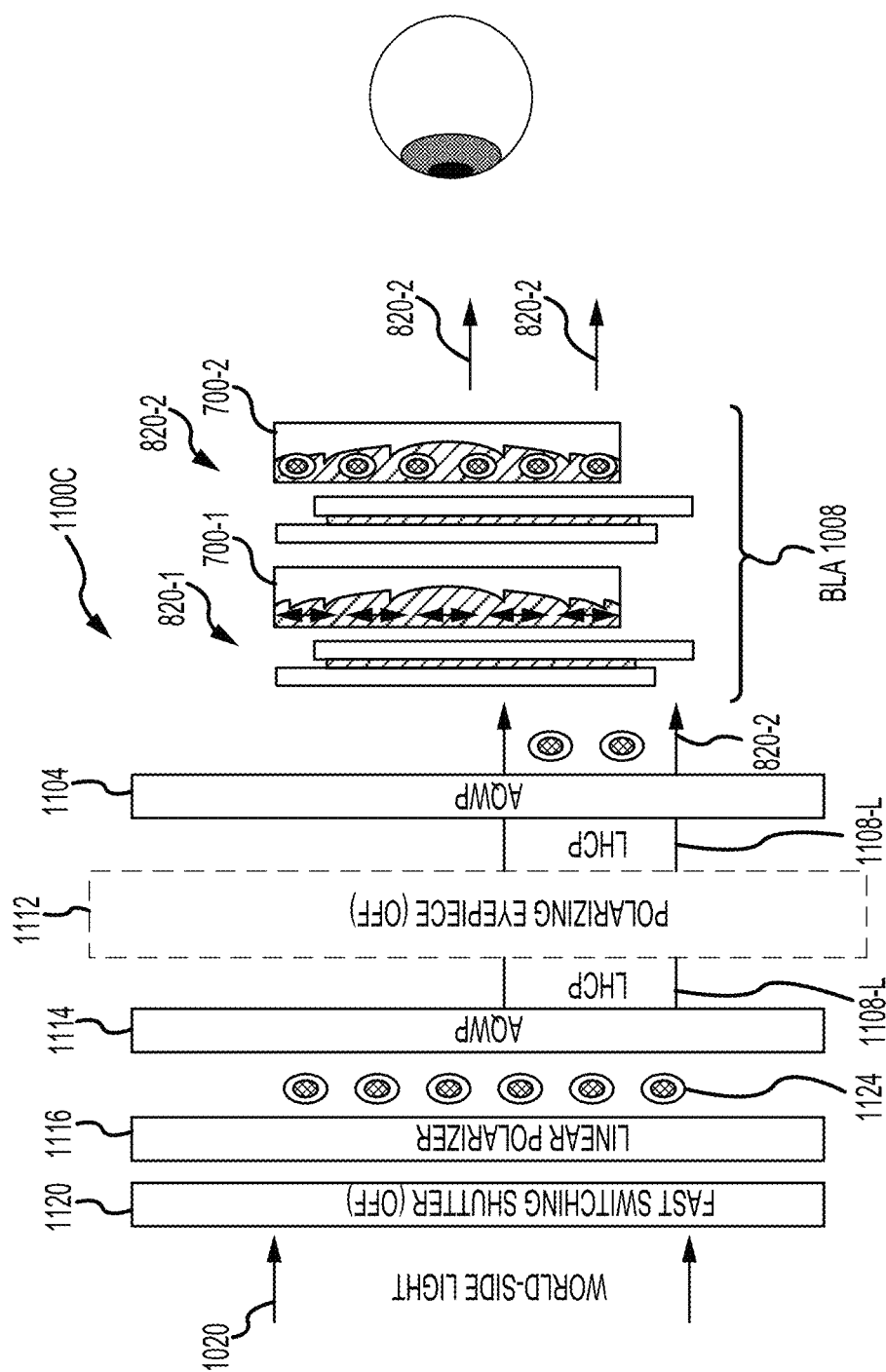
FIG. 11C illustrates the example display device of FIG. 11A in operation, under configuration for viewing world images.
Figure 11D:
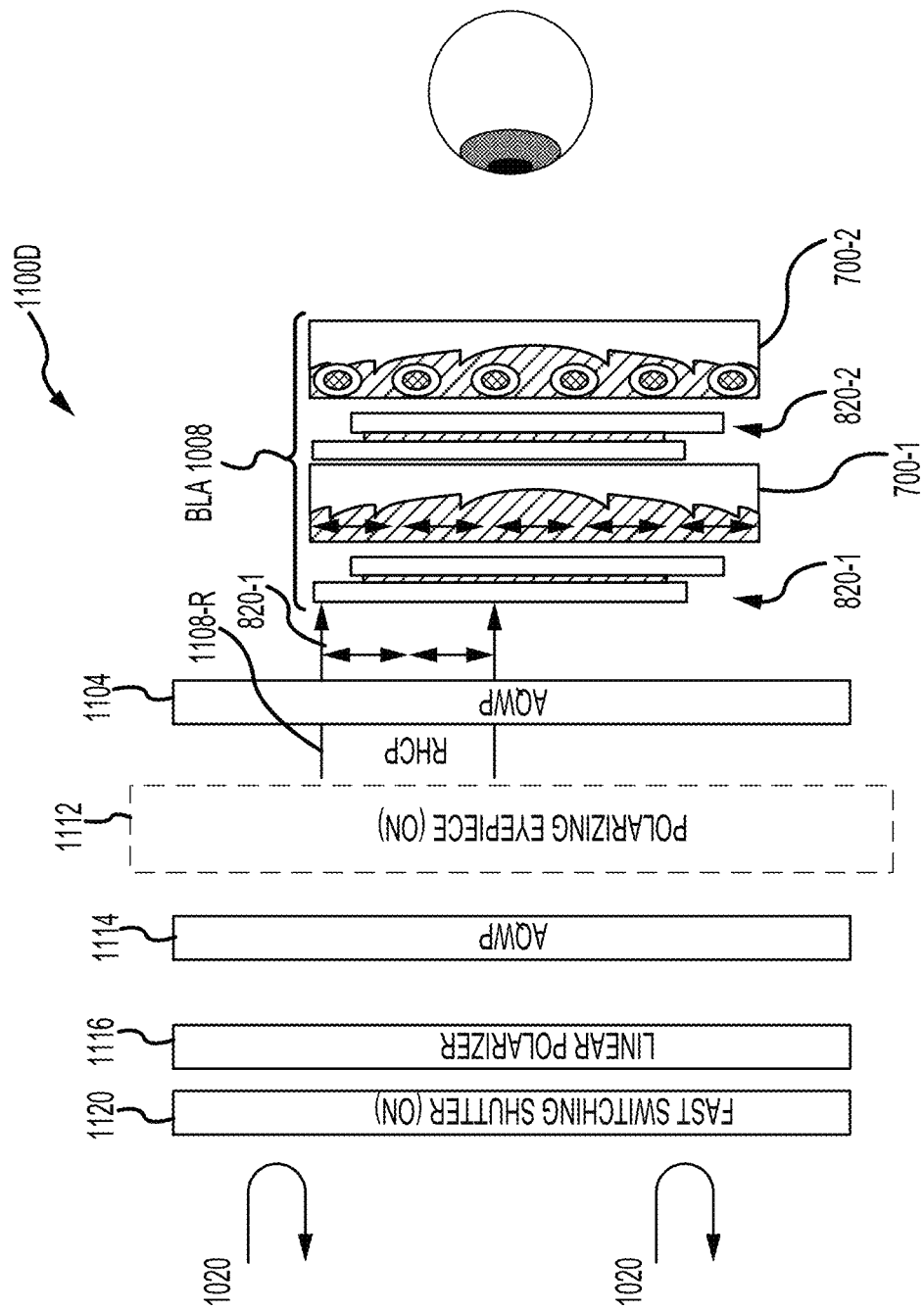
FIG. 11D illustrates the example display device of FIG. 11A in operation, under configuration for viewing virtual images.

As described above, display device 1100 is configured to alternatingly display world image (FIG. 11C) and virtual image (FIG. 11D). Referring to FIG. 11C, when displaying the world image, display device 1100 has a configuration 1100C in which both shutter 1120 and waveguide assembly 1112 are in the OFF state. In addition, both of HWP-1 820-1 and HWP-2 820-2 are in the ON state and OFF state, respectively. As configured, BLA 1008 is configured analogously to state 900B described above with respect to FIG. 9B. Under this configuration, light 1020 from the world, which is unpolarized, is transmitted through the shutter 1120 essentially unaffected and is linearly polarized, e.g., horizontally linearly polarized (LHP) into light 1124 by linear polarizer 1116. Light 1124 is converted to circularly polarized light 1108-L, e.g., LHCP light, which is incident on the polarizing waveguide assembly 1112. Light 1108-L passes through polarizing waveguide assembly 1112 in the OFF state essentially unaffected, and is converted by QWP1 1104 into linearly polarized light 820-2 that is linearly polarized, e.g., LHP. BLA 1008 is configured to exert substantially zero optical power, analogously to the state described above with respect to FIG. 9B, thereby passing light 820-2 essentially unaffected to be seen by the eye.

Referring to FIG. 11D, when displaying the virtual image, the display device has a configuration 1100D in which both shutter 1120 and waveguide assembly 1112 are in the ON state. Thus, any light 1020 from the world side is blocked, e.g., reflected. Thus, display device configuration 1100D is configured to display substantially only the virtual content outcoupled from polarizing waveguide assembly 1112 described above with respect to FIG. 11B. Light 1108-R having a circular polarization, e.g., RHCP, is incident on QWP2 1104, and BLA 1008 is configured analogously to one of states 900C-900E described above with respect to FIGS. 9C-9E. Under this configuration, circularly polarized light 1108-R is transformed by QWP2 1104 into linearly polarized light 820-1 having a polarization direction, e.g., vertical polarization direction (LVP). BLA 1008 then exerts an optical power according to one of states 900C-900E described above with respect to FIGS. 9C-9E.

As described, display device 1100 is configured to sequentially display world images and virtual images. To display both the world images and the virtual images to a user as if they were simultaneously presented, configurations 1100C (FIG. 11C) and 1100D (FIG. 11D) are time multiplexed with respect to each other at a suitable frequency such that human eyes perceive them as being essentially simultaneous. For example, shutter 1120 and HWP-1 820-1 and HWP-2 820-2 are alternated at a frequency at-least twice as fast as the video refresh rate to minimize any switching artifacts. Advantageously, display device 1100 can reduce the overall number of optical elements by replacing FLA 1008 in display device 1000. To compensate for reduction in intensity of the virtual image due to the multiplexing and polarization, the intensity of outcoupled light 1108-R can be accordingly adjusted according to embodiments.

Figure 12A:
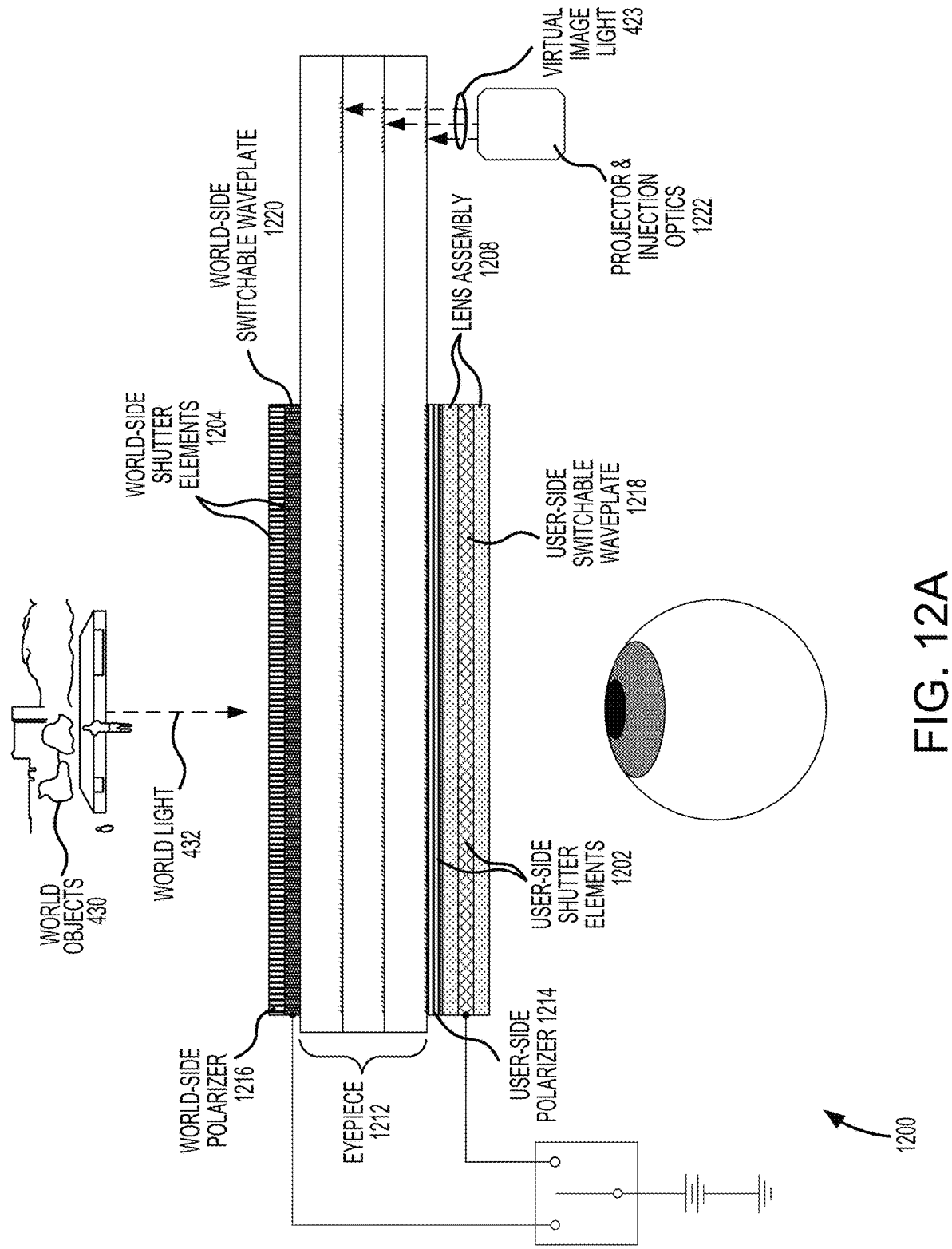
FIG. 12A illustrates an example of a display device having a single adaptive lens assembly on the user side of an eyepiece, according to some embodiments of the present disclosure.

Display Devices Including World-Side and/or User-Side Shutter Elements and User-Side Lens Assembly FIG. 12A illustrates an example of a display device 1200 having a single adaptive lens assembly 1208 on the user side of an eyepiece 1212 (the side of eyepiece 1212 closest to the eye of the user), according to some embodiments of the present disclosure. Lens assembly 1208 may include a variable focal element (VFE) assembly and may be configured to apply positive, negative, or zero optical power to the light passing through it. Display device 1200 may include one or more world-side shutter elements 1204 coupled to the world side of eyepiece 1212 (the side of eyepiece 1212 furthest from the eye of the user and closest to world objects), and one or more user-side shutter elements 1202 coupled to the user side of eyepiece 1212. By sequentially electrically activating world-side shutter elements 1204 and user-side shutter elements 1202 as described herein, world light 432 may pass through display device 1200 with zero net optical power being applied by lens assembly 1208 and virtual image light 423 may pass through with non-zero (e.g., negative) net optical power being applied by lens assembly 1208.

In the illustrated embodiment, world-side shutter elements 1204 include a world-side polarizer 1216 and a world-side switchable waveplate 1220. World-side polarizer 1216 may be positioned closer to world objects 430 such that world light 432 passes first through world-side polarizer 1216 prior to passing through world-side switchable waveplate 1220. Upon passing through world-side polarizer 1216, world light 432 is linearly polarized along a first axis. Accordingly, world-side polarizer 1216 may comprise a linear polarizer. After passing through world-side polarizer 1216, world light 432 passes through world-side switchable waveplate 1220. When electrically activated, world-side switchable waveplate 1220 rotates a polarization of world light 432 by 90 degrees such that, for example, LVP light is converted to LHP light or LHP light is converted to LVP light. When not electrically activated, world-side switchable waveplate 1220 leaves world light 432 substantially unaltered.

In the illustrated embodiment, user-side shutter elements 1202 include a user-side polarizer 1214 and a user-side switchable waveplate 1218. User-side polarizer 1214 may be positioned closer to eyepiece 1212 and world objects 430 such that virtual image light 423 and world light 432 passes first through user-side polarizer 1214 prior to passing through user-side switchable waveplate 1218. Upon passing through user-side polarizer 1214, virtual image light 423 and world light 432 are linearly polarized along a second axis perpendicular to the first axis. Accordingly, user-side polarizer 1214 may comprise a linear polarizer that is perpendicular to world-side polarizer. After passing through user-side polarizer 1214, virtual image light 423 and world light 432 pass through a first layer of lens assembly 1208. As described herein, the first layer of lens assembly 1208 may apply optical power to the light passing therethrough. After passing through the first layer of lens assembly 1208, virtual image light 423 and world light 432 pass through user-side switchable waveplate 1214. When electrically activated, user-side switchable waveplate 1214 rotates a polarization of virtual image light 423 and world light 432 by 90 degrees such that, for example, LVP light is converted to LHP light or LHP light is converted to LVP light. When not electrically activated, user-side switchable waveplate 1214 leaves virtual image light 423 and world light 432 substantially unaltered.

After passing through user-side switchable waveplate 1218, virtual image light 423 and world light 432 pass through a second layer of lens assembly 1208. As described herein, the second layer of lens assembly 1208 may apply optical power to the light passing therethrough so as to cancel or add to the optical power applied to the light when passing through the first layer. For example, the first and second layers of lens assembly 1208 may be configured such that, when user-side switchable waveplate 1218 is electrically activated, light passing through both layers is applied a non-zero net optical power and, when user-side switchable waveplate 1218 is not electrically activated, light passing through both layers is applied a zero net optical power, i.e., is applied no net power. Accordingly, the first and second layers of lens assembly 1208 may be configured so as to apply a positive optical power to light having a first linear polarization and a negative optical power (with equal magnitude) to light having a second linear polarization orthogonal to the first linear polarization.

In some embodiments, the first and second layers of lens assembly 1208 are diffractive waveplate lenses. In some embodiments, lens assembly 1208 may take the form of a different type of VFE, such as an LC Fresnel lens, a deformable lens, or the like. In some embodiments, one or more components of user-side shutter elements 1202 are considered to be subcomponents of lens assembly 1208 (i.e., are considered to be included in lens assembly 1208). In one example, user-side polarizer 1214 is considered to be a subcomponent of lens assembly 1208. In another example, user-side switchable waveplate 1218 is considered to be a subcomponent of lens assembly 1208. In another example, both user-side polarizer 1214 and user-side switchable waveplate 1218 are considered to be subcomponents of lens assembly 1208. Example VFEs and other adaptive lens components, which may represent or be implemented as part of the one or more of the lens assemblies described herein, are described in U.S. patent application Ser. No. 15/902,927 filed on Feb. 22, 2018, published on Aug. 23, 2018 as U.S. Publication No. 2018/0239177, U.S. patent application Ser. No. 15/902,814 filed on Feb. 22, 2018, published on Aug. 23, 2018 as U.S. Publication No. 2018/0239147, U.S. patent application Ser. No. 15/933,297 filed on Mar. 22, 2018, published on Sep. 27, 2018 as U.S. Publication No. 2018/0275394, and U.S. patent application Ser. No. 16/006,080 filed on Jun. 12, 2018, published on Dec. 13, 2018 as U.S. Publication No. 2018/0356639, all of which are expressly incorporated herein by reference in their entirety. Additional examples of such components are provided in U.S. Provisional Patent Application No. 62/639,882, filed Mar. 7, 2018 and U.S. patent application Ser. No. 16/158,041 filed on Oct. 11, 2018, both of which are also expressly incorporated herein by reference in their entirety.

Figure 12B:
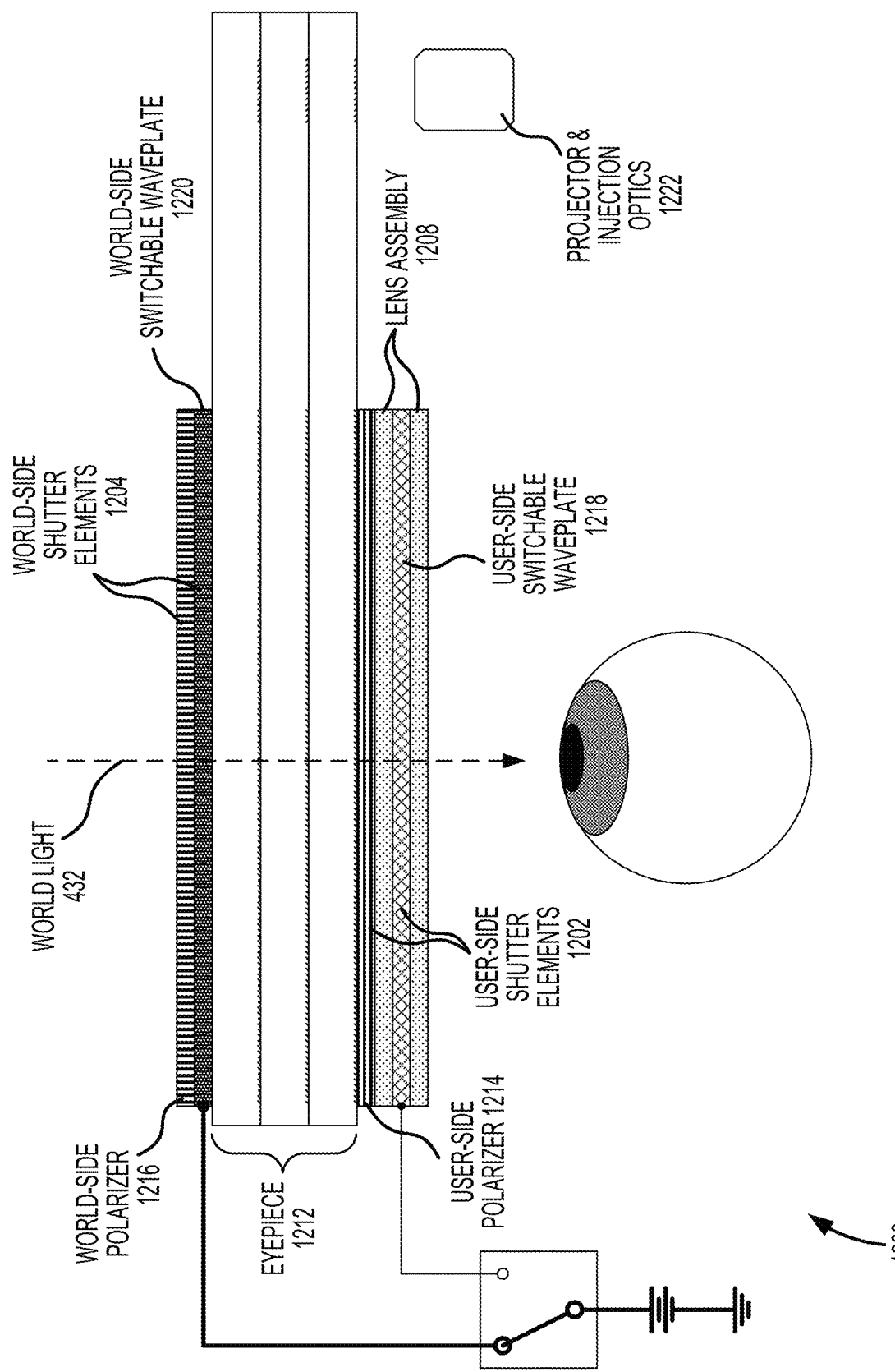
FIG. 12B illustrates an example of a display device operating in accordance with a first state, according to some embodiments of the present disclosure.

FIG. 12B illustrates an example of display device 1200 operating in accordance with a first state, according to some embodiments of the present disclosure. While operating in accordance with the first state, projector and injection optics 1222 are turned off, world-side switchable waveplate 1220 is electrically activated, and user-side switchable waveplate 1218 is not electrically activated. World light 432 is first linearly polarized along a first axis by world-side polarizer 1216. Thereafter, a polarization of world light 432 is rotated by 90 degrees by world-side switchable waveplate 1220. Thereafter, world light 432 is linearly polarized along a second axis perpendicular to the first axis by user-side polarizer 1214. Thereafter, a first layer of lens assembly 1208 applies a first optical power to world light 432. Thereafter, world light 432 passes through user-side switchable waveplate 1218 substantially unaltered. Thereafter, a second layer of lens assembly 1208 applies a second optical power to world light 432 equal in magnitude but opposite in sign to the first optical power, thereby canceling the first optical power. Thereafter, world light 432 reaches the eye of the user.

Figure 12C:
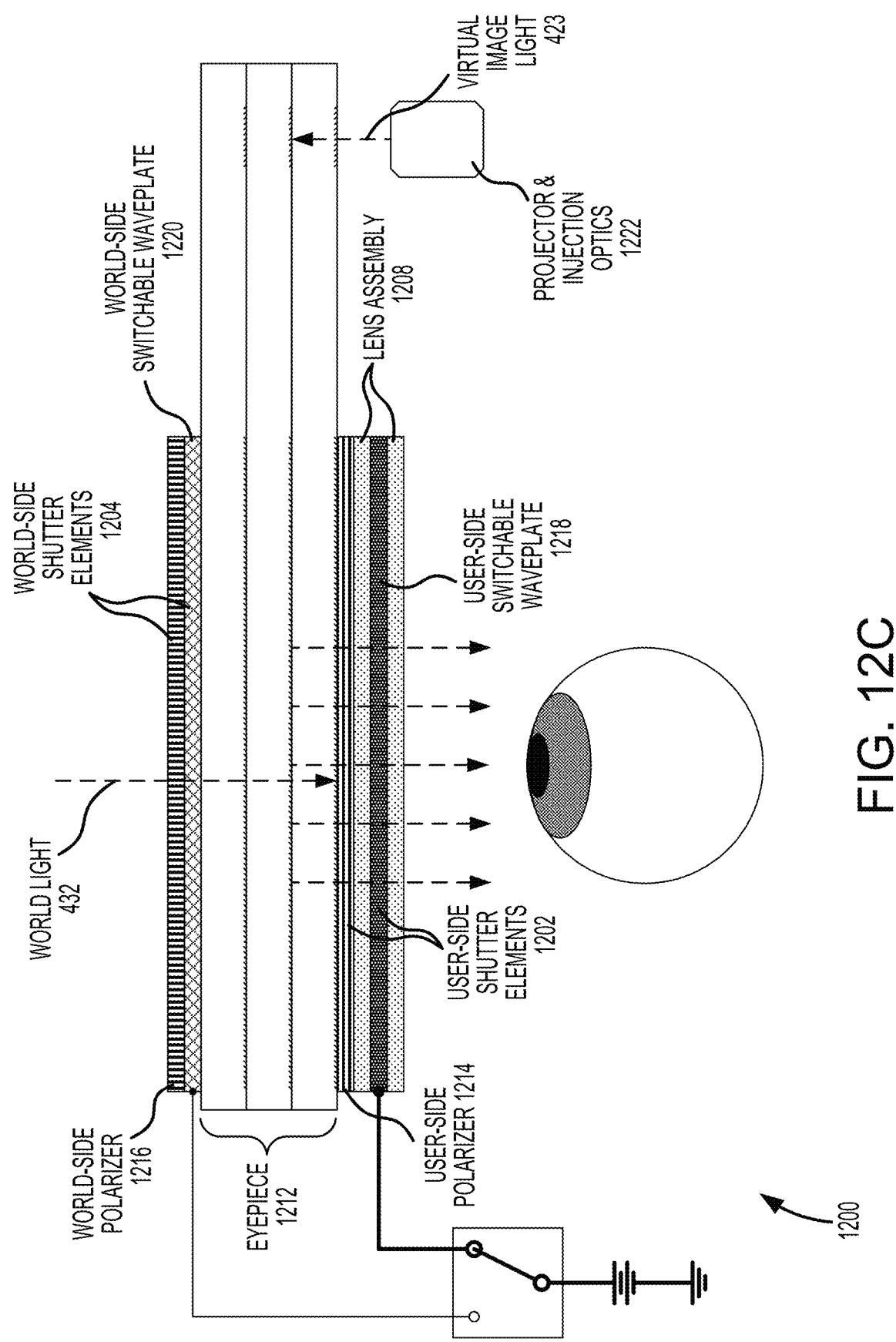
FIG. 12C illustrates an example of a display device operating in accordance with a second state, according to some embodiments of the present disclosure.

FIG. 12C illustrates an example of display device 1200 operating in accordance with a second state, according to some embodiments of the present disclosure. While operating in accordance with the second state, projector and injection optics 1222 are turned on, world-side switchable waveplate 1220 is not electrically activated, and user-side switchable waveplate 1218 is electrically activated. World light 432 impinging on world-side polarizer 1216 is linearly polarized along a first axis by world-side polarizer 1216. Thereafter, world light 432 passes through world-side switchable waveplate 1220 substantially unaltered. Thereafter, world light 432 is linearly polarized along a second axis perpendicular to the first axis by user-side polarizer 1214, causing world light 432 to be completely or at least partially reduced, blocked, or dimmed. Concurrently, virtual image light 423 is projected onto one or more waveguides of eyepiece 1212 by projector and injection optics 1222. Thereafter, virtual image light 423 is outcoupled by eyepiece 1212. Thereafter, virtual image light 423 is linearly polarized along the second axis by user-side polarizer 1214. Thereafter, a first layer of lens assembly 1208 applies a first optical power to virtual image light 423. Thereafter, a polarization of virtual image light 423 is rotated by 90 degrees by user-side switchable waveplate 1218. Thereafter, a second layer of lens assembly 1208 applies a second optical power to virtual image light 423 equal in magnitude and having the same sign as the first optical power, thereby doubling the applied optical power. Thereafter, virtual image light 423 reaches the eye of the user.

Figure 13:
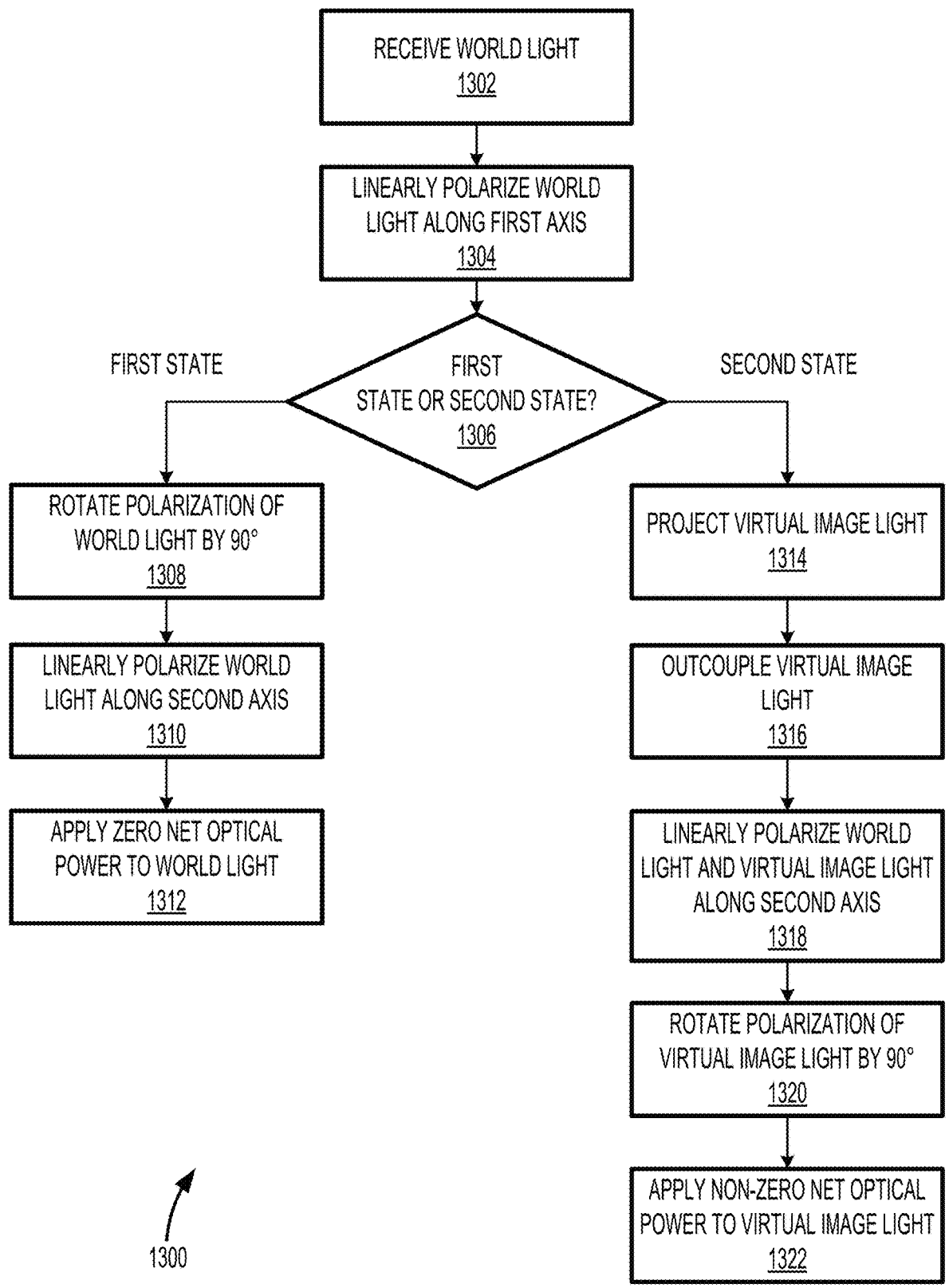
FIG. 13 illustrates a method of operating an optical system, according to some embodiments of the present disclosure.

FIG. 13 illustrates a method 1300 of operating an optical system, according to some embodiments of the present disclosure. One or more steps of method 1300 may be performed in a different order than the illustrated embodiment, and one or more steps of method 1300 may be omitted during performance of method 1300. In some embodiments, one or more steps of method 1300 can be implemented as a computer-readable medium or computer program product comprising instructions which, when the program is executed by one or more computers, cause the one or more computers to at least in part carry out some or all of the steps of method 1300. Such computer program products can be transmitted, over a wired or wireless network, in a data carrier signal carrying the computer program product.

At step 1302, light associated with a world object is received at the optical system. At step 1304, the light associated with the world object is linearly polarized along a first axis. At step 1306, it is determined whether the optical system is operating in accordance with a first state or a second state. When the optical system is operating in accordance with the first state, method 1300 proceeds to step 1308. When the optical system is operating in accordance with the second state, method 1300 proceeds to step 1314. At step 1308, a polarization of the light associated with the world object is rotated by 90 degrees. At step 1310, the light associated with the world object is linearly polarized along a second axis perpendicular to the first axis. At step 1312, zero net optical power is applied to the light associated with the world object. Thereafter, the light associated with the world object reaches the eye of the user.

At step 1314, light associated with a virtual image is projected onto an eyepiece of the optical system. At step 1316, the light associated with the virtual image is outcoupled by the eyepiece. At step 1318, the light associated with the world object and the light associated with the virtual image are linearly polarized along the second axis. At step 1320, a polarization of the light associated with the virtual image is rotated by 90 degrees. At step 1322, non-zero net optical power is applied to the light associated with the virtual image. Thereafter, the light associated with the virtual image reaches the eye of the user.

Figure 14:
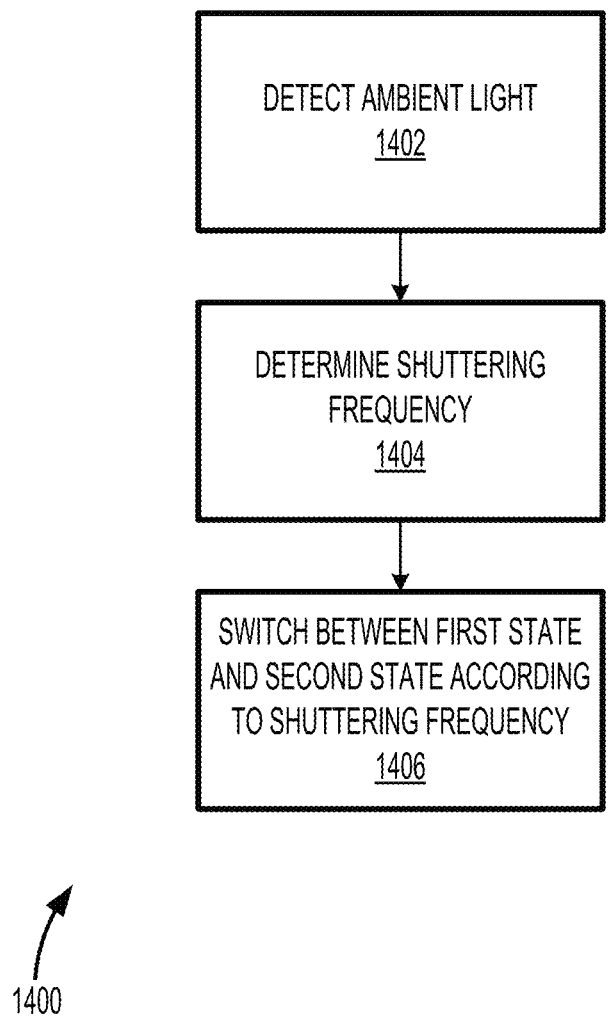
FIG. 14 illustrates a method of operating an optical system, according to some embodiments of the present disclosure.

FIG. 14 illustrates a method 1400 of operating an optical system, according to some embodiments of the present disclosure. One or more steps of method 1400 may be performed in a different order than the illustrated embodiment, and one or more steps of method 1400 may be omitted during performance of method 1400. One or more steps of method 1400 may be combined with one or more steps of method 1300. At step 1402, ambient light is detected by an ambient light sensor. At step 1404, a shuttering frequency is determined based on the detected ambient light. At step 1406, the optical system is caused to switch between operation in accordance with a first state and operation in accordance with a second state based on the shuttering frequency.

Figure 15:
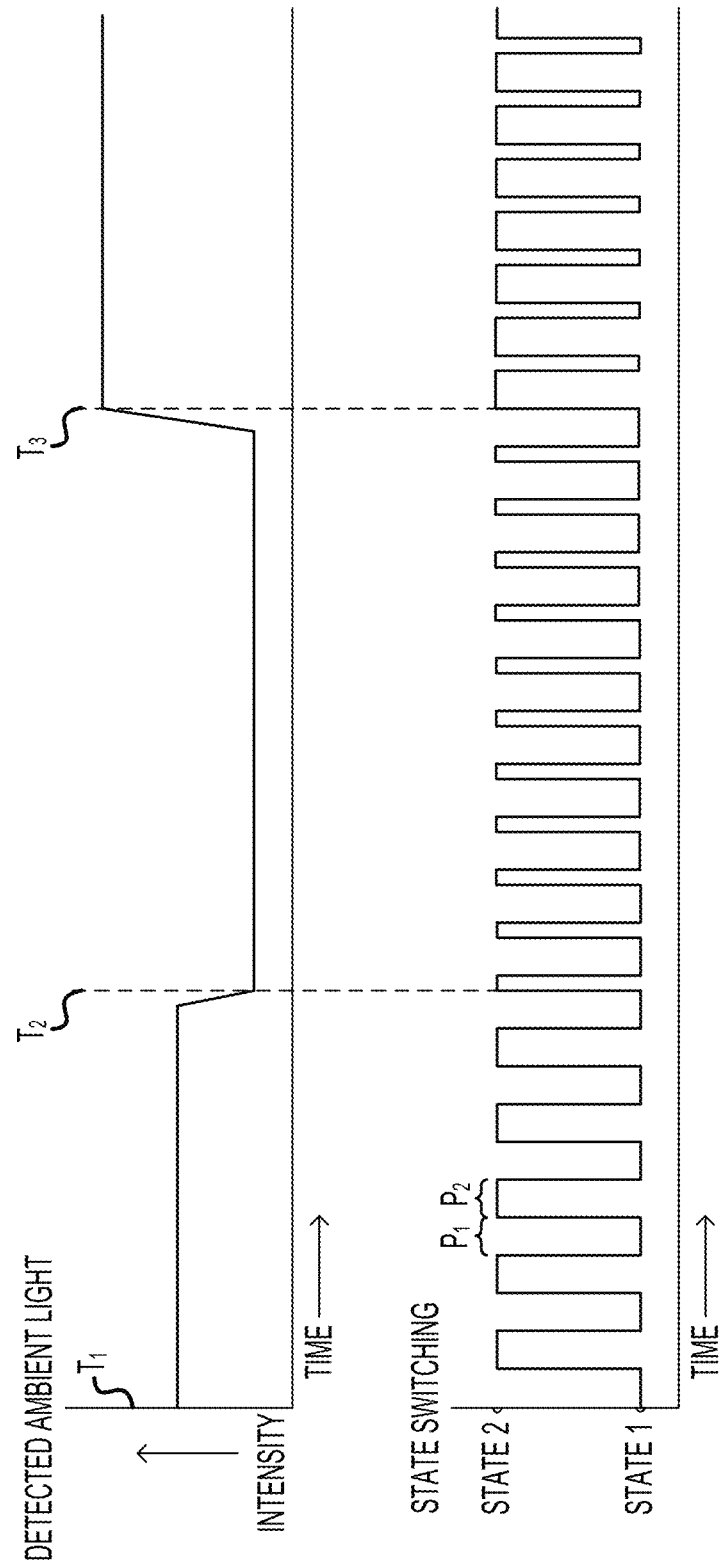
FIG. 15 illustrates an example performance of a method of operating an optical system, according to some embodiments of the present disclosure.

FIG. 15 illustrates an example performance of method 1400, according to some embodiments of the present disclosure. The upper plot of FIG. 15 shows detected ambient light intensity as a function of time (as detected by, e.g., ambient light sensors 434, 534). The lower plot of FIG. 15 shows state switching between a first state and a second state as a function of time, with time being aligned with the upper plot. At time $T_1$, a user of the optical system is in a shaded outdoor area and the detected ambient light has a medium intensity. Based on the detected ambient light at time $T_1$, a first shuttering frequency is determined. Determining the shuttering frequency may include determining a first period $P_1$, the duration that the optical system is operating in accordance with the first state prior to switching to the second state, and a second period $P_2$, the duration that the optical system is operating in accordance with the second state prior to switching to the first state. Alternatively or additionally, determining the shuttering frequency may include determining the ratio $P_1/P_2$, among other possibilities. Between times $T_1$ and $T_2$, the optical system is caused to switch between the first and second states based on the first shuttering frequency.

At time $T_2$, the user of the optical system relocates to a low-light indoor area and the detected ambient light has a low intensity. Based on the detected ambient light at time $T_2$, a second shuttering frequency is determined having a higher ratio $P_1/P_2$ than the first shuttering frequency. In other words, to improve user experience and not overly dim the world light in low-light conditions, the shuttering frequency may be adjusted so as to increase the amount of time that world light is allowed to pass through the optical system. Between times $T_2$ and $T_3$, the optical system is caused to switch between the first and second states based on the second shuttering frequency.

At time $T_3$, the user of the optical system relocates to an outdoor area with direct sunlight and the detected ambient light has a high intensity. Based on the detected ambient light at time $T_3$, a third shuttering frequency is determined having a lower ratio $P_1/P_2$ than both the first and second shuttering frequencies. In other words, to improve user experience and reduce the world light in high-light conditions, the shuttering frequency may be adjusted so as to decrease the amount of time that world light is allowed to pass through the optical system. After time $T_3$, the optical system is caused to switch between the first and second states based on the third shuttering frequency.

Figure 16A:
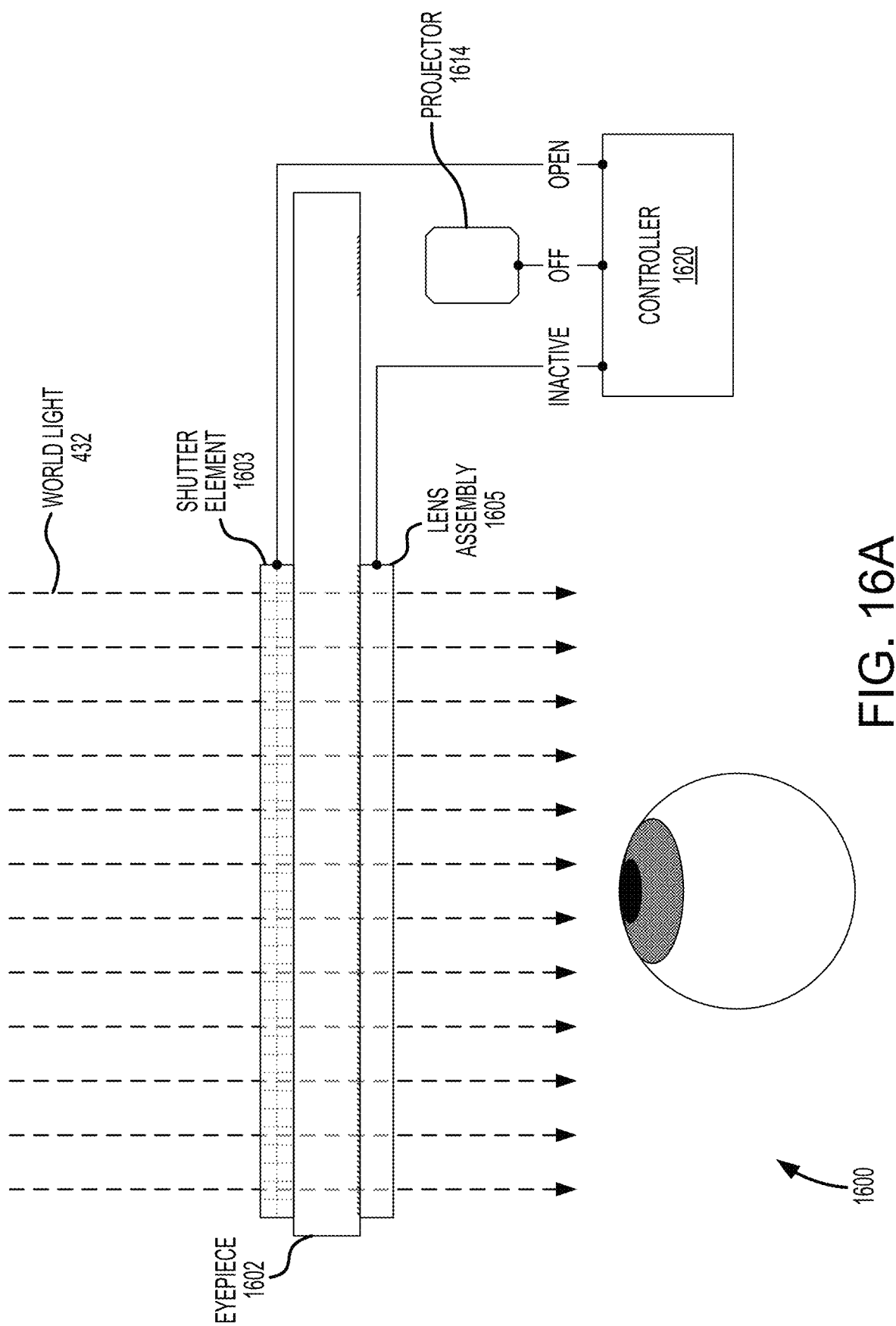
FIG. 16A illustrates an example of a display device operating in accordance with a first state, according to some embodiments of the present disclosure.

FIG. 16A illustrates an example of a display device 1600 operating in accordance with a first state, according to some embodiments of the present disclosure. Display device 1600 may include one or more components that are functionally equivalent or similar to one or more of those described above with reference to FIGS. 4A-4C, 5, 11A-11D, and/or 12A-12C. For example, display device 1600 may have a single adaptive lens assembly 1605 on the user side of an eyepiece 1602 (the side of eyepiece 1602 closest to the eye of the user). Lens assembly 1605 may include a VFE assembly and may be configured to apply positive, negative, or zero optical power to the light passing through it. Display device 1600 may include a shutter element 1603 coupled to the world side of eyepiece 1602 (the side of eyepiece 1602 furthest from the eye of the user and closest to world objects). While operating in accordance with the first state, a controller 1620 causes a projector 1614 to be turned off, lens assembly 1605 to be inactive, and shutter element 1603 to be open. When shutter element 1603 is open (i.e., electrically activated), world light 432 passing therethrough is substantially unaltered. When lens assembly 1605 is inactive, lens assembly 1605 imparts zero net optical power to light (e.g., world light 432) passing therethrough. Accordingly, while operating in accordance with the first state, world light 432 may be presented to the user substantially unaltered. As described in further detail below, in some examples, display device 1600 may hold/maintain the first state for an extended period of time (e.g., indefinitely or until display device 1600 is required to present virtual content to the user).

Figure 16B:
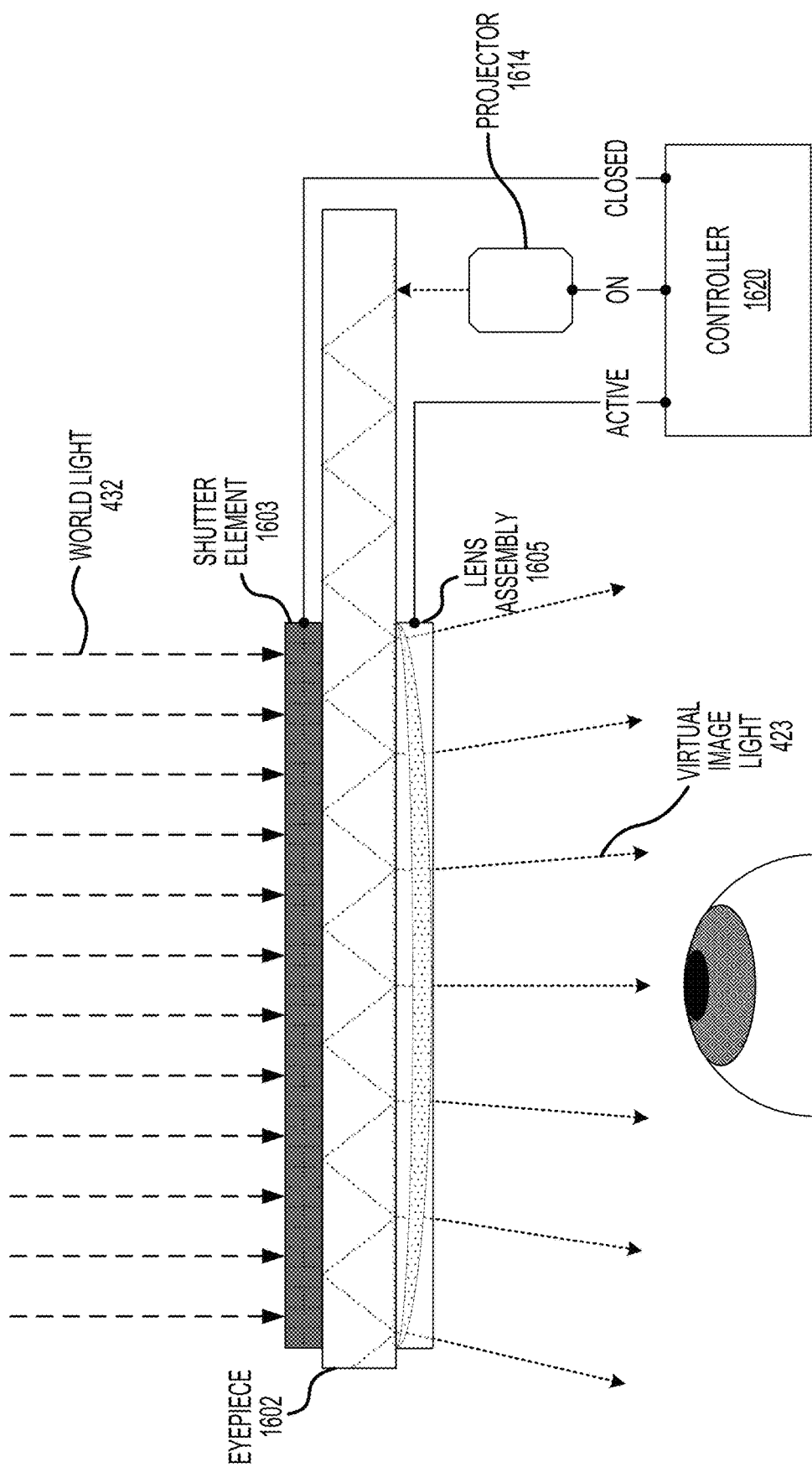
FIG. 16B illustrates an example of a display device operating in accordance with a second state, according to some embodiments of the present disclosure.

FIG. 16B illustrates an example of display device 1600 operating in accordance with a second state, according to some embodiments of the present disclosure. While operating in accordance with the second state, controller 1620 causes projector 1614 to be turned on, lens assembly 1605 to be active, and shutter element 1603 to be closed. When shutter element 1603 is closed (i.e., not electrically activated), world light 432 passing therethrough is substantially blocked. When projector 1614 is turned on, virtual image light 423 is projected onto eyepiece 1602 and is thereafter outcoupled by eyepiece 1602 toward the eye of the user. When lens assembly 1605 is active, lens assembly 1605 imparts nonzero net optical power to light (e.g., virtual image light 423) passing therethrough. Accordingly, while operating in accordance with the second state, display device 1600 may present virtual content to the user that is perceived by the user as being positioned at one or more of various possible depths. As described in further detail below, in some examples, display device 1600 may hold/maintain the second state for an extended period of time (e.g., indefinitely or until display device 1600 is required to provide the user with a view of the environment). In some embodiments, display device 1600 may synchronously control the shutter element 1603 and the lens assembly 1605 so as to rapidly alternate between the first and second states at a particular rate or frequency.

Figure 16C:
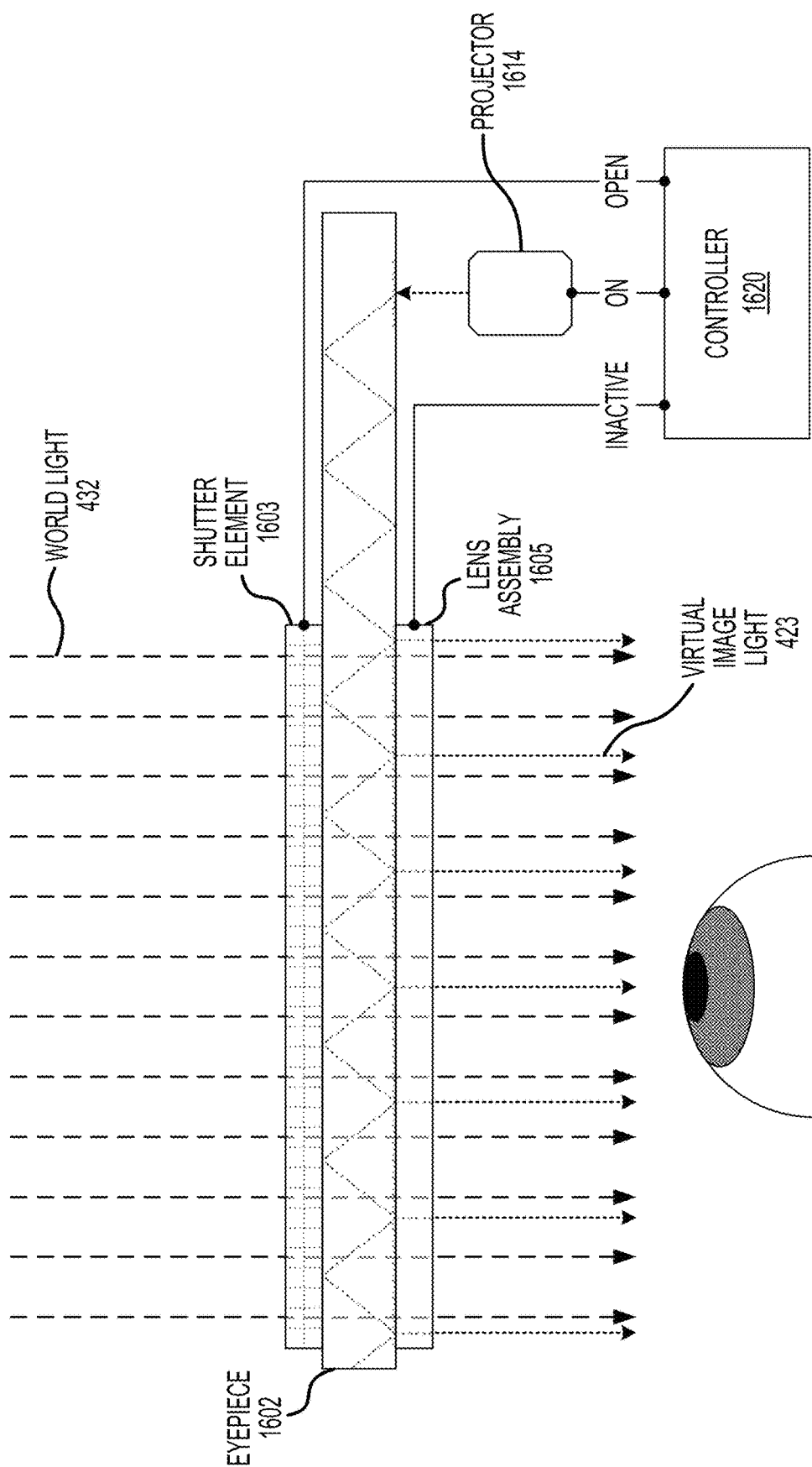
FIG. 16C illustrates an example of a display device operating in accordance with a third state, according to some embodiments of the present disclosure.

FIG. 16C illustrates an example of display device 1600 operating in accordance with a third state, according to some embodiments of the present disclosure. While operating in accordance with the third state, controller 1620 causes projector 1614 to be turned on, lens assembly 1605 to be inactive, and shutter element 1603 to be open. When shutter element 1603 is open (i.e., electrically activated), world light 432 passing therethrough is substantially unaltered. When projector 1614 is turned on, virtual image light 423 is projected onto eyepiece 1602 and is thereafter outcoupled by eyepiece 1602 toward the eye of the user. When lens assembly 1605 is inactive, lens assembly 1605 imparts zero net optical power to light (e.g., world light 432 and/or virtual image light 423) passing therethrough. Accordingly, while operating in accordance with the third state, display device 1600 may present virtual content to the user that is perceived by the user as being positioned at optical infinity.

As such, in the third state, display device 1600 need not activate lens assembly 1605 while injecting light representing virtual content at optical infinity into eyepiece 1602, and may therefore allow light from the real world to pass through toward the user without any issues. As described in further detail below, in some examples, display device 1600 may hold/maintain the third state for an extended period of time (e.g., indefinitely or until display device 1600 is required to present virtual content at less than optical infinity). In some embodiments, display device 1600 may synchronously control the shutter element 1603 and the lens assembly 1605 to rapidly alternate between the second and third states so as to rapidly present some virtual content at less than optical infinity and other virtual content at optical infinity. Similar to that described in reference to FIGS. 14 and 15, a shuttering frequency of switching between the first state, the second state, and/or the third state may be determined based on detected ambient light and/or the desired brightness of the virtual content.

As mentioned above, in some embodiments, display device 1600 may not synchronously control the shutter element 1603 and the lens assembly 1605 so as to rapidly alternate between two or more states, but instead may selectively hold/maintain a single state (e.g., one of the first state, second state, and third state) or otherwise control the shutter element 1603 and the lens assembly 1605 independently for an extended period of time. In at least some of these embodiments, display device 1600 may be configured to alternate between at least two different modes of operation including (i) a first mode of operation in which display device 1600 is configured to control a state of the shutter element 1603 and a state of the lens assembly 1605 independently or in an otherwise asynchronous manner, and (ii) a second mode of operation in which display device 1600 is configured to control the state of the shutter element 1603 and a state of the lens assembly 1605 in a synchronous manner. For example, in the first mode of operation, display device 1600 may hold/maintain a single state (e.g., one of the first state, second state, and third state) or otherwise control the shutter element 1603 and the lens assembly 1605 independently, and in the second mode of operation, display device 1600 may cause the shutter element 1603 and the lens assembly 1605 to synchronously switch between two or more states (e.g., two or more of the first state, second state, and third state).

In some examples, in the first mode of operation, display device 1600 may hold/maintain a state similar or equivalent to the second state for an extended period of time (e.g., indefinitely or until display device 1600 is required to provide the user with a view of the environment). In at least some such examples, the first mode of operation may correspond to a VR mode in which controller 1620 causes projector 1614 to be turned on, lens assembly 1605 to be optionally active, and shutter element 1603 to be closed or otherwise held in a relatively dim state. Optionally, in the first mode of operation, controller 1620 may cause lens assembly 1605 to switch states as needed to impart the appropriate amount of optical power to light from the projector. In the aforementioned examples, controller 1620 may cause display device 1600 to switch into and/or out of the first mode of operation based on any of a variety of factors, including user input (e.g., as indicated by data received from one or more sensors, user interfaces, input devices, etc.), an application that is running on display device 1600, user preferences, sensor data, and the like. For instance, controller 1620 may switch into the first mode of operation so as to initiate a VR experience in which the user is provided with little to no see-through visibility of the environment in front of them responsive to launching or terminating execution of a specific application on display device 1600, receiving indication that the user wishes to enter such a mode or exit another mode based on input received through a handheld controller and/or graphical user interface, and/or an occurrence of one or more other events. Similarly, controller 1620 may switch out of the first mode of operation so as to terminate a VR experience or transition to an AR or mixed reality (MR) experience in which the user is provided with increased see-through visibility of the environment in front of them responsive to launching or terminating execution of a specific application on display device 1600, receiving indication that the user wishes to exit a VR mode or enter another mode (e.g., an AR or MR mode) based on input received through a handheld controller and/or graphical user interface, and/or an occurrence of one or more other events. Other configurations are possible.

In other examples, in the first mode of operation, display device 1600 may hold/maintain a state similar or equivalent to the third state for an extended period of time (e.g., indefinitely or until display device 1600 is required to present virtual content at less than optical infinity). In at least some such examples, the first mode of operation may correspond to a mode in which controller 1620 causes projector 1614 to be turned on, lens assembly 1605 to be held in a fixed state, and shutter element 1603 to be held open. Optionally, in the first mode of operation, controller 1620 may cause shutter element 1603 to switch between open and closed states. In the aforementioned examples, controller 1620 may cause display device 1600 to switch into and/or out of the first mode of operation based on any of a variety of factors, including a depth at which the user's eyes are determined to be fixated, a depth in front of the user at which virtual content is to be perceived by the user, an accommodation-vergence mismatch for the virtual content, and the like. In some embodiments, controller 1620 may utilize data from one or more inward-facing cameras (e.g., images of one or both of the user's eyes) to determine the depth at which the user's eyes are fixated, evaluate the determined depth against a set of criteria, and switch into and/or out of the first mode of operation based on the results of the evaluation. For instance, in these embodiments, controller 1620 may determine whether an accommodation-vergence mismatch for the virtual content exceeds one or more predetermined thresholds based at least in part on the depth at which the user's eyes are determined to be fixated, and may switch into and/or out of the first mode of operation in response to a determination that the accommodation-vergence mismatch for the virtual content exceeds one or more predetermined thresholds. Example systems and techniques for adjusting the wavefront divergence of light representing virtual content for enhanced user perception, comfort, and/or experience, which may represent or be implemented as part of one or more of the systems and techniques described herein, are described in U.S. patent application Ser. No. 15/430,277 filed on Feb. 10, 2017, published on Aug. 17, 2017 as U.S. Publication No. 2017/0237974, U.S. patent application Ser. No. 15/469,369 filed on Mar. 24, 2017, published on Sep. 28, 2019 as U.S. Publication No. 2017/0276948, U.S. patent application Ser. No. 16/250,931 filed on Jan. 17, 2019, published on Aug. 8, 2019 as U.S. Publication No. 2019/0243448, U.S. patent application Ser. No. 16/353,989 filed on Mar. 14, 2019, published on Oct. 10, 2019 as U.S. Publication No. 2019/0311527, and U.S. patent application Ser. No. 16/389,529 filed on Apr. 19, 2019, published on Oct. 24, 2019 as U.S. Publication No. 2019/0324276, all of which are expressly incorporated herein by reference in their entirety. In some embodiments, one or more of such systems and techniques described in one or more of the aforementioned patent applications may represent or be implemented as part of one or more of systems and techniques for switching into and/or out of the first mode of operation. Other configurations are possible.

In the second mode of operation, controller 1620 of display device 1600 may cause the shutter element 1603 and the lens assembly 1605 to synchronously switch between different states in a manner yielding an inverse relationship between the amount of ambient light from the environment of the user allowed by shutter assembly 1603 to pass therethrough toward the user and the amount of wavefront divergence imparted by lens assembly 1605 to light passing therethrough toward the user. For example, in the second more of operation, controller 1620 of display device 1600 may cause the shutter element 1603 and the lens assembly 1605 to synchronously switch between two states that are similar or equivalent to the first and second states as described above in reference to FIGS. 16A and 16B, respectively, or may cause the shutter element 1603 and the lens assembly 1605 to synchronously switch between two states that are similar or equivalent to the second and third states as described above in reference to FIGS. 16B and 16C, respectively.

Figure 17:
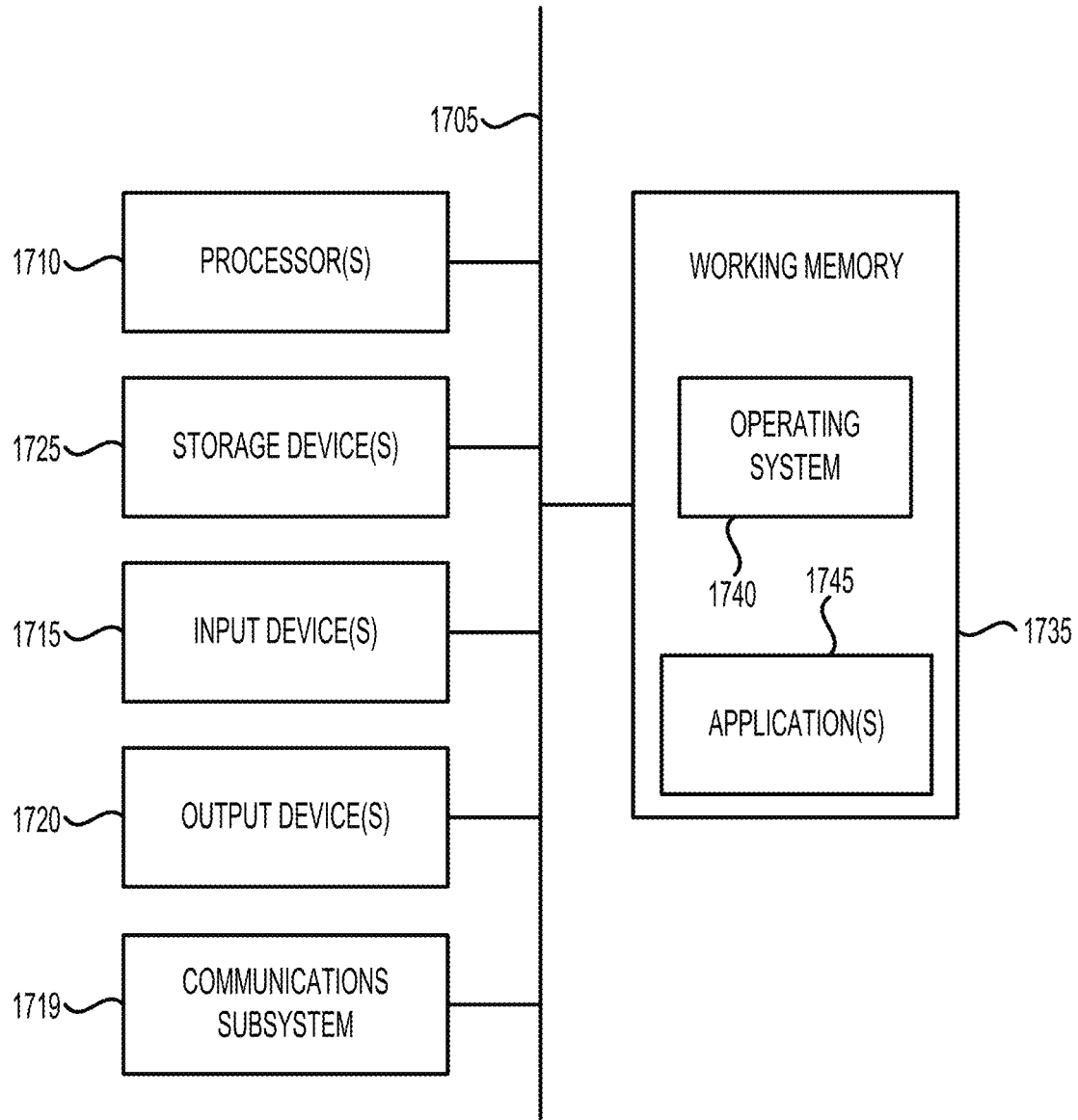
FIG. 17 illustrates a simplified computer system according to an embodiment described herein.

FIG. 17 illustrates a simplified computer system 1700 according to an embodiment described herein. Computer system 1700 as illustrated in FIG. 17 may be incorporated into devices described herein. FIG. 17 provides a schematic illustration of one embodiment of computer system 1700 that can perform some or all of the steps of the methods provided by various embodiments. It should be noted that FIG. 17 is meant only to provide a generalized illustration of various components, any or all of which may be utilized as appropriate. FIG. 17, therefore, broadly illustrates how individual system elements may be implemented in a relatively separated or relatively more integrated manner.

Computer system 1700 is shown comprising hardware elements that can be electrically coupled via a bus 1705, or may otherwise be in communication, as appropriate. The hardware elements may include one or more processors 1710, including without limitation one or more general-purpose processors and/or one or more special-purpose processors such as digital signal processing chips, graphics acceleration processors, and/or the like; one or more input devices 1715, which can include without limitation a mouse, a keyboard, a camera, and/or the like; and one or more output devices 1720, which can include without limitation a display device, a printer, and/or the like.

Computer system 1700 may further include and/or be in communication with one or more non-transitory storage devices 1725, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

Computer system 1700 might also include a communications subsystem 1719, which can include without limitation a modem, a network card (wireless or wired), an infrared communication device, a wireless communication device, and/or a chipset such as a Bluetooth™ device, an 802.11 device, a WiFi device, a WiMax device, cellular communication facilities, etc., and/or the like. The communications subsystem 1719 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 1719. In other embodiments, a portable electronic device, e.g. the first electronic device, may be incorporated into computer system 1700, e.g., an electronic device as an input device 1715. In some embodiments, computer system 1700 will further comprise a working memory 1735, which can include a RAM or ROM device, as described above.

Computer system 1700 also can include software elements, shown as being currently located within the working memory 1735, including an operating system 1740, device drivers, executable libraries, and/or other code, such as one or more application programs 1745, which may comprise computer programs provided by various embodiments, and/or may be designed to implement methods, and/or systems, provided by other embodiments, as described herein. Merely by way of example, one or more procedures described with respect to the methods discussed above, might be implemented as code and/or instructions executable by a computer and/or a processor within a computer; in an aspect, then, such code and/or instructions can be used to and/or adapt a general purpose computer or other device to perform one or more operations in accordance with the described methods.

A set of these instructions and/or code may be stored on a non-transitory computer-readable storage medium, such as the storage device(s) 1725 described above. In some cases, the storage medium might be incorporated within a computer system, such as computer system 1700. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by computer system 1700 and/or might take the form of source and/or installable code, which, upon compilation and/or installation on computer system 1700 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as computer system 1700 to perform methods in accordance with various embodiments of the technology. According to a set of embodiments, some or all of the procedures of such methods are performed by computer system 1700 in response to processor 1710 executing one or more sequences of one or more instructions, which might be incorporated into the operating system 1740 and/or other code, such as an application program 1745, contained in the working memory 1735. Such instructions may be read into the working memory 1735 from another computer-readable medium, such as one or more of the storage device(s) 1725. Merely by way of example, execution of the sequences of instructions contained in the working memory 1735 might cause the processor(s) 1710 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using computer system 1700, various computer-readable media might be involved in providing instructions/code to processor(s) 1710 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 1725. Volatile media include, without limitation, dynamic memory, such as the working memory 1735.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 1710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by computer system 1700.

The communications subsystem 1719 and/or components thereof generally will receive signals, and the bus 1705 then might carry the signals and/or the data, instructions, etc.

carried by the signals to the working memory 1735, from which the processor(s) 1710 retrieves and executes the instructions. The instructions received by the working memory 1735 may optionally be stored on a non-transitory storage device 1725 either before or after execution by the processor(s) 1710.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of operating an optical system, the method comprising:
   receiving light associated with a world object;
   linearly polarizing the light associated with the world object along a first axis;
   when the optical system is operating in accordance with a first state:
      rotating a polarization of the light associated with the world object; and
      linearly polarizing the light associated with the world object along a second axis perpendicular to the first axis;
   when the optical system is operating in accordance with a second state:
      projecting light associated with a virtual image onto an eyepiece; and
      linearly polarizing the light associated with the world object and the light associated with the virtual image along the second axis.

2. The method of claim 1, further comprising:
   rotating a polarization of the light associated with the virtual image when the optical system is operating in accordance with the second state.

3. The method of claim 1, further comprising:
   applying zero net optical power to the light associated with the world object when the optical system is operating in accordance with the first state.

4. The method of claim 1, further comprising:
   applying non-zero net optical power to the light associated with the virtual image when the optical system is operating in accordance with the second state.

5. The method of claim 1, further comprising:
   outcoupling the light associated with the virtual image when the optical system is operating in accordance with the second state.

6. An optical system comprising:
   one or more world-side shutter elements configured to:
      linearly polarize light associated with a world object along a first axis; and
      rotate a polarization of the light associated with the world object when the optical system is operating in accordance with a first state;
   an eyepiece coupled to the one or more world-side shutter elements;
   a projector configured to project light associated with a virtual image onto the eyepiece when the optical system is operating in accordance with a second state; and
   one or more user-side shutter elements coupled to the eyepiece and configured to:
      linearly polarize the light associated with the world object along a second axis perpendicular to the first axis when the optical system is operating in accordance with the first state; and
      linearly polarize the light associated with the world object and the light associated with the virtual image along the second axis when the optical system is operating in accordance with the second state.

7. The optical system of claim 6, wherein the one or more user-side shutter elements are further configured to:
rotate a polarization of the light associated with the virtual image when the optical system is operating in accordance with the second state.

8. The optical system of claim 6, further comprising:
a lens assembly coupled to the one or more user-side shutter elements.

9. The optical system of claim 8, wherein the lens assembly is configured to apply zero net optical power to the light associated with the world object when the optical system is operating in accordance with the first state.

10. The optical system of claim 8, wherein the lens assembly is configured to apply non-zero net optical power to the light associated with the virtual image when the optical system is operating in accordance with the second state.

11. The optical system of claim 6, wherein the eyepiece is configured to outcouple the light associated with the virtual image toward the one or more user-side shutter elements when the optical system is operating in accordance with the second state.

12. The optical system of claim 6, wherein:
the one or more world-side shutter elements includes:
a world-side polarizer; and
a world-side switchable waveplate; and
the one or more user-side shutter elements includes:
a user-side polarizer; and
a user-side switchable waveplate.

13. The optical system of claim 12, wherein the optical system is operating in accordance with the first state when the world-side switchable waveplate is electrically activated and the user-side switchable waveplate is not electrically activated.

14. The optical system of claim 12, wherein the optical system is operating in accordance with the second state when the user-side switchable waveplate is electrically activated and the world-side switchable waveplate is not electrically activated.

15. The optical system of claim 12, wherein the world-side polarizer is coupled to the world-side switchable waveplate.

* * * * *